(12) United States Patent
Pertsinidis et al.

(10) Patent No.: US 11,946,867 B2
(45) Date of Patent: Apr. 2, 2024

(54) MODULATION INTERFEROMETRIC IMAGING SYSTEMS AND METHODS

(71) Applicant: Memorial Sloan Kettering Cancer Center, New York, NY (US)

(72) Inventors: Alexandros Pertsinidis, New York, NY (US); Guanshi Wang, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 565 days.

(21) Appl. No.: 16/608,678

(22) PCT Filed: Dec. 5, 2017

(86) PCT No.: PCT/US2017/064695
§ 371 (c)(1),
(2) Date: Oct. 25, 2019

(87) PCT Pub. No.: WO2018/106678
PCT Pub. Date: Jun. 14, 2018

(65) Prior Publication Data
US 2023/0194427 A1    Jun. 22, 2023

Related U.S. Application Data

(60) Provisional application No. 62/430,117, filed on Dec. 5, 2016.

(51) Int. Cl.
*G01N 21/64* (2006.01)

(52) U.S. Cl.
CPC ..... *G01N 21/6456* (2013.01); *G01N 21/6402* (2013.01); *G01N 21/6428* (2013.01);
(Continued)

(58) Field of Classification Search
CPC .......... G01N 21/6456; G01N 21/6402; G01N 21/6428; G01N 2021/6439; G01N 2201/06113; G01N 2201/0636
See application file for complete search history.

(56) References Cited

U.S. PATENT DOCUMENTS

2009/0263002 A1    10/2009    Cremer et al.

FOREIGN PATENT DOCUMENTS

WO    2008080032 A2    7/2008
WO    2009115108 A1    9/2009
(Continued)

OTHER PUBLICATIONS

International Search Report for International Application No. PCT/US2017/064695 dated May 9, 2018.
(Continued)

*Primary Examiner* — David P Porta
*Assistant Examiner* — Gisselle M Gutierrez
(74) *Attorney, Agent, or Firm* — Hunton Andrews Kurth LLP

(57) ABSTRACT

Described herein are 3D single-molecule super-resolution imaging systems and methods. The provided systems and methods use modulation interferometry and phase-sensitive detection techniques that achieve less than 2 nanometer axial localization precision, which is well below the 5-10-nanometer-sized individual protein components. To illustrate the capability of this technique in probing the dynamics of complex macromolecular machines, (1) movement of individual multi-subunit *E. coli* RNA Polymerases were visualized through the complete transcription cycle, (2) kinetics of the initiation-elongation transition were dissected, (3) the conformational changes from the open initiation complex to
(Continued)

the elongation complex were analyzed, and (4) the fate of $\sigma^{70}$ initiation factors during promoter escape were determined.

29 Claims, 84 Drawing Sheets

(52) U.S. Cl.
    CPC ............ *G01N 2021/6439* (2013.01); *G01N 2201/06113* (2013.01); *G01N 2201/0636* (2013.01)

(56) References Cited

FOREIGN PATENT DOCUMENTS

| | | | |
|---|---|---|---|
| WO | 2010014244 | A2 | 4/2010 |
| WO | 2013090360 | A2 | 6/2013 |
| WO | 2016062296 | A1 | 4/2016 |

OTHER PUBLICATIONS

International Written Opinion for International Application No. PCT/US2017/064695 dated May 9, 2018.

Shao Lin et al. "I5S Wide-Field Light Microscopy with 100-nm-Scale Resolution . . . " Biophysical Journal, vol. 94, No. 12, pp. 4971-4983, Jun. 1, 2008.

Gugel et al. "Cooperative cPi Excitation and Detection Yields Sevenfold Sharper Optical . . . " Biophysical Journal, vol. 87, No. 1, pp. 4146-4152, Dec. 1, 2004.

Vishnyakov G N et al. "Interferometric Computed-Microtomograph of 3D Phase Objects," Visual Communications and Image Processing, vol. 2984 pp. 64-71, Feb. 12, 1997.

Communication pursuant to Rule 164(2)(b) and Article 94(3) EPC for European Patent Application No. 17 826 335.6 dated Jan. 24, 2022.

Wang Guanshi et al: "Probing the Transcription Cycle in Real-Time with 3D Superresolution Interferometry", Biophysical Journal, vol. 108, No. 2, Feb. 8, 2015 (Feb. 8, 2015).

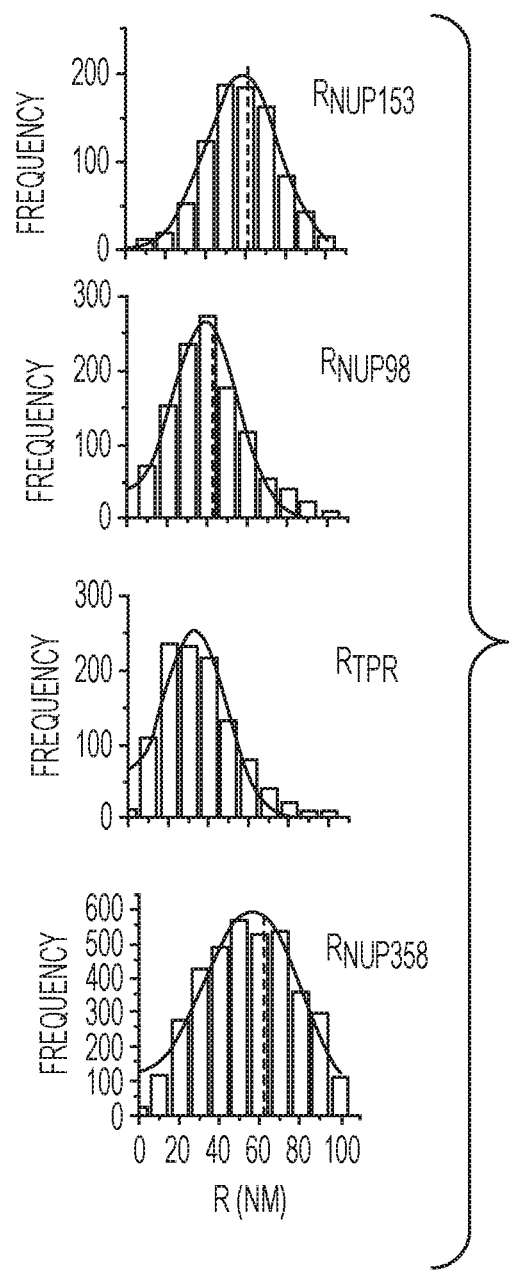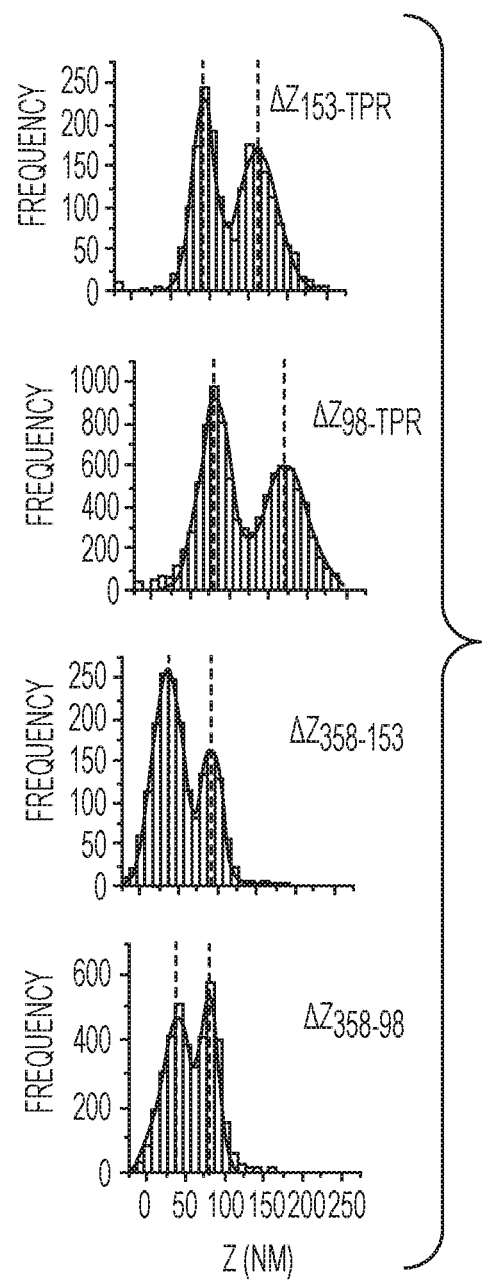
FIG. 10G
FIG. 10H

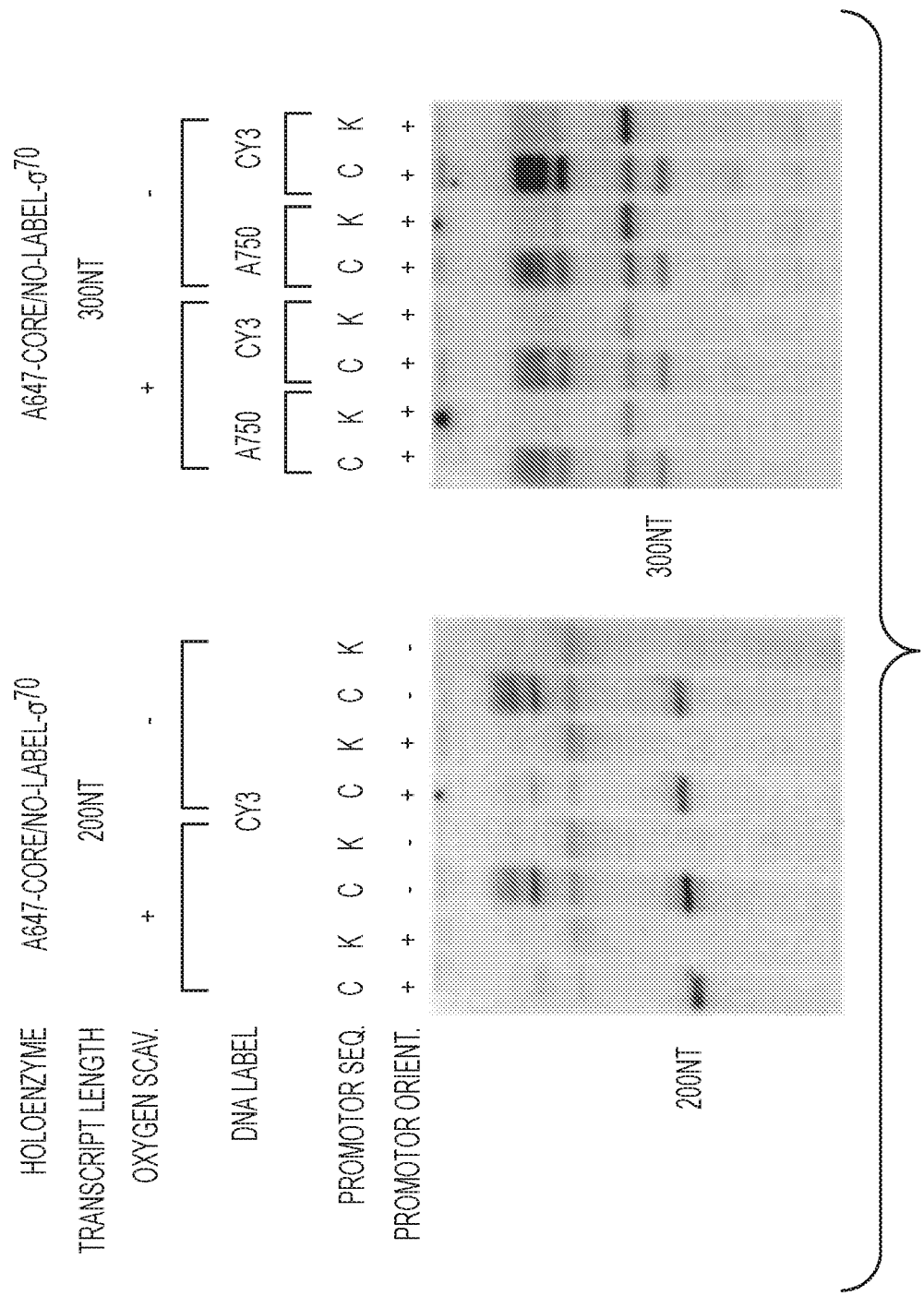

FEEDBACK FROM DETECTORS TO PZM
STABILIZES INTERFEROMETR PHASE

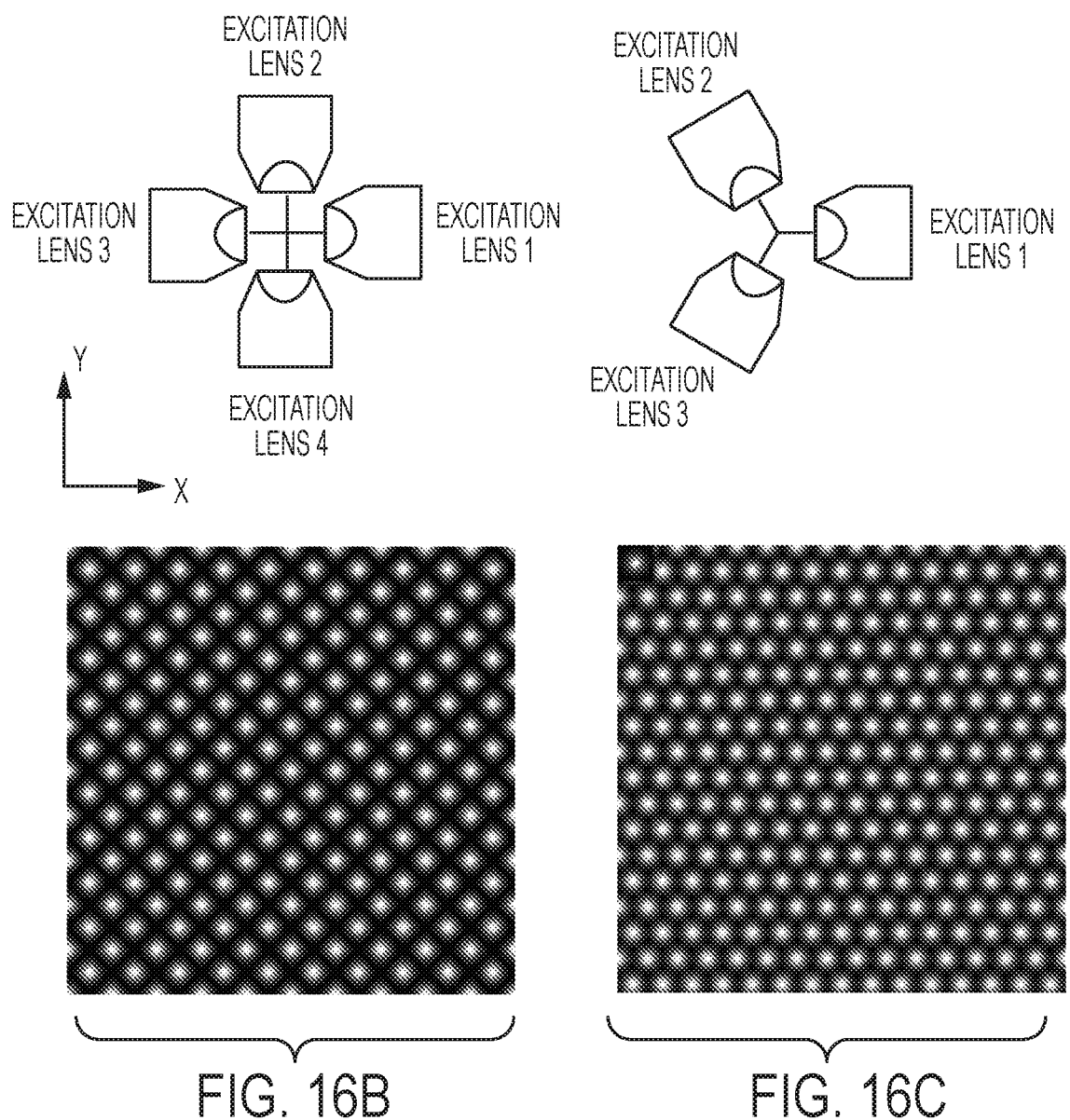

| | DITHERED LATTICE (λ/NA) | OVERALL PSF WITH 2pi DETECTION (2μm×4μm) | OVERALL PSF WITH 4pi CONSTRUCTIVE DETECTION (2μm×4μm) | OVERALL PSF WITH 4pi DESTRUCTIVE DETECTION (2μm×4μm) |
|---|---|---|---|---|
| FUNDAMENTAL RECTANGULAR LATTICE | | | | |
| FUNDAMENTAL SQUARE MAXIMALLY SYMMETRIC LATTICE | | | | |
| FUNDAMENTAL HEXAGONAL MAXIMALLY SYMMETRIC LATTICE | | | | |
| FIRST-ORDER SPARSE SQUARE MAXIMALLY SYMMETRIC LATTICE | | | | |
| FIRST-ORDER SPARSE SQUARE MAX SYMMETRIC LATTICE WITH 45° ROTATION | | | | |
| FIRST-ORDER SPARSE HEXAGONAL MAX SYMMETRIC LATTICE | | | | |

FROM FIG. 22A

FIG. 22B

MODULATION INTERFEROMETRIC IMAGING SYSTEMS AND METHODS

CROSS REFERENCE TO RELATED APPLICATION

The present application relates to and claims priority from International Patent Application No. PCT/US2017/064695 filed Dec. 5, 2017 which published as International Publication No. WO 2018/106678 on Jun. 14, 2018 and from U.S. Provisional Patent Application No. 62/430,117 filed Dec. 5, 2016, the entire disclosures of which are incorporated herein by reference.

GOVERNMENT SUPPORT

This invention was made with government support under grant number GM105443 awarded by the National Institutes of Health. The government has certain rights in the invention.

TECHNICAL FIELD

The invention relates generally to modulation interferometric imaging systems and methods. More particularly, in certain embodiments, the invention relates to 3D single-molecule super-resolution imaging systems and methods that achieve less than 2 nanometer axial localization precision.

BACKGROUND

Transcription of protein-coding genes is a highly regulated, complex biochemical process that relies on the coordination between the catalytic RNA Polymerase (RNAP) core and a multitude of initiation factors, elongation factors and (co-) activators/repressors. Understanding the dynamic remodeling of the RNAP apparatus as mRNA synthesis progresses through rounds of promoter recognition, open complex formation, abortive cycling, promoter escape, elongation and termination, remains a long-standing challenge for structural biology and biochemistry.

The core RNAP associates with protein factors—sigma factors in bacteria and general transcription factors B, F and TATA-binding-protein in eukaryotes—that direct it to specific genes and enable promoter-specific transcription initiation. According to the sigma cycle paradigm (Travers and Burgess, 1969), different sigma factors compete for binding to the core RNAP after each round of transcription; however whether and when sigma is released from the transcribing RNAPs, has been the subject of considerable debate (Mooney et al., 2005). The precise kinetics of general transcription factors during eukaryotic transcription is also unclear. Much of the conundrum arises from the paucity of experimental tools that can directly measure the dynamics of RNAPs. In recent years, with single-molecule approaches one can follow complex assembly pathways of macromolecular machines (Hoskins et al., 2011; Uemura et al., 2010), while with super-resolution microscopy (Betzig et al., 2006; Hess et al., 2006; Rust et al., 2006) with focal plane (xy) localization precisions down to less than 1 nanometer (Pertsinidis et al., 2010), one can visualize the movement (Yildiz et al., 2003) and conformations (Pertsinidis et al., 2010; Szymborska et al., 2013) of multi-protein complexes in native environments. Even though combining these applications for transcription studies of multi-subunit RNAP systems has emerged (Friedman and Gelles, 2012; Revyakin et al., 2012; Wang et al., 2013), none attained the required spatial and/or temporal resolution to simultaneously follow the movement and sub-unit composition of the transcription machinery through the transcription cycle, in real-time. An interesting single-molecule assay achieved sub-second detection of nascent transcripts produced by the single subunit T7 RNAP (Zhang et al., 2014), however movement of RNAP along the template could be clearly followed only after averaging multiple traces and with limited resolution (100's of bp).

A key issue in achieving 3D super-resolution of molecular-scale biological systems is limitations in the axial resolving power of the microscope. Several groups have achieved z localization precisions $\sigma_z$~10-20 nm (for $N_{photon}$~2000-9000 collected photons per localization) by measuring changes introduced into the shape of the images of single molecules at different degree of defocus, using a single lens (Jia et al., 2014; Kao and Verkman, 1994; Pavani et al., 2009), and down to about 5 nm (for $N_{photon}$~800-1200 collected photons per localization from single organic dyes and fluorescent proteins) by measuring modulations in the intensity of single molecules when coherently super-imposing the detection wave-fronts of two opposed lenses (Aquino et al., 2011; Shtengel et al., 2009). To achieve the highest possible z resolution for the fluorophores in use, the current state-of the-art approaches measure the self-interference of fluorescence light that is emitted by single molecules and that is collected by two opposed lenses. This is achieved by introducing precise phase shifts into parts of the emitted fluorescence light beams (through multi-way beam-splitters (Shtengel et al., 2009) or polarization optics (Aquino et al., 2011)) and then recombining them into multiple (3 or 4) superimposed images on a camera detector. The degree of constructive or destructive interference depends on the exact position of the fluorescent molecule between the two lenses, and thus the relative intensities of the final images enable axial localization.

Although this scheme allowed optimal use of the limited number of fluorescence photons collected from single photoswitchable fluorophores ($N_{photon}$~1000), at the same time it imposed significant constraints on the design and operation of the experimental setup: (i) strict maintenance of the optical paths close to zero length difference due to the finite fluorescence coherence length (~1 μm); (ii) need for elaborate optics for dispersion balancing due to broad emission spectrum (~50 nm) and precise multi-way beam splitting tailored to each particular dye.

Also, theoretically, the localization precision scales as $\sigma_z \propto 1/N_{photon}$; however, whether resolution improves with photon counts, reaching an extrapolated~1 nm for $N_{photon}$~1000, was not experimentally tested for single molecules (e.g., single dyes and fluorescent proteins) in the previous interferometry works, and due to additional experimental errors, $\sigma_z$ did not improve significantly beyond about 3 nm for $N_{photon}$~2500-11000 when tracking a 100 nm fluorescent bead (Aquino et al., 2011).

Thus, despite the promise of fluorescence self-interference approaches for attaining 3D isotropic resolution down to molecular dimensions, their general adaption to multi-color applications that probe dynamic, complex biological processes in real-time has been limited.

Thus, there remains a need for imaging systems and methods with better than 2-3 nanometer 3D localization precision and better than 1-2 second temporal resolution for single molecule measurements.

SUMMARY

Described herein are 3D single-molecule super-resolution imaging systems and methods. The provided systems and methods use modulation interferometry and phase-sensitive detection techniques that achieve less than 2 nanometer axial localization precision, which is well below the 5-10-nanometer-sized individual protein components. To illustrate the capability of these techniques in probing the dynamics of complex macromolecular machines, (1) movement of individual multi-subunit E. coli RNA Polymerases were visualized through the complete transcription cycle, (2) kinetics of the initiation-elongation transition were dissected, and (3) the fate of $\sigma^{70}$ initiation factors during promoter escape were determined.

Limitations faced by previous systems and methods were overcome by a combination of multi-color single-molecule co-localization and interferometric super-resolution microscopy techniques. These techniques enabled sub-diffraction 3D distance measurements and tracking of RNAP and associated factors along surface-tethered DNA templates with down to about 2 nanometer localization precision at about 1 second temporal resolution.

As described herein, a setup was built that allows single-molecule axial localization measurements through phase-shifting interferometry. Oscillating patterns of constructive and destructive interference were created by dynamically and continuously modulating the path-length difference between the two optical paths ("interferometer arms") that guide the excitation and emission beams through the two opposed lenses. This is accomplished with less than 1 nm precision by employing a capacitive sensor-equipped piezo-electric mirror mount (PZM) (FIG. 1A, FIGS. 8A-8G). In contrast to previous setups that allowed gaining simultaneous access to only a discrete (3 or 4) number of phases of the fluorescence photons that travel through the two arms of the interferometer, the provided systems and methods enable accessing any arbitrary phase over an extended dynamic range (FIG. 1A), while also achieving simultaneous wide-field, coherent superposition of both excitation and emission beams.

In one aspect, the invention is directed to an interferometric modulation imaging apparatus for multi-color interferometric imaging of samples, the apparatus comprising: a first optical objective for focusing a first excitation beam toward a fluorescent sample located in a volume between the first optical objective and a second optical objective of the apparatus, and for collecting a first portion of light emitted from the sample; the second optical objective located within a first distance of the first objective for focusing a second excitation beam toward the sample, and for collecting a second portion of light emitted from the sample; a dichroic mirror for directing an illumination beam toward one or more beam splitters that splits the illumination beam into the first excitation beam and the second excitation beam and that combines the first portion of emitted light with the second portion of emitted light to form an interference signal; one or more phase modulating devices [e.g., a mechanical device (e.g., a mirror mount with motorized actuators, piezo-restrictive actuators, and/or voice-coil actuators, deformable mirrors, and/or Microelectromechanical systems (MEMS) mirrors); e.g., a reflective phase modulator (e.g., wherein the reflective phase modulator is used as one of the mirrors, e.g., a Liquid-crystal-on-silicon (LCOS) phase modulator, e.g., a Ferro-electric phase modulator, e.g., a Twisted-nematic phase modulator); e.g., one or more transmitting devices (e.g., wherein the one or more transmitting devices are inserted into an optical path of one or more interferometric arms, e.g., a Liquid-crystal variable waveplate/retarder, e.g., a Pockels cells, e.g., an Electro-optic phase modulator, e.g., a device with a movable wedge such as Soleil-Babinet Compensators)], wherein the one or more phase modulation devices are arranged to: direct the first excitation beam from the one or more beam splitters to the first optical objective, and direct the first portion of emitted light collected at the first optical objective to the one or more beam splitters; a first set of mirrors arranged to: direct the second excitation beam from the one or more beam splitters to the second optical objective; and direct the second portion of emitted light collected at the second optical objective to the one or more beam splitters; and one or more detectors for detecting the interference signal.

In another aspect, the invention is directed to an interferometric modulation imaging apparatus for multi-color interferometric imaging of samples, the apparatus comprising: one or more excitation sources (e.g., one or more lasers); a first optical objective for focusing a frequency modulated excitation beam from the one or more excitation sources toward a fluorescent sample located in a volume between the first optical objective and a second optical objective of the apparatus, and for collecting a first portion of light emitted from the sample; the second optical objective located within a first distance of the first objective for focusing the frequency modulated excitation beam toward the sample, and for collecting a second portion of light emitted from the sample; a dichroic mirror for directing the frequency modulated excitation beam having different frequencies and for combining the first portion of emitted light with the second portion of emitted light to form an interference signal; one or more phase modulating devices (e.g., a mechanical device (e.g., a mirror mount with motorized actuators, piezo-restrictive actuators, and/or voice-coil actuators, deformable mirrors, and/or Microelectromechanical systems (MEMS) mirrors); e.g., a reflective phase modulator (e.g., wherein the reflective phase modulator is used as one of the mirrors, e.g., a Liquid-crystal-on-silicon (LCOS) phase modulator, e.g., a Ferro-electric phase modulator, e.g., a Twisted-nematic phase modulator); e.g., one or more transmitting devices (e.g., wherein the one or more transmitting devices are inserted into an optical path of one or more interferometric arms, e.g., a Liquid-crystal variable waveplate/retarder, e.g., a Pockels cells, e.g., an Electro-optic phase modulator, e.g., a device with a movable wedge such as Soleil-Babinet Compensators), wherein the one or more phase modulation devices are arranged to: direct the frequency modulated excitation beam from the one or more beam splitters to the first optical objective, and direct the first portion of emitted light collected at the first optical objective to the one or more beam splitters; a first set of mirrors arranged to: direct the frequency modulated beam from the one or more beam splitters to the second optical objective; and direct the second portion of emitted light collected at the second optical objective to the one or more beam splitters; and one or more detectors for detecting the interference signal.

In certain embodiments, the first distance is from about 0.01 to about 100,000,000 m. In certain embodiments, the first distance is from about $M_z$ wavelength of violet/UV light (e.g., from about 10 nm to about 450 nm) up to any system that can focus light up to 100 m focal length (e.g., up to 50 m in focal length, e.g., up to 25 m in focal length, e.g., up to 10 m in focal length, e.g., up to 5 m in focal length).

In certain embodiments, the dichroic mirror combines the first portion of emitted light with the second portion of emitted light to form an interference signal via a non-polarizing beam splitter or a polarizing beam splitter. In certain embodiments, polarizations of the first and second excitation beams are rotated, thereby generating an interference signal.

In certain embodiments, the apparatus further comprises a first filter located between the one or more beam splitters and a first detector of the one or more detectors for transmitting the interference signal at a first emission wavelength, and the apparatus also comprising a second filter located between the one or more beam splitters and a second detector of the one or more detectors for transmitting the interference signal at a second emission wavelength.

In certain embodiments, the one or more detectors comprise a single detector and one or more beam splitters for transmitting the interference signal at a plurality of emission wavelengths. In certain embodiments, the single detector has a plurality of quadrants/sections for detecting the interference signal.

In certain embodiments, one or more side-by-side simultaneous images are formed, and wherein each image corresponds to the emission wavelength.

In certain embodiments, the one or more excitation sources comprises a first laser that generates light at a first illumination wavelength and a second laser that generates light at a second illumination wavelength. In certain embodiments, each of the one or more excitation sources are lasers that emit light at a wavelength from about 350 nm to about 2,000 nm, e.g., from about 350 nm to about 800 nm, e.g., at about 405 nm, about 488 nm, about 532 nm, about 642 nm, or about 730 nm. In certain embodiments, the first and second illumination wavelengths are the same.

In certain embodiments, one or more excitation sources comprises a frequency modulated excitation laser (e.g., a single laser) that emits light at a plurality of wavelengths. In certain embodiments, the plurality of wavelengths is within a range from about 350 nm to about 2,000 nm. In certain embodiments, the plurality of wavelengths is about 405 nm, about 488 nm, about 532 nm, about 642 nm, and/or about 730 nm. In certain embodiments, each of the plurality of emitted wavelengths is the same. In certain embodiments, first emission wavelength is the same as the second emission wavelength.

In certain embodiments, the apparatus comprises a third optical objective (e.g., a third excitation lens) that is orthogonal to the first and second optical objectives (e.g., for selective plane illumination) (e.g., as depicted in FIG. 16A).

In certain embodiments, the apparatus comprising a third, a fourth, a fifth, a sixth, a seventh, etc. optical objectives that are orthogonal to the first and second optical objectives (e.g., for structured illumination in the xy plane) (e.g., thereby extending modulation interferometry from z to xyz plane) (e.g., as depicted in FIGS. 16B-16D).

In certain embodiments, the first, second, or frequency modulated excitation beam comprise a continuous wave. In certain embodiments, the first, second, or frequency modulated excitation beam is pulsed. In certain embodiments, the pulse width of each pulse is within a range from below 100 fsec to 100 nsec.

In certain embodiments, each of the plurality of fluorescent species is excited through 1-photon, 2-photon, or n-photon absorption, where n=1, 2, 3, 4, 5, 6, etc.

In another aspect, the invention is directed to a method for 3D imaging by modulation interferometry, the method comprising: directing, by one or more phase modulation devices [e.g., a mechanical device (e.g., a mirror mount with motorized actuators, piezo-restrictive actuators, and/or voice-coil actuators, deformable mirrors, and/or Microelectromechanical systems (MEMS) mirrors); e.g., a reflective phase modulator (e.g., wherein the reflective phase modulator is used as one of the mirrors, e.g., a Liquid-crystal-on-silicon (LCOS) phase modulator, e.g., a Ferro-electric phase modulator, e.g., a Twisted-nematic phase modulator); e.g., one or more transmitting devices (e.g., wherein the one or more transmitting devices are inserted into one or more optical path of interferometric arms, e.g., a Liquid-crystal variable waveplate/retarder, e.g., a Pockels cells, e.g., an Electro-optic phase modulator, e.g., a device with a movable wedge such as Soleil-Babinet Compensators], a first excitation beam to a first optical objective, wherein at least one of the one or more phase modulating devices is initially located at a first position; directing, by a first set of reflective mirrors, a second excitation beam to a second optical objective; collecting, at the first optical objective, a first portion of light emitted by the sample; collecting, at the second optical objective, a second portion of light emitted by the sample; combining, (e.g., at one or more beam splitters (e.g., one or more non-polarizing beam splitters; e.g., one or more polarizing beam splitters (e.g., wherein the first and second excitation beams are rotated, thereby generating an interference signal)), e.g., via interference of two counter-propagating excitation beams from two separate phase, e.g., via frequency-locked laser sources for modulating phase of the first excitation beam with respect to the second excitation beam), the first portion of emitted light and the second portion of emitted light to form a first interference signal; detecting, by one or more detectors (e.g., by a first detector and a second detector) (e.g., by a plurality of quadrants/sections on a first detector), the first interference signal; modulating an optical path length via the at least one of the one or more phase modulation devices from a first state (e.g., a first position; e.g., a first refractive index; e.g., a first voltage) to a second state (e.g., a second position; a second refractive index; e.g., a second voltage) to result in a second interference signal; detecting by the one or more detectors (e.g., by the first detector and the second detector) (e.g., by the plurality of quadrants/sections on the first detector), the second interference signal; modulating the optical path length via the one or more phase modulation devices to a third state (e.g., a third position; e.g., a third refractive index; e.g., a third voltage) to result in a third interference signal; detecting, by the at least one of the one or more detectors (e.g., by the first detector and the second detector) (e.g., by the plurality of quadrants/sections on the first detector), the third interference signal; and processing, by a processor of a computing device, data corresponding to the first interference signal, the second interference signal, and the third interference signal to determine an axial position of one or more features of a sample.

In certain embodiments, the modulating comprises physically displacing the one or more phase modulating devices. In certain embodiments, the one or more phase modulation devices comprises a PZM or other movable device. In certain embodiments, the modulating comprises changing the refractive index of one the one or more phase modulation devices (e.g., wherein the one or more phase modulation devices comprises a reflective or transmitting phase modulator or electro-optic modulator) (e.g., via applying a voltage to align liquid crystals in the modulator) (e.g., via applying a voltage to the electro-optic modulator) (e.g., wherein the one or more phase modulation devices comprises a movable wedge or Babinet-Soileil compensator) (e.g., via inserting a thickness of a glass piece into the optical path). In certain embodiments, the modulating comprises changing the electric field one the one or more phase modulation devices (e.g., wherein the one or more phase modulation devices comprises a reflective or transmitting phase modulator or electro-optic modulator) (e.g., via applying a voltage to align liquid crystals in the modulator) (e.g., via applying a voltage to the electro-optic modulator).

In another aspect, the invention is directed to a method for 3D imaging by modulation interferometry, the method comprising: directing, by one or more phase modulation devices (e.g., for separation of excitation and emission interferometer arms), an excitation beam from a frequency-modulated laser source to a first optical objective, collecting, at the first optical objective, a first portion of light emitted by a sample; collecting, at the second optical objective, a second portion of light emitted by the sample; combining, (e.g., via a non-polarizing beam splitter; e.g., via a polarizing beam splitter (e.g., wherein polarizations of the frequency modulated beams are rotated, thereby generating an interference signal)), the first portion of emitted light and the second portion of emitted light to form a first interference signal; detecting, by one or more detectors (e.g., by a first detector and a second detector) (e.g., by a plurality of quadrants/ sections on a first detector), the first interference signal; modulating an optical path length via the at least one of the one or more phase modulation devices from a first state (e.g., a first position; e.g., a first refractive index; e.g., at a first voltage) to a second state (e.g., a second position; a second refractive index; e.g., at a second voltage) to result in a second interference signal; detecting by the one or more detectors (e.g., by the first detector and the second detector) (e.g., by the plurality of quadrants/sections on the first detector), the second interference signal; modulating the optical path length via the one or more phase modulation devices to a third state (e.g., a third position; e.g., a third refractive index; e.g., at a third voltage) to result in a third interference signal; detecting, by the at least one of the one or more detectors (e.g., by the first detector and the second detector) (e.g., by the plurality of quadrants/sections on the first detector), the third interference signal; and processing data corresponding to the first interference signal, the second interference signal, and the third interference signal to determine an axial position of one or more features of a sample.

In certain embodiments, the modulating comprises physically displacing the one or more phase modulating devices. In certain embodiments, the one or more phase modulation devices comprises a PZM or other movable device. In certain embodiments, the modulating comprises changing the refractive index of one the one or more phase modulation devices (e.g., wherein the one or more phase modulation devices comprises a reflective or transmitting phase modulator or electro-optic modulator) (e.g., via applying a voltage to align liquid crystals in the modulator) (e.g., via applying a voltage to the electro-optic modulator) (e.g., wherein the one or more phase modulation devices comprises a movable wedge or Babinet-Soileil compensator) (e.g., via inserting a thickness of a glass piece into the optical path). In certain embodiments, the modulating comprises changing the electric field one the one or more phase modulation devices (e.g., wherein the one or more phase modulation devices comprises a reflective or transmitting phase modulator or electro-optic modulator) (e.g., via applying a voltage to align liquid crystals in the modulator) (e.g., via applying a voltage to the electro-optic modulator).

In certain embodiments, the method comprises any one of or a combination of: generating, via a light source, an illumination beam; directing, via a dichroic mirror, the illumination beam toward the one or more beam splitters; splitting, by the one or more beam splitters, the illumination beam into the first excitation beam and the second excitation beam; focusing, by the first optical objective, the first excitation beam toward the sample (e.g., fluorescent sample), wherein the sample is located in a volume between the first optical objective and the second optical objective; focusing, by the second optical objective, the second excitation beam toward the sample; directing, by the first set of reflective mirrors, the first portion of emitted light collected at the first optical objective to the one or more beam splitters; and directing, by the second set of reflective mirrors, the second portion of emitted light collected at the second optical objective to the one or more beam splitters.

In certain embodiments, the light source comprises one or more lasers, the one or more lasers comprising a first laser which generates light at a first illumination wavelength (e.g., wherein the first and second illumination wavelengths are the same). In certain embodiments, the method comprises a second laser which generates light at a second illumination wavelength (e.g., wherein each of the one or more excitation sources are lasers that emit light at a wavelength from about 350 nm to about 2,000 nm, e.g., from about 350 nm to about 800 nm, e.g., at about 405 nm, about 488 nm, about 532 nm, about 642 nm, or about 730 nm.

In certain embodiments, the frequency modulated excitation laser source emits light at a plurality of wavelengths, e.g., within a range from about 350 nm to about 2,000 nm, e.g., within a range from about 350 nm to about 800 nm, e.g., at about 405 nm, about 460 nm, about 488 nm, about 532 nm, about 561 nm, about 642 nm, about 730 nm, about 780 nm, about 830 nm, about 980 nm, about 1064 nm, about 1,300 nm, about 1,600 nm, and/or about 2,000 nm (e.g., wherein each of the plurality of emitted wavelengths are the same).

In certain embodiments, the sample comprises a plurality of fluorescent species, wherein a first fluorescent species of the plurality emits light in response to illumination by light of the first illumination wavelength, and wherein a second fluorescent species of the plurality emits light in response to illumination by light of the second illumination wavelength (e.g., wherein the first and second illumination wavelength are the same wavelength (e.g., wherein one of the plurality of fluorescent species has a long Stokes shift) (e.g., wherein the apparatus further comprises one or more semiconductor nanoparticles (e.g., quantum dots) having a broad excitation spectra)).

In certain embodiments, the first detector detects the first, second, and third interference signals at the first wavelength and the second detector detects the first, second, and third interference signals at the second wavelength.

In certain embodiments, the first, second, and third positions form the vertices of a triangle.

In certain embodiments, the one or more features of the sample comprise a first single-molecule and a second single-molecule. In certain embodiments, the one or more features of the sample comprise a first single atom and a second single atom (e.g., wherein the first and second single atoms are trapped in a vacuum) (e.g., for applications in atomic physics, e.g., quantum information, e.g., precision meteorology).

In certain embodiments, a stage of the sample is actively stabilized and the first and second objective are aligned from feedback from the one or more detectors to the stage of the sample, wherein the first objective is below the stage of the sample and wherein the second objective lens is above the stage of the sample (e.g., thereby stabilizing the stage of the sample with respect to the first objective lens (as depicted in FIG. 15E, left panel). In certain embodiments, a stage of the sample is actively stabilized and the first and second objective are aligned from feedback from the one or more detectors to the second objective, wherein the first objective is below the stage of the sample and wherein the second objective lens is above the stage of the sample (e.g., thereby stabilizing the stage of the second objective with respective to the first objective (as depicted in FIG. 15E, right panel).

In certain embodiments, an interferometer phase is actively stabilized via feedback from the one or more detectors to the one or more phase modulation devices (e.g., PZM) (e.g., thereby stabilizing the interferometer phase) (e.g., as depicted in FIG. 15F).

In certain embodiments, an interferometer phase is stabilized as depicted in FIG. 15G (e.g., operating at a pathlength difference of $\delta_l$: $\delta_l/\lambda \sim \lambda/\Delta\lambda$) (e.g., wherein laser modulation comprises $\Delta\lambda/\lambda \sim 10^{-4}$, $\delta_l \sim 10^{-4} \times \lambda$) (e.g., wherein $\lambda \sim 0.4$-1 μm, $\delta_l \sim 0.4$-1 cm) (e.g., wherein the first set of mirrors are fixed on the first and second objectives, e.g., wherein a reflector is placed at a surface of the sample).

In certain embodiments, an interferometer phase is stabilized using laser frequency modulated as depicted in FIG. 15H.

In certain embodiments, the $\delta_l$ between the two arms is about $\lambda^2/\Delta\lambda$, where $\lambda$ is representative of the wavelength of the excitation beam and $\Delta\lambda$ is representative of a range that the excitation wavelength can be modulated, thereby achieving a complete 0-2π modulation cycle.

In certain embodiments, the method comprises single molecule localization of multiple close emitters, wherein detected emissions from the multiple close emitters are separated in time.

In certain embodiments, the 3D imaging by modulation interferometry comprises detecting a reversible or irreversible optical transition (e.g., photo-switching, photo-activation, photo-blinking) (e.g., switching between a dark state and a bright state) (e.g., switching between resolvable states (e.g., wherein the switching comprises switching from a state of one color (e.g. green emitting) to state of another color (e.g. red emitting)) (e.g., using reversible and irreversible on-off binding—e.g. ligand-receptor binding, or DNA target-probe binding).

In certain embodiments, the sample is maintained at a cryogenic temperature (e.g., from near 0 Kelvin (e.g., micro-Kelvin) to about 123K, e.g., below 3 Kelvin, e.g., below 1 Kelvin) during the collecting, at the first optical objective, of the first portion of light emitted by the sample and during the collecting, at the second optical objective, of the second portion of light emitted by the sample (e.g., for cryogenic fluorescence and/or correlative cryo-fluorescence/cryo-EM imaging applications).

In certain embodiments, the sample is maintained at room temperature during the collecting, at the first optical objective, of the first portion of light emitted by the sample and during the collecting, at the second optical objective, of the second portion of light emitted by the sample.

In certain embodiments, the apparatus comprises a cooler for maintaining the sample at a cryogenic temperature (e.g., from near 0 Kelvin (e.g., micro-Kelvin) to about 123K, e.g., below 3 Kelvin, e.g., below 1 Kelvin) (e.g., during collecting, at the first optical objective, of the first portion of light emitted by the sample and during collecting, at the second optical objective, of the second portion of light emitted by the sample, e.g., for cryogenic fluorescence and/or correlative cryo-fluorescence/cryo-EM imaging applications).

Elements of embodiments involving one aspect of the invention (e.g., methods) can be applied in embodiments involving other aspects of the invention, and vice versa.

Definitions

In order for the present disclosure to be more readily understood, certain terms are first defined below. Additional definitions for the following terms and other terms are set forth throughout the specification.

In this application, the use of "or" means "and/or" unless stated otherwise. As used in this application, the term "comprise" and variations of the term, such as "comprising" and "comprises," are not intended to exclude other additives, components, integers or steps. As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

"Biocompatible": The term "biocompatible", as used herein is intended to describe materials that do not elicit a substantial detrimental response in vivo. In certain embodiments, the materials are "biocompatible" if they are not toxic to cells. In certain embodiments, materials are "biocompatible" if their addition to cells in vitro results in less than or equal to 20% cell death, and/or their administration in vivo does not induce inflammation or other such adverse effects. In certain embodiments, materials are biodegradable.

"Detector": As used herein, the term "detector" includes any detector of electromagnetic radiation including, but not limited to, CCD camera, CMOS camera, intensified CCD (I-CCD) camera, Electron-Multiplication CCD (EM-CCD) camera, Electron-Bombardment CCD (EB-CCD) camera, scientific CMOS (sCMOS) camera, photomultiplier tubes, photodiodes, and avalanche photodiodes.

"Image": The term "image", as used herein, is understood to mean a visual display or any data representation that may be interpreted for visual display. For example, a three-dimensional image may include a dataset of values of a given quantity that varies in three spatial dimensions. A three-dimensional image (e.g., a three-dimensional data representation) may be displayed in two-dimensions (e.g., on a two-dimensional screen, or on a two-dimensional printout). In certain embodiments, the term "image" may refer to, for example, to a multi-dimensional image (e.g., a multi-dimensional (e.g., four dimensional) data representation) that is displayed in two-dimensions (e.g., on a two-dimensional screen, or on a two-dimensional printout). The term "image" may refer, for example, to an optical image, an x-ray image, an image generated by: positron emission tomography (PET), magnetic resonance, (MR) single photon emission computed tomography (SPECT), and/or ultrasound, and any combination of these.

"Peptide" or "Polypeptide": The term "peptide" or "polypeptide" refers to a string of at least two (e.g., at least three) amino acids linked together by peptide bonds. In certain embodiments, a polypeptide comprises naturally-occurring amino acids; alternatively or additionally, in certain embodiments, a polypeptide comprises one or more non-natural amino acids (i.e., compounds that do not occur in nature but that can be incorporated into a polypeptide chain; see, for example, http://www.cco.caltech.edu/~dadgrp/Unnatstruct-.gif, which displays structures of non-natural amino acids that have been successfully incorporated into functional ion channels) and/or amino acid analogs as are known in the art may alternatively be employed). In certain embodiments, one or more of the amino acids in a protein may be modified, for example, by the addition of a chemical entity such as a carbohydrate group, a phosphate group, a farnesyl group, an isofarnesyl group, a fatty acid group, a linker for conjugation, functionalization, or other modification, etc.

"Sensor": As used herein, the term "sensor" includes any sensor of electromagnetic radiation including, but not limited to, CCD camera, CMOS camera, intensified CCD (I-CCD) camera, Electron-Multiplication CCD (EM-CCD) camera, Electron-Bombardment CCD (EB-CCD) camera, scientific CMOS (sCMOS) camera, photomultiplier tubes, "Substantially": As used herein, the term "substantially" refers to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

Drawings are presented herein for illustration purposes, not for limitation.

BRIEF DESCRIPTION OF DRAWINGS

The foregoing and other objects, aspects, features, and advantages of the present disclosure will become more apparent and better understood by referring to the following description taken in conduction with the accompanying drawings, in which:

FIG. 1A shows a diagram of optical setup. OL1,2: 1.27 NA water-immersion objective lenses. M1-8: silver mirrors. BS: non-polarizing beam splitter. DC: laser-reflecting dichroic. TL, FL: achromatic tube and focusing lenses respectively. F: fluorescence emission filters.

FIG. 1B shows emission/excitation traces calculated for emission wavelength $\lambda_{em}$=685 nm, emission coherence length lC=15.3 µm and excitation wavelength $\lambda_{ex}$=642 nm (Extended Experimental Procedures (or Appendix A)).

FIG. 1C shows fluorescence intensities of the image of a 40 nm 488/645 TransFluoSphere on the CCDs as the interferometer path length is scanned using the PZM; $\lambda_{ex}$=642$_{nm}$, $\lambda_{em}$=650-720 nm (685/70 filter).

FIG. 1D show FFT amplitudes of the traces in FIG. 1C. Overlapping peaks at $k_{ex}^{mod}$, $k_{em}^{mod}$ and a separate peak at $k_{ex}^{mod}$+$k_{em}^{mod}$ are evident.

FIGS. 1E and 1F show a least-squares fitting (FIG. 1E) and corresponding FFT amplitudes (FIG. 1F) to a model (Equation (7) in Extended Experimental Procedures (or Appendix A)) with $\lambda_{ex}$=643.6±0.5 nm, $\lambda_{em}$=680.2±3.8 nm, lC=5.44±0.66 µm, with an additional 210±9 nm phase shift between excitation and emission (to account for slight relative tilt of emission and excitation wave-fronts).

FIGS. 2A-2E show tracking of single Cy5 molecules at 400 fps, 20 msec/cycle (FIGS. 2A-2E) and 2 fps, 4 sec/cycle (FIGS. 2F-2J).

FIGS. 2A and 2F show tiled Cy5 images from CCD1 and CCD2. 8 frames/cycle, 9 cycles shown.

FIGS. 2B and 2G show movement of PZM. FIG. 2B shows open-loop operation, ~1 µm range. FIG. 2G shows closed-loop operation: 56.75 nm PZM step size, 8-step cycles, PZM off-set readjusted in each cycle to lock the phase of a 40 nm sphere in the field of view; stage and top-objective adjusted every 10th cycle.

FIGS. 2C and 2H show Cy5 intensity traces.

FIGS. 2D and 2I show raw z and φ traces.

FIGS. 2E and 2J show z and φ traces after common mode subtraction. $\sigma_z$: SD of z of the combined data from both CCDs (blue traces).

FIG. 2K shows z precision (combined CCD traces) vs. number of photons collected by both CCDs. n=474, 672, 199, and 45 Cy5 molecules for 2, 5, 20 fps data, collected closed loop and 50 fps data collected open loop with a ~4 µm PZM linear ramp.

FIG. 2L shows precision vs. number of cycles for the 5 fps data. Solid line is fit to $\sigma(N)=\sigma_0+(\sigma-\sigma_0)/N^{1/2}$, $\sigma_0$=0.1 nm. See also FIGS. 9A-9Q and Table 1.

FIG. 3A show a schematic of the DNA surface tethering geometry and the two possible tethering configurations.

FIG. 3B show 3D distances between the two Cy5 dyes at the ends of LC=160 bp DNA constructs.

FIG. 3C shows distribution of $d_{xy}$ for points on the xy ring ($d_{xy}$>16.55 nm).

FIG. 3D shows distribution of dz for points on the top and bottom z lobes (black histogram, $d_{xy}$≤16.55 nm, referred to left y-axis) and for points on the xy ring (blue histogram $d_{xy}$>16.55 nm, referred to right y-axis). Solid lines are Gaussian peak fits, with $\sigma_{dxy}=(\sigma_{dx}^2+\sigma_{dy}^2)^{1/2}$=7.2 nm, for the ring radius peak (indicating $\sigma_{dx}\approx\sigma_{dy}$=5.1 nm) and $\sigma_{dz1}$=3.9 nm, $\sigma_{dz2}$=6.6 nm for the two lobe height peaks and $\sigma_{dz}$=5.1 nm for the ring height peak respectively.

FIGS. 3E-3G shows DNA contour length ($L_c$) dependence of the average (FIG. 3E) ring radius, (FIG. 3F) ring z position and (FIG. 3G) z lobe height for DNA constructs with $L_C$=70, 90, 110, 128 and 160 bp (n=97, 173, 111, 211, 272 molecules respectively). Error bars denote 95% confidence intervals. Dotted black lines: ideal rigid-rod behavior; solid red lines: linear fits. Residuals are $\sigma_{ring\_radius}$=0.97 nm, $\sigma_{ring\_height}$=0.76 nm and $\sigma_{lobe\_height}$=1.83 nm (Table 2). Blue lines: WLC fits to an expression of the form $(2\times L_p)(1-(L_p/x)^{-x/L_p})^{1/2}$, with x the contour length and LP the persistence length. The parameter a depends on the average orientation of the DNA molecule: a=1 for a perfectly horizontal molecule and a=0.5 for a molecule that can be freely oriented anywhere within a hemi-sphere. Fit parameters (±SE): LP=50 nm (fixed), a=0.88±0.02 (dashed line) and LP=26±4 nm, a=1 (fixed) (solid line) in (FIG. 3E), and LP=50±71 nm and a=0.64±0.09 (solid line) in (FIG. 3G).

FIG. 4A shows averaged SR images of single- and double-antibody labeled NPCs. Number of NPCs aligned and averaged for each image: $n_{NPC}$=150, 207, 127, 187, 73, 199, 61, 193, for nup153, nup98, Tpr, nup358, nup153-Tpr, nup98-Tpr, nup358-nup153 and nup358-nup98 respectively. Scale bar: 100 nm. The x-y images of the double-antibody labeled NPCs are z-sections of thickness ±1σ, centered on each of the two z-histogram peaks (FIG. 10H). The larger x-y spread of Tpr in the nup153-Tpr and nup98-Tpr vs. the Tpr-only aligned data might reflect flexibility in the nuclear basket that results in variable positioning of the distal ring, as often seen in electron micrographs (Jarnik and Aebi, 1991; Ris, 1989) and in anti-Tpr immunogold labeling (Frosst et al., 2002; Krull et al., 2004). The 3D SR images of individual NPCs also often show off-center Tpr localizations (FIG. 10E).

FIGS. 4B and 4C show measured average radial and axial distances, from single and double antibody images respectively. Results are shown as mean±SEM from n=3-8 independent experiments.

FIG. 4D shows a summary of measured radial and axial positions of, nup98, nup153 and Tpr epitopes, overlaid on a structural model of the human NPC (EMD-3103) obtained by cryo-EM (von Appen et al., 2015) for comparison. The axial position of Nup98 is placed at the NPC mid-plane. The nuclear basket and cytoplasmic filaments cannot be seen in the cryo-EM model and are drawn as solid lines. The size of the semi-transparent spheres denotes an uncertainty of 14.5 nm due to the finite size of primary and secondary antibodies. Scale bar: 25 nm.

FIG. 5A shows on the bottom of FIG. 5A: schematic of surface transcription on surface-tethered DNA templates and on the top of FIG. 5A: lacCONS template; gray boxes are −35 and −10 promoter elements, dashed box is extended −10-like element. RNAP runs-off after synthesis of a 300 nucleotides (nt) transcript.

FIG. 5B shows a trace of a single RNA Polymerase, showing initial stationary (I), moving (II) and final stationary (III) phases. Blue and magenta solid lines show 3-segment linear model and WLC model fits respectively (Extended Experimental Procedures (or Appendix A)). Bottom panel of FIG. 5B shows residuals δz of the WLC fit.

FIG. 5C shows distribution of RNAP run-off lengths (n=57).

FIG. 5D shows distribution of RNAP velocities (n=65). Solid line is log-normal fit, indicating a mean velocity $v_0$=36 bp/sec. See also FIGS. 10A-10J and Table 3.

FIG. 5E shows distribution of $\tau_{escape}$ (n=320). Solid line is exponential fit with $\tau_{fast}$=13 sec. Dashed rectangle highlights events at long escape lifetimes ($\tau_{slow}$~200 sec) unaccountable by the exponential fit. Parameters in FIG. 5C, FIG. 5D, and FIG. 5E are extracted from fitting to WLC model. See also FIGS. 11A-11F and Table 4.

FIG. 6A shows a schematic of DNA templates.

FIG. 6B shows example traces (sampled at 1.6 sec/cycle) from templates containing a single pause site at +28, +57, +91 and +156 nt respectively. Shaded rectangles highlighted the observed pausing. Solid lines are least-squares fits to a 5-segment linear model (see Experimental Procedures). The individual traces have been offset in the time axis for clarity. Bottom panel shows residuals δz of the 5-segment fit, alternating between open and solid symbols for each trace. The tracking precision of each trace is, from left to right, $\sigma_{\delta z}$=2.0, 3.6, 2.5, 4.9, 3.5, 2.6, 3.3 and 3.9 nm respectively.

FIG. 6C shows Example traces for the +91 nt pause constructs sampled at 200 msec/cycle (40 fps, open loop PZM operation, 8-step modulation cycles; gray lines) and filtered with 8-point adjacent-averaging (black lines).

FIG. 6D shows precision vs. number of cycles, shown as mean±SD (n=9). Solid line is fit to a $1/\sqrt{N_{cycle}}$ dependence.

FIG. 6E shows a pause plateau position (in nm) vs. pause site position (in bp) for RNAP core labeled at the C-terminus of the ω subunit. Error-bars indicate standard deviations. Dotted black line is a linear fit of the data (+21 to +91 nt range), indicating a finite 6.0±0.3 nm (SE) z offset. Red solid line: WLC model fit (see Experimental Procedures), with an apparent persistence length $L_p$=111±11 bp (SE).

FIG. 6F shows a comparison of pause plateau positions for RNAP core labeled at the C-terminus of the ω subunit vs. the N-terminus of the β subunit. Dotted lines are linear fits of the data (+21 to +57 nt range), indicating 6.1±0.3 nm (SE) and 3.8±0.2 nm (SE) z offsets respectively.

FIG. 6G shows conformational changes from open to elongation RNAP complexes. Models comparing the distances between the C- and N-termini of the E. coli RNAP ω and βsubunits respectively (magenta) and the −70 position of the DNA (measured from the center of the base-pair) in an open promoter complex (left panels) and an elongation complex (right panels). The RNAP core is shown as a grey molecular surface and is in the same orientation in both views in each row, while the bottom panels are rotated ~180° relatively to the top. In the holoenzyme (left panels), the $\sigma^{70}$ subunit is colored green. The DNA is colored dark grey except in the open promoter complex, the promoter −35 element is colored yellow. (left panels) The model is based on an E. coli RNAP open promoter complex crystal structure (Zuo and Steitz, 2015), but with the upstream DNA extended with B-form DNA. (right panels) The model is based on an elongation complex structural model (Korzheva et al., 2000). See also FIG. 12 and Table 5.

FIG. 7A shows a schematic of multi-color system.

FIG. 7B shows Cy3B-$\sigma^{70}$ and Alexa 647-core z vs. time traces for the 3 postulated sigma release models.

FIGS. 7C and 7D show intensity (FIG. 7C) and z traces (FIG. 7D) of Alexa 647-core/Cy3B-$\sigma^{70}$ doubly-labeled RNAP holoenzyme, indicating determined promoter escape ($\tau_{escape}$) and sigma release ($\tau_{release}$) times respectively. Squares in (FIG. 7C) denote average intensities in each modulation cycle. 75.24 nm PZM step size, 6-step cycles, closed-loop operation (phase locked every cycle, xyz of stage and top objective locked every $10^{th}$ cycle). The data gap between 5.5 and 9 sec corresponds to interruption of data acquisition while the feedback control performs xyz adjustments. The z tracking precision for Alexa 647-core, given by the SD of the residuals from the WLC-fit, is 6.5 nm, while the temporal uncertainty in the onset of RNAP movement, given by the standard error in the fitted parameters, is 0.6 sec.

FIG. 7E shows tiled images of the acquired frames, showing Alexa 647 and Cy3B ROIs. Note the complete disappearance of the Cy3B spot.

FIG. 7F shows a distribution of $\tau_{release}$ (n=27). Solid line is fit to a convolution of an exponential decay with a Gaussian peak function, described in equation (13), indicating a characteristic release time $\tau_0$=0.25±0.22 sec (SE).

FIG. 8A shows a schematic of experimental setup (see FIG. 1 for details), zooming into the space between the 2 opposed objective lenses. The interference of the two counter-propagating laser excitation beams creates a standing-wave pattern between the lenses. Two molecules separated by distance δz are shown. Molecule 1 is at a z position of constructive interference (maximum of excitation) and is thus fluorescent, while Molecule 2 is at a z position of destructive interference (zero of excitation) and is thus dark. As the piezo-electric mirror (PZM) moves, the path traveled by the bottom laser beam shortens, thus causing a displacement of the excitation interference pattern between the lenses.

FIG. 8B shows that the intensities of the 2 molecules oscillate, and in the simplest case where the fluorescence emission collected by the two lenses is not coherently superimposed on the CCDs, the intensities of the two molecules follow simple sinusoidal oscillations, given by equation (6). The phase lag between the 2 oscillations can then be used to estimate the axial separation $\delta z$ between the two molecules.

FIGS. 8C-8G show examples of cases were both excitation and emission interfere. The intensities of a single emitter are calculated from equation (7).

FIG. 8C shows that $\lambda_{ex}$=594 nm, $\lambda_{em}$=705 nm, $\Delta\lambda$=20 nm, corresponding to $l_c$=24.9 µm and $\lambda_{ex\text{-}em}$=2.17 µm.

FIG. 8D shows that $\lambda_{ex}$=642 nm, $\lambda_{em}$=680 nm, $\Delta\lambda$=0 nm, corresponding to $l_c$=∞ and $\lambda_{ex\text{-}em}$=11.5 µm.

FIG. 8E shows that same parameters described FIG. 8D but with $\Delta\lambda$=50 nm, corresponding to $l_c$=9.25 µm.

FIG. 8F shows a schematic of two molecules axially separated by 4 periods of the standing wave pattern.

FIG. 8G shows intensity traces for two molecules (solid and dashed lines respectively), separated by 4 periods as shown in (FIG. 8F), for the parameters in (FIG. 8E) and refractive index η=1.33. The physical separation is $\delta_z$=4× $\lambda_{ex}$/2η=965.41 nm, corresponding to differential path length modulation $\delta(\delta)$=4×$\lambda_{ex}$=2568 nm.

FIG. 9A shows that a simulated time series of $n_{cycle}$=1,000 cycles of $n_{step}$=6 steps each was generated. In each time point j∈{0,5} of cycle k, the photon counts $N_j^k$ is a random number from a Poisson distribution with mean value $$\frac{Nphotons}{n_{step}} \times \left[1 + \cos\left(\frac{2\pi j}{n_{step}} + \varphi_k\right)\right],$$

where $\varphi_k$ is a uniformly distributed random phase in [0,2π]. The phase was estimated in each cycle by finding $\varphi_k^{est}$ that maximizes $$A(\varphi) = \sum_j^k \cos\left(\frac{2\pi j}{n_{step}} + \varphi\right).$$

The precision obtained $((\varphi_k^{est}-\varphi_k)^2)^{1/2}$ (black squares), agrees with the 1/(Nphotons)$^{1/2}$ shot-noise limit (solid line).

FIGS. 9B-9E show an estimation of random error by differential tracking between 2 CCDs.

Figure 9A:
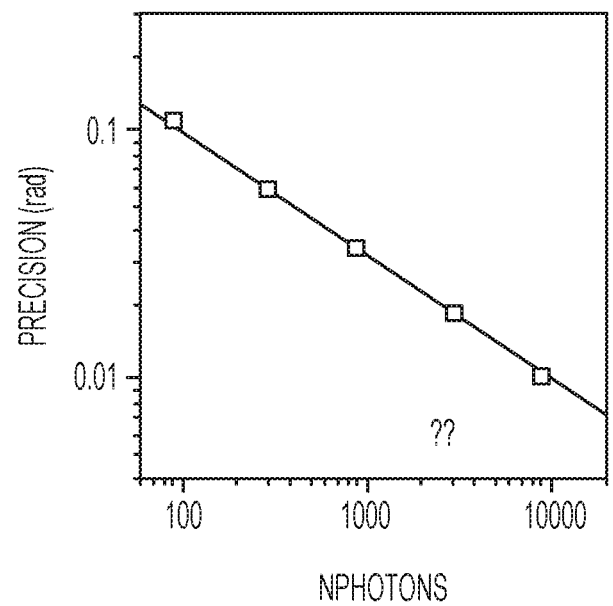
FIGS. 9A-9Q show a detailed account of localization uncertainties, related to FIG. 2.
Figure 9B:
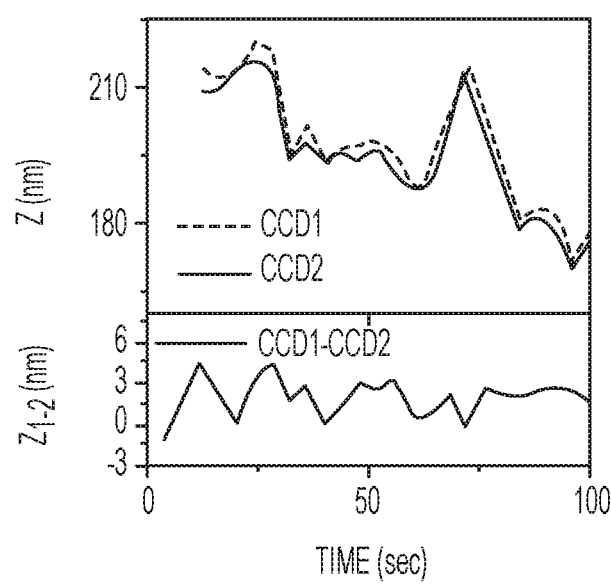

FIG. 9B show z traces of a Cy5 molecule obtained from CCD1 and CCD2 (top) and differential trace $z_{1-2}$ (CCD1-CCD2, bottom). Data acquisition was performed at 2 fps, with 8 steps/cycle PZM modulation (see FIG. 2).

Figure 9C:
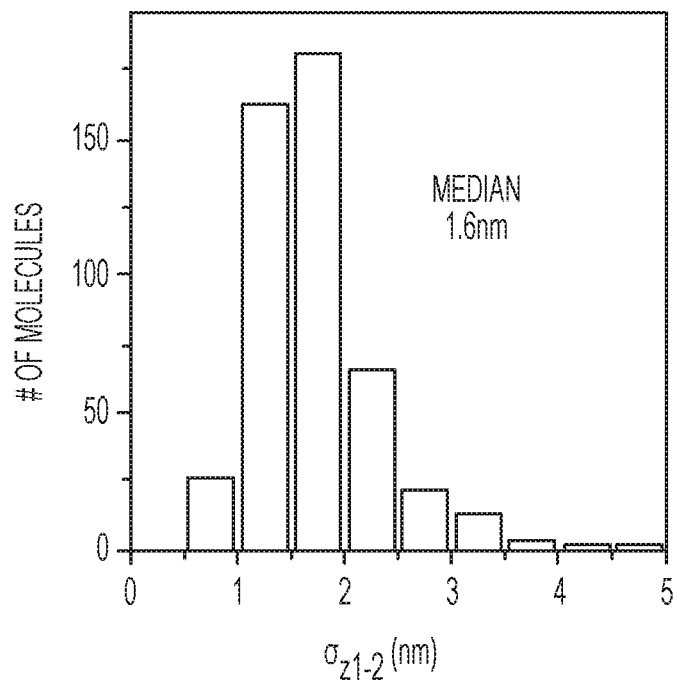

FIG. 9C shows a histogram of differential precision $\sigma_{z1-2}$, n=474 Cy5 molecules.

Figure 9D:
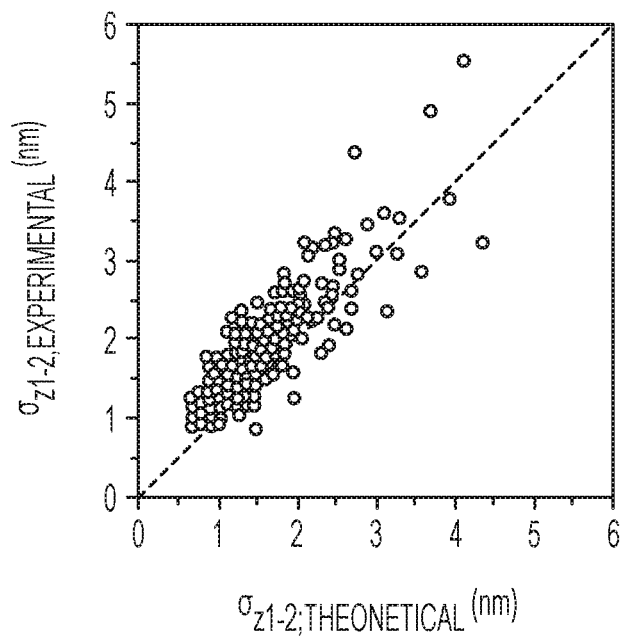

FIG. 9D shows a scatter-plot of theoretical differential precision $\sigma_{z1-2;theoretical}$ based on number of photons and background calculated using equation (10) vs. experimental $\sigma_{z1-2;experimental}$. Dashed line: slope=1.

Figure 9E:
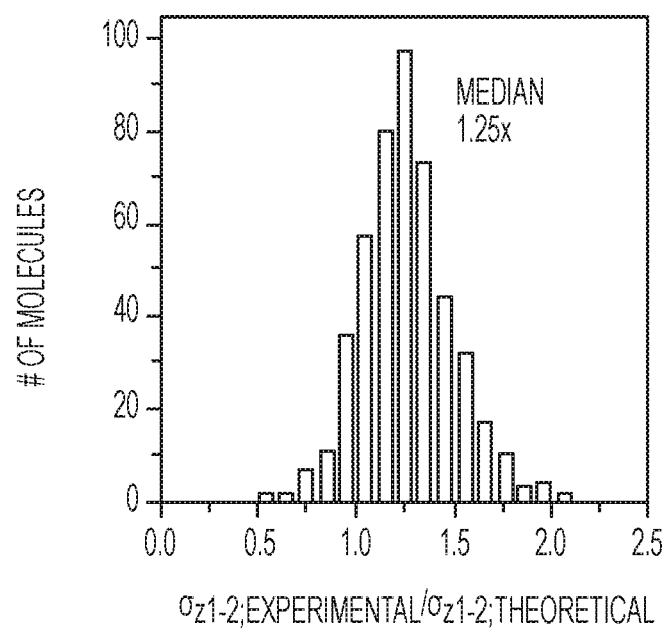

FIG. 9E shows a histogram of $\sigma_{z1-2;experimental}/\sigma_{z1-2;theoretical}$ ratio that indicates experimental performance within ~1.25× of theoretical limit.

FIGS. 9F-9I show excess noise after common-mode subtraction.

Figure 9F:
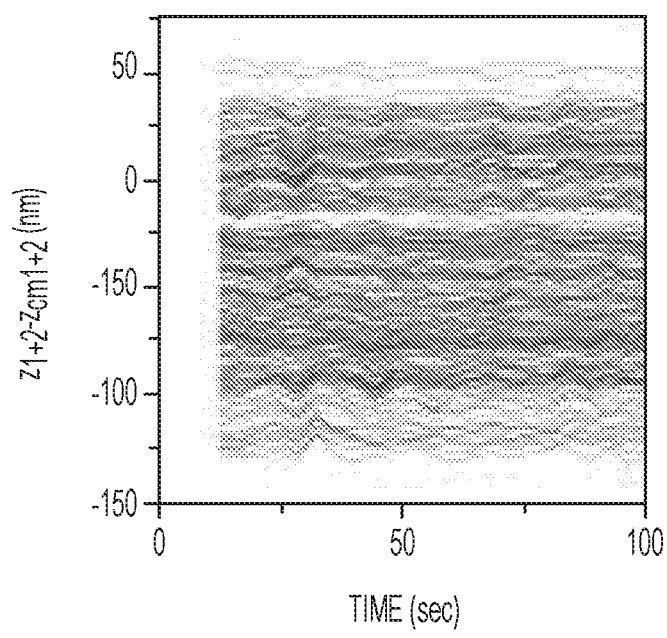

FIG. 9F shows traces of Cy5 molecules obtained using combined phases from both CCDs, $z_{1+2}\text{-}z_{cm;1+2}$.

Figure 9G:
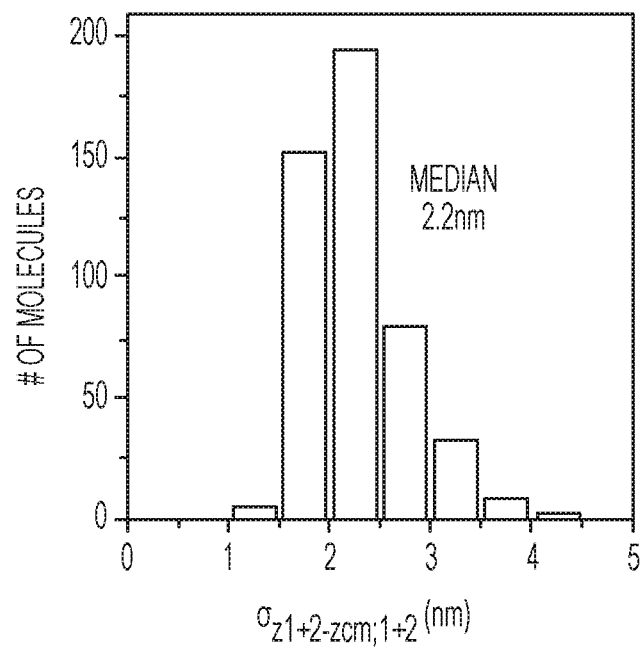

FIG. 9G shows a histogram of residual noise $\sigma_{z1+2}\text{-}zc_{m;1+2}$ after common mode subtraction. Common-mode estimated as the average trace of all the Cy5 molecules in the field of view.

Figure 9H:
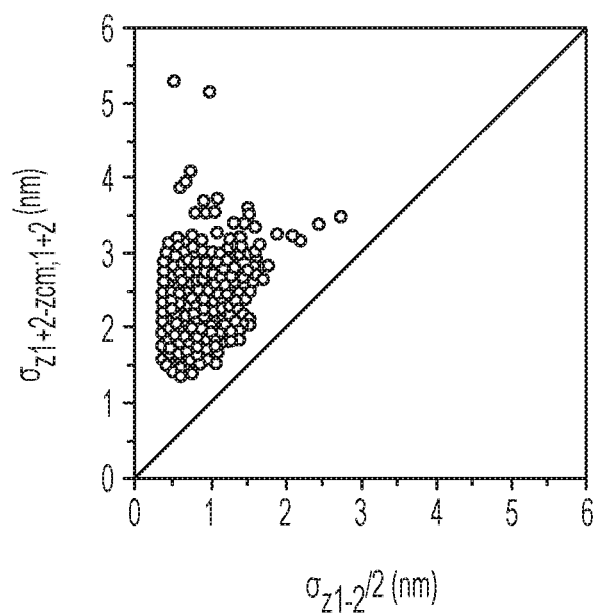

FIG. 9H shows a scatter-plot of $\sigma_{z1+2\text{-}zcm;1+2}$ vs. $\sigma_{z1-2}/2$. Dashed line: slope=1.

Figure 9I:
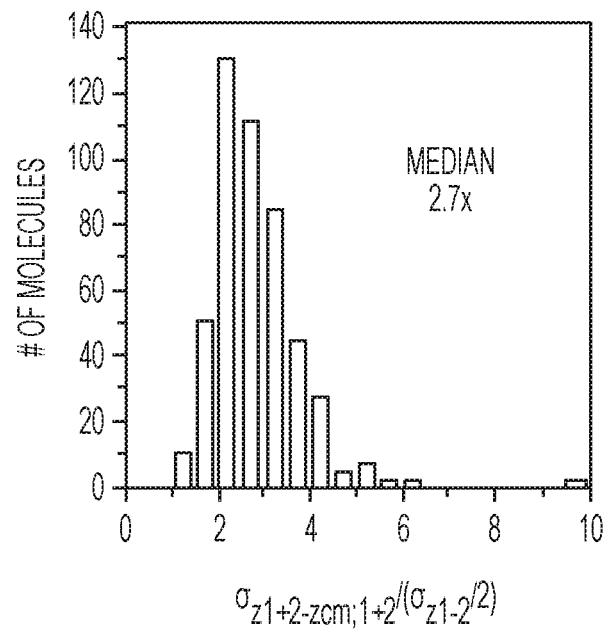

FIG. 9I shows a histogram of $\sigma_{z1+2\text{-}zcm;1+2}/(\sigma_{z1-2}/2)$ ratio indicates 2.7× higher excess noise than expected.

FIGS. 9J-9P show a spatial dependence of systematic errors and improved correction.

Figure 9J:
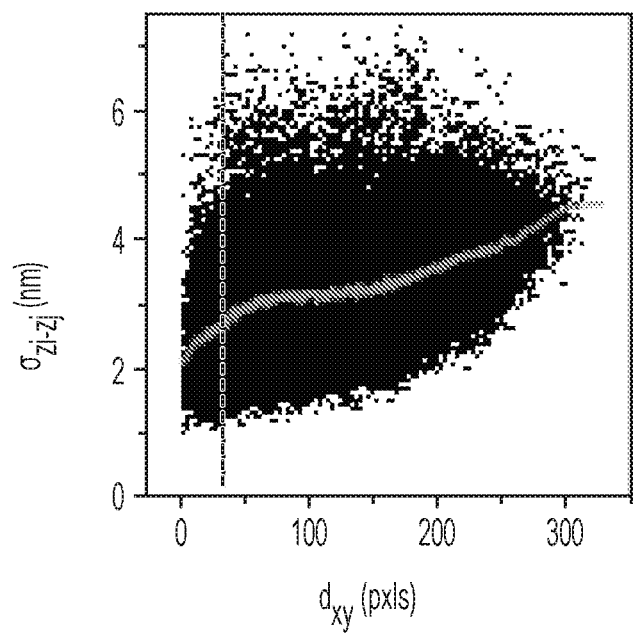
Figure 9K:
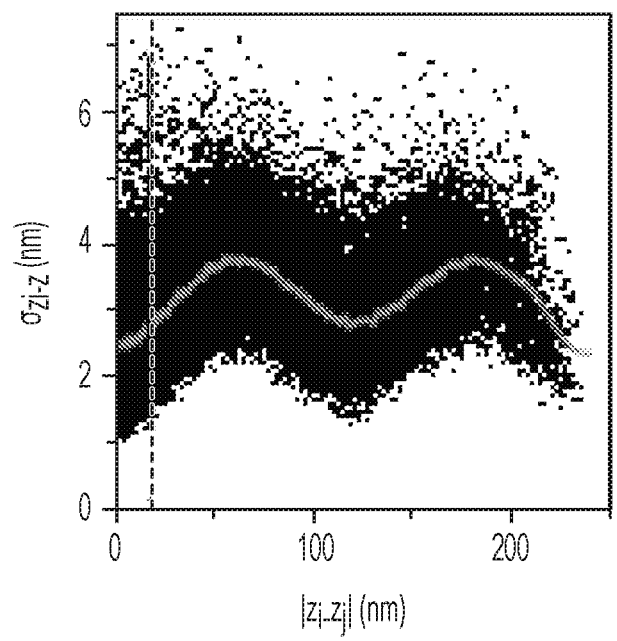

FIG. 9J and FIG. 9K show characterization of spatial dependence of excess noise. Dependence of relative z fluctuations $\sigma_{zi\text{-}zj}$ for molecule pairs (i,j) on (FIG. 9J) distance $dxy_{ij}$ between molecules on the CCD and (FIG. 9K) absolute phase/z difference $|z_i-z_j|$. Red lines are 1,000 point averages. Dashed vertical lines indicate $dxy_{ij}$=35 pxls and $|z_i-z_j|$=16.07 nm distance and absolute z cut-offs.

Figure 9L:
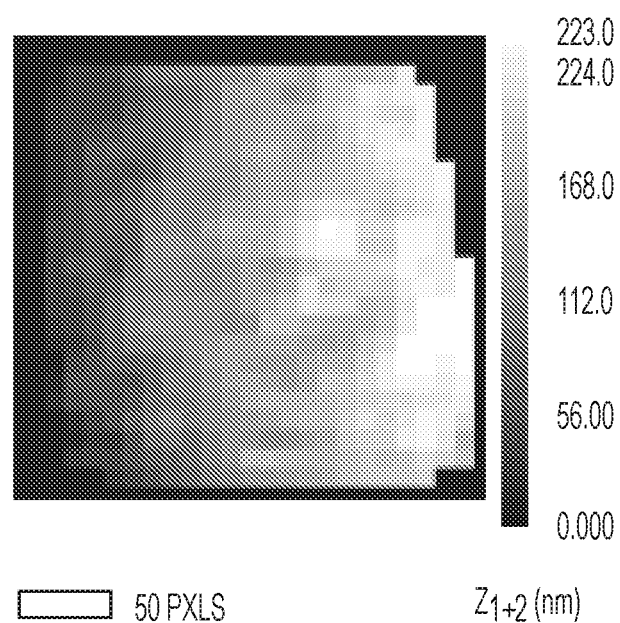

FIG. 9L shows a profile of absolute z (phase) over the field of view (250×250 pixels2), showing spatial variation 0-241 nm (0-2π) over 250 pixels=36.2 µm (thus a ~0.006 relative tilt between excitation fringes and coverslip).

Figure 9M:
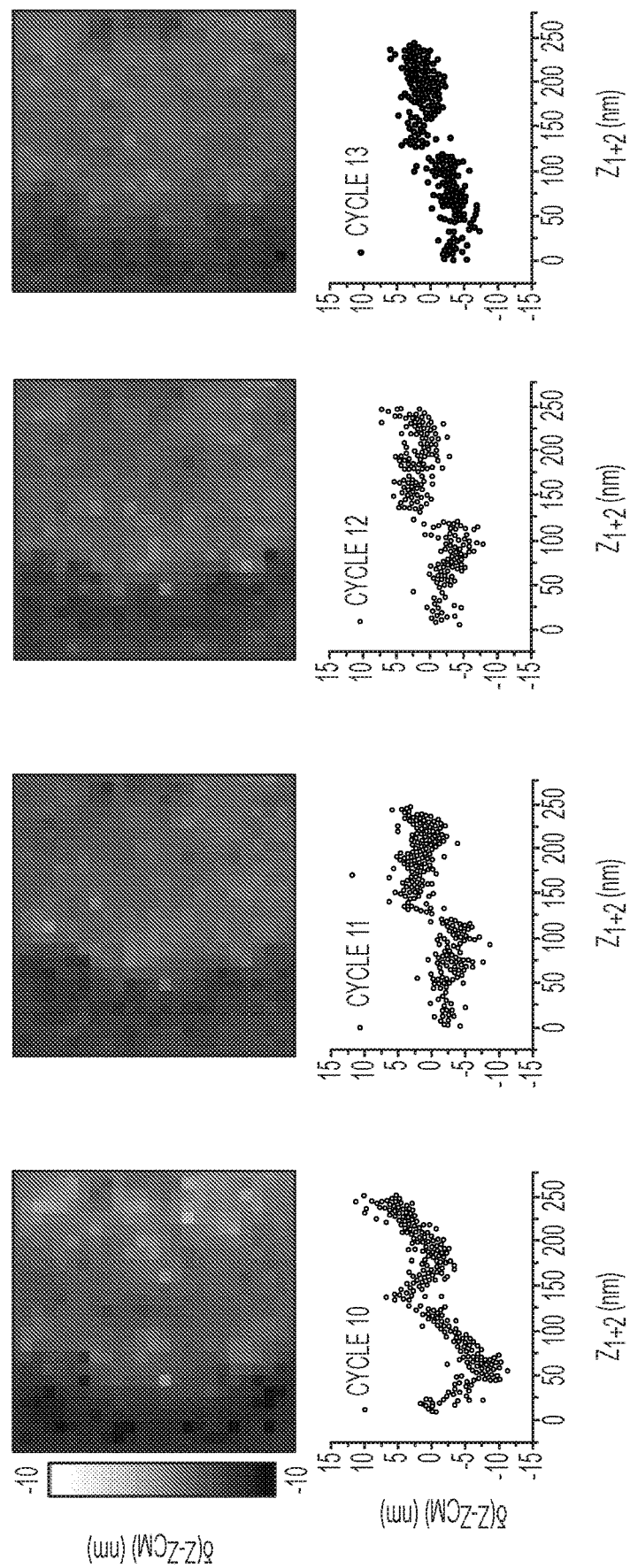

FIG. 9M shows a spatial and temporal variation of systematic errors. Top panels show the spatial profile of the systematic deviation $(z - z_{cm})=z - z_{cm}-(z - z_{cm})$ for 4 consecutive cycles. Bottom panels show the dependence of $\delta(z-z_{cm})$ on the absolute z values. Z-dependent systematic deviations can be up to ±10 nm and the spatial profile changes from one cycle to the next.

Figure 9N:
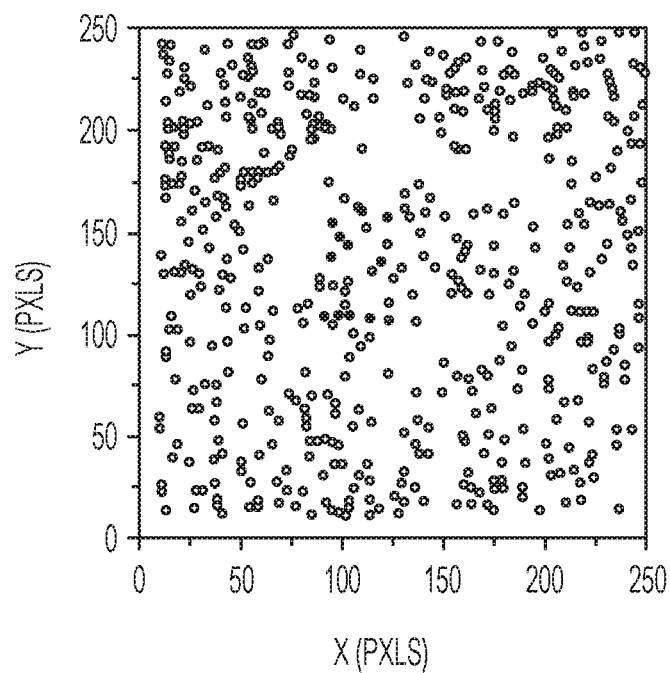
Figure 9O:
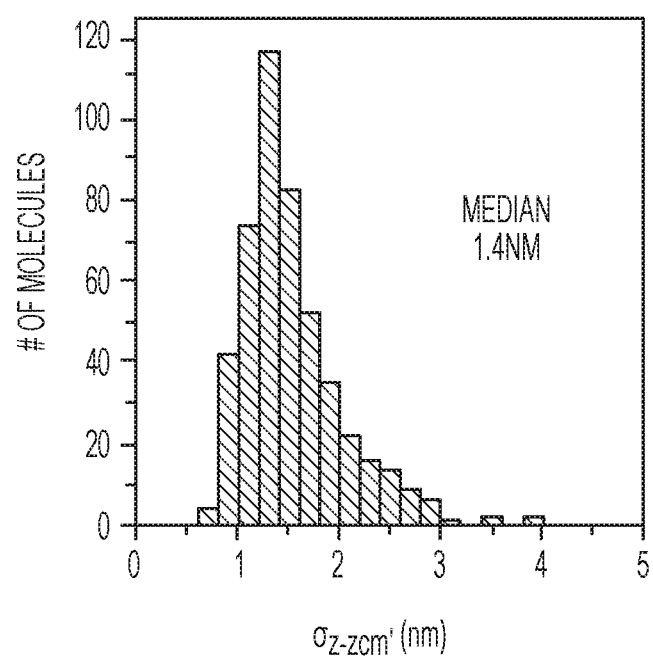
Figure 9P:
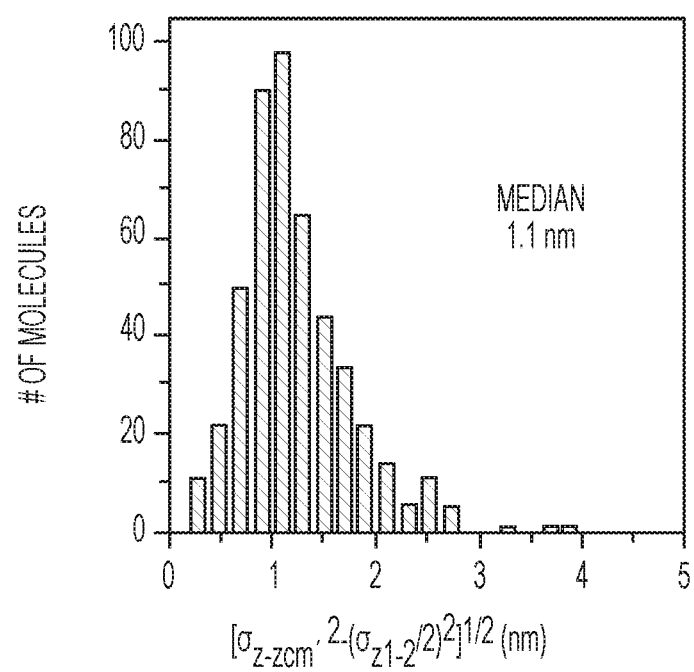

FIGS. 9N-9P show a proximity-based common-mode correction.

FIG. 9N shows positions of n=474 Cy5 molecules in the field of view and highlighted (red circles) molecules that are used to correct molecule i=233 at (x,y)=(119.76,134.44) (solid black circle).

FIG. 9O shows a histogram of residual noise $\sigma_{z\text{-}zcm's}$ after common mode subtraction. For each molecule the common-mode correction was performed by subtracting the average trace $z_{i;cm}$ of molecules with $dxy_{ij}$<35 pxls and $|z_i-z_j|$<16.07 nm.

FIG. 9P shows a histogram of excess error $$\sqrt{\sigma_{z\text{-}zcm'}^2 - \frac{\sigma_{z1-2}^2}{4}}.$$

Figure 9Q:
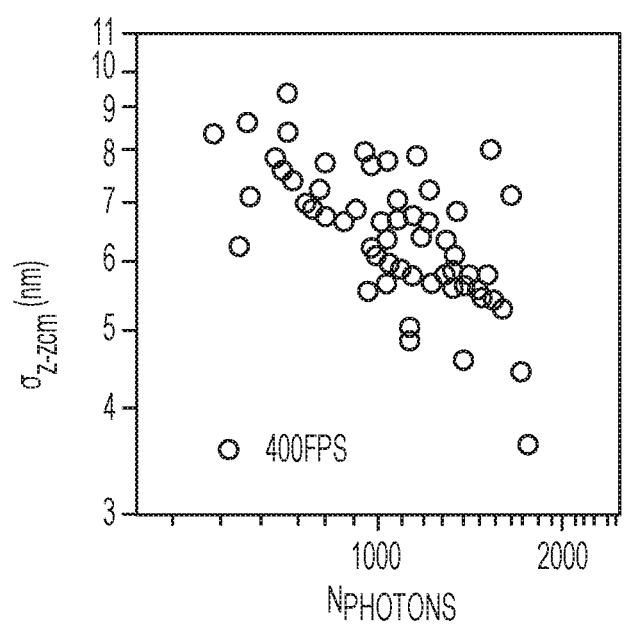

FIG. 9Q shows a scatter plot of precision vs. number of photons (obtained from both CCDs), for fast tracking of single Cy5 molecules (n=64) at 20 msec/cycle (400 fps, open loop ~1 µm PZM movement range, see FIGS. 2A-2E).

FIGS. 10A-10J show 3D SR imaging of NPCs in U2-OS cells, related to FIGS. 4A-4D. xy projection SR images of NPCs on the lower nuclear envelope of U-2 OS cells, labeled with nup153 (FIG. 10A) and nup153-Tpr (FIG. 10C) antibodies.

Figure 10A:
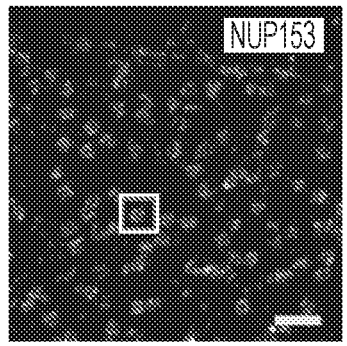
Figure 10B:
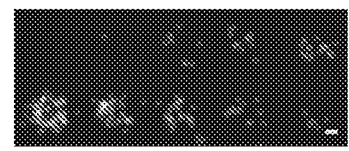
Figure 10C:
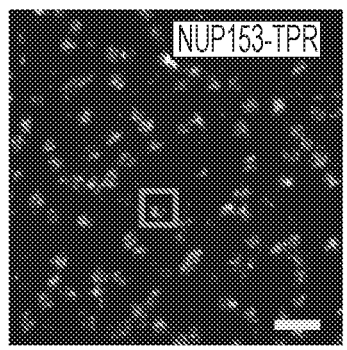
Figure 10D:
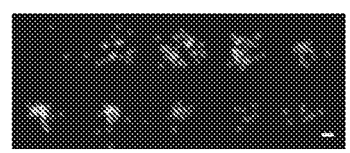

FIG. 10B and FIG. 10D show ROIs of single NPCs corresponding to the red squares in FIG. 10A and FIG. 10C. Sub-panels correspond to consecutive z-sections (24 nm-thick), spanning a full interferometric period.

Figure 10E:
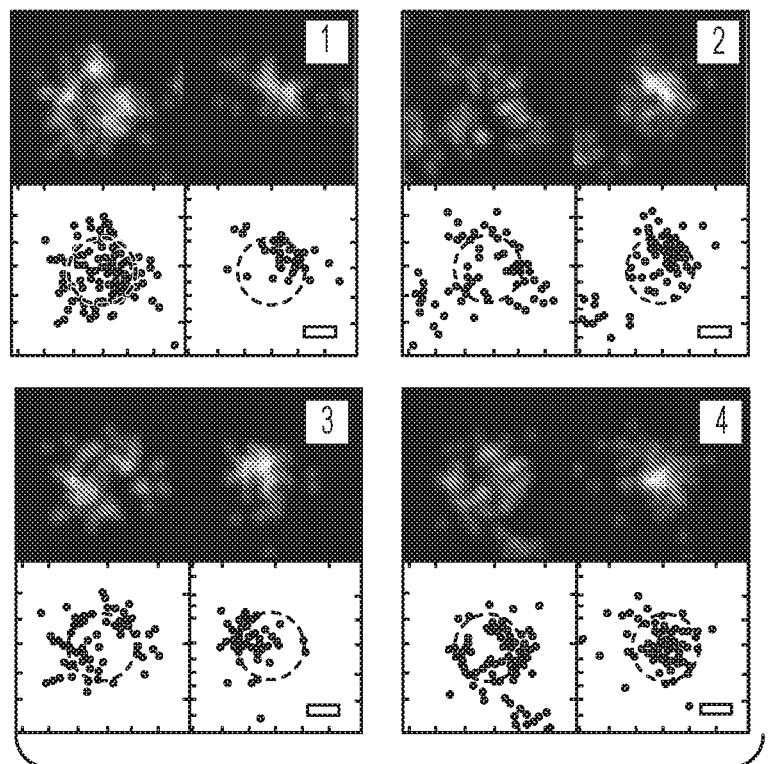

FIG. 10E shows images of four individual nup153-Tpr labeled NPCs (1-4), showing the position of Tpr localizations relatively to the center of the nup153 ring. Top sub-panels show z-sections (thickness ±√2σ), corresponding to nup153 (top-left) and Tpr (top-right). Bottom subpanels show xy-scatter plots of respective localizations. Red dashed circles are circular fits to the nup153 data.

Figure 10F:
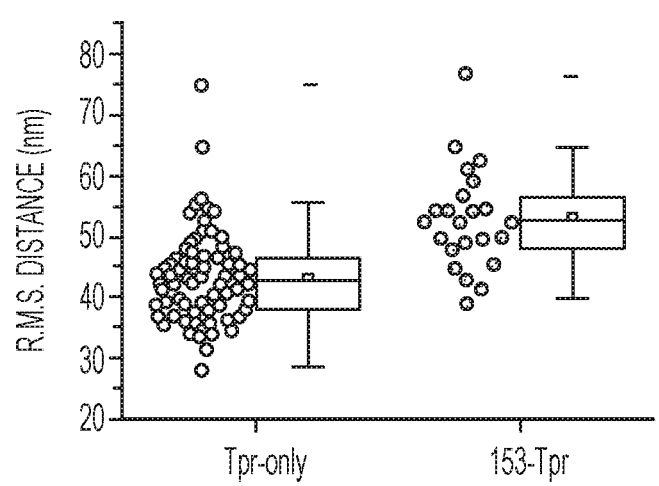
Figure 10I:
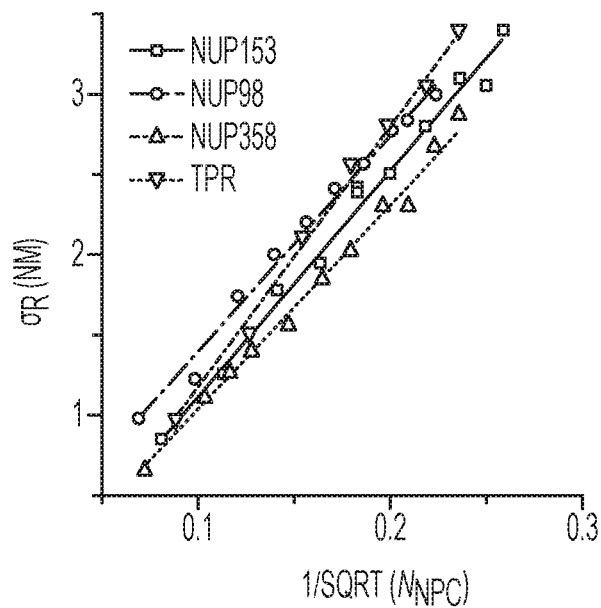
Figure 10J:
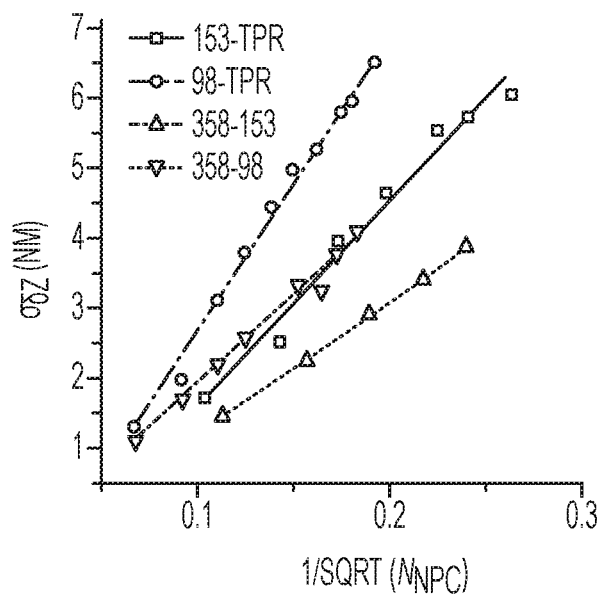

FIG. 10F shows box plots of r.m.s. distances of Tpr localizations from the Tpr center (reflecting the apparent size of Tpr-labeled nuclear baskets; n=98 Tpr-only single-labeled NPCs), compared to r.m.s. distance from the nup153 center (reflecting the combination of apparent size of Tpr-labeled nuclear baskets and radial displacement of the nuclear basket off the NPC axis; n=23 nup153-Tpr double-labeled NPCs).

Figure 4A:
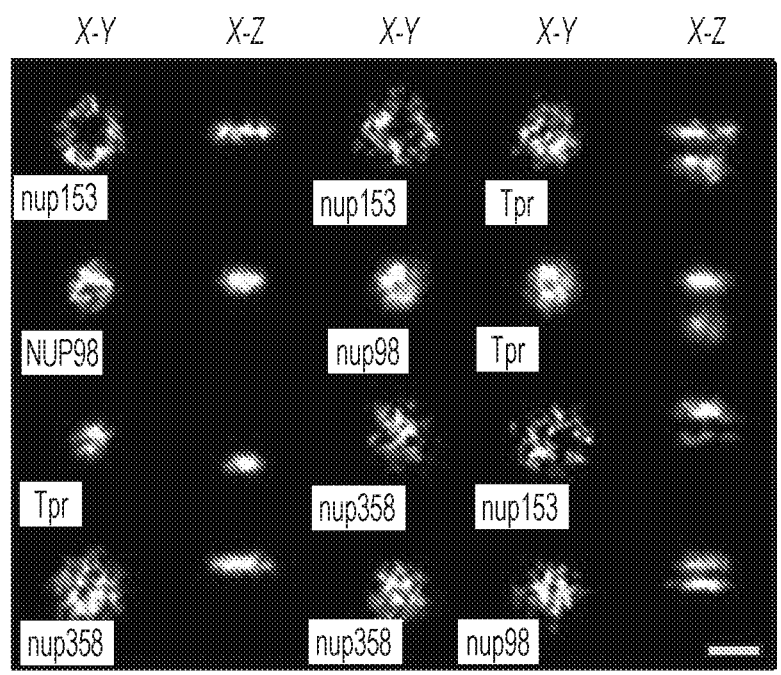
FIGS. 4A-4D show 3D super-resolution imaging of nuclear pore complexes in human U-2 OS Cells.
Figure 4B:
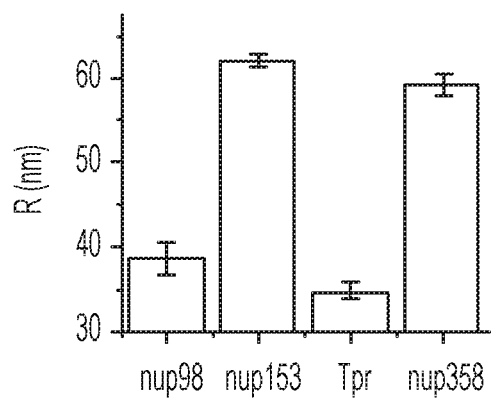
Figure 4C:
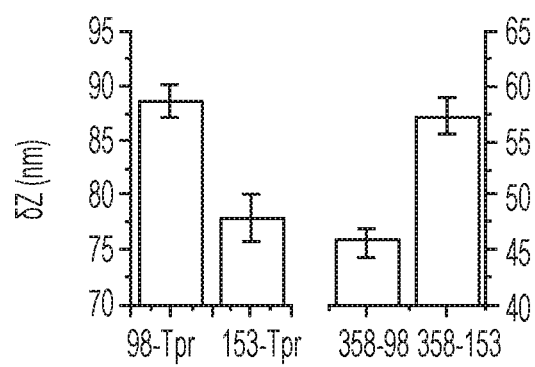
Figure 4D:
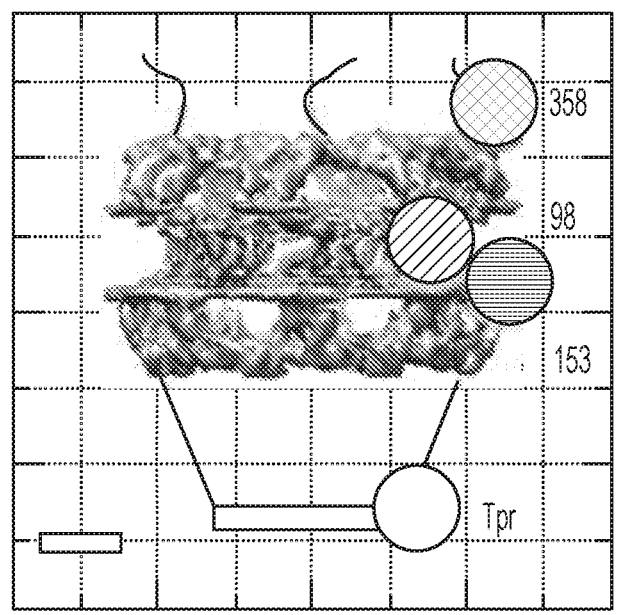

FIG. 10G and FIG. 101H show radial (FIG. 10G) and axial densities (FIG. 10H) of averaged SR images from multiple NPCs, corresponding to panels in FIG. 4A. Solid red lines are non-linear least-squares fits to a circularly-permutated Gaussian (of the form $$e^{\frac{r^2+R^2}{2\sigma^2}} I_0\left(\frac{R}{\sigma^2}r\right),$$

where R: ring radius and σ: standard deviation) and a double-Gaussian peak respectively. Dashed vertical lines indicate the fitted radius and peak positions. (J) Precision of R and Δz vs. number of NPCs determined by re-sampling random sub-sets of the data. Scale bars: (FIG. 10A, FIG. 10C) 500 nm, (FIG. 10B, FIG. 10D, FIG. 10E) 50 nm.

FIGS. 11A-11F shows RNAP sliding movement control experiments, related to FIGS. 5A-5E.

Figure 11A:
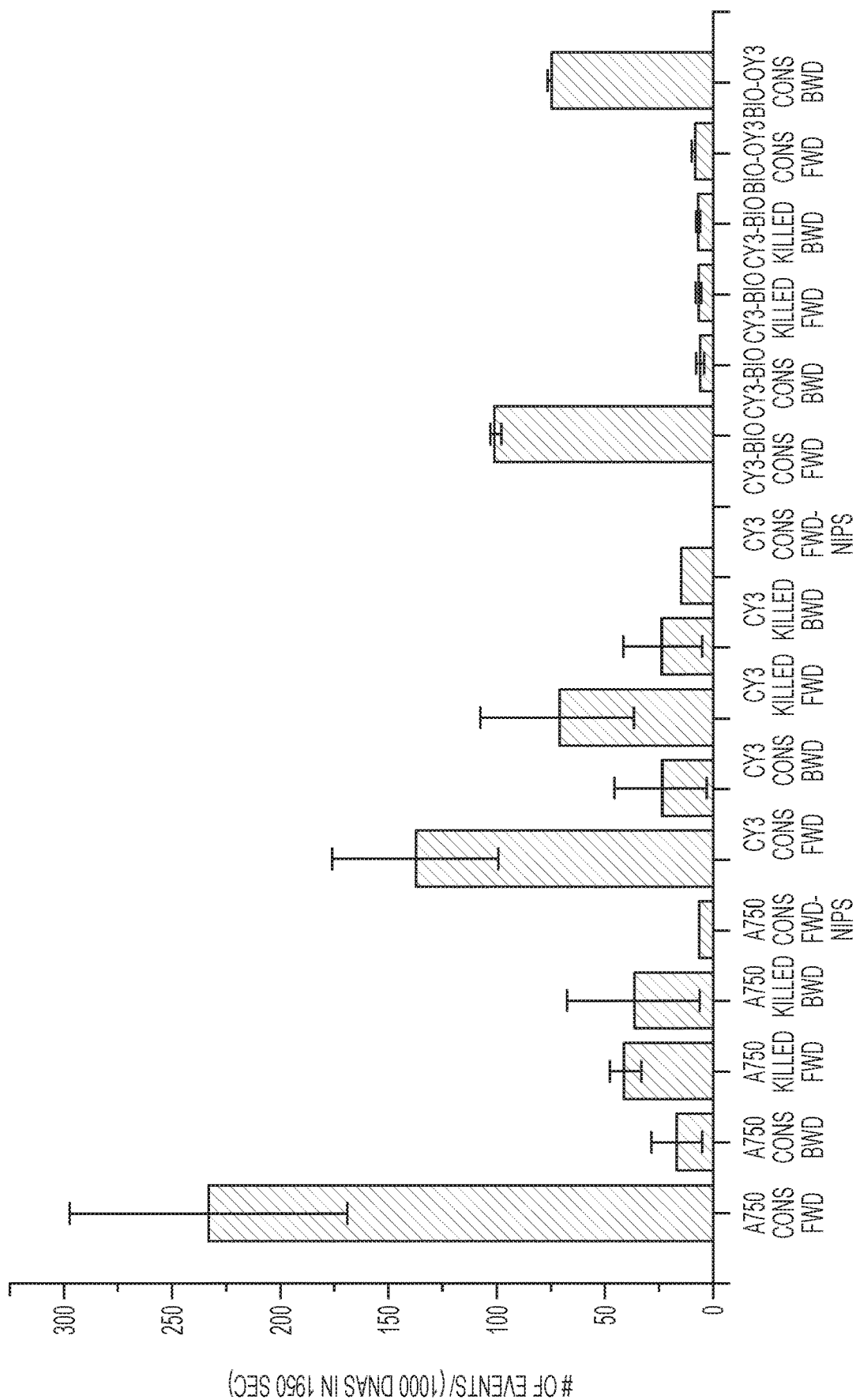

FIG. 11A shows data from Table 4 normalized to number of RNAP sliding events observed per 1000 DNA templates, per 1950 seconds. Error bars are s.d.

FIG. 11B shows transcription run-off bulk assay were performed with −170 . . . +200 (FIGS. 10E-10F) and −70 . . . +300 DNA templates (FIGS. 5A-5E). The expected 200 nt and 300 nt transcripts are observed only from promoter-specific initiation (promoter sequences C: lacCONS, K: lacKILLED). Promoter-specific transcripts are observed in both the presence (+) and absence (−) of oxygen scavenger components and for either promoter orientations (towards the Cy3 end (+) or towards the biotin end (−), corresponding away from and towards the surface when tethered, respectively). For either 5' dye choice (Alexa 750 or Cy3) the promoter-specific 300 nt transcript is observed. The bands at 370 nt correspond to transcripts that initiated from the ends of the duplexes, independent of the promoter. The bands that are longer than the total template length (370 bp) most likely correspond to transcripts created by template switching (Izban et al., 1998; Nudler et al., 1996; Oostra et al., 1981).

Figure 11C:
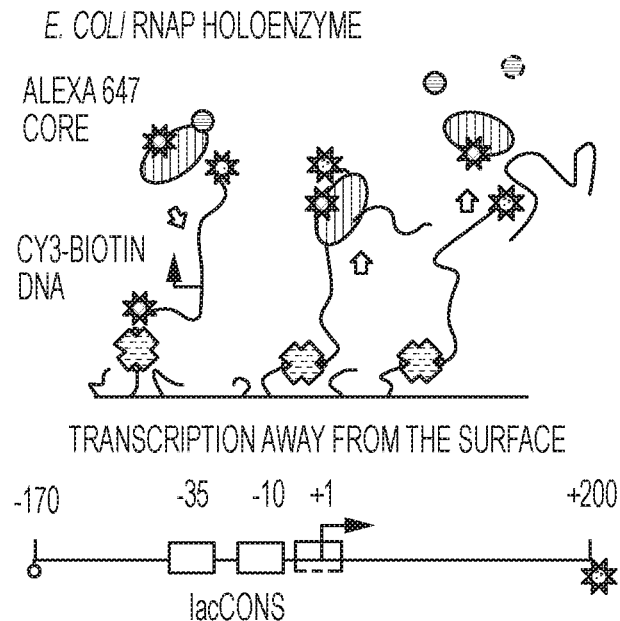

FIG. 11C shows a schematic of 370 bp construct −170 . . . +200 tethered with promoter downstream direction away from surface.

Figure 11D:
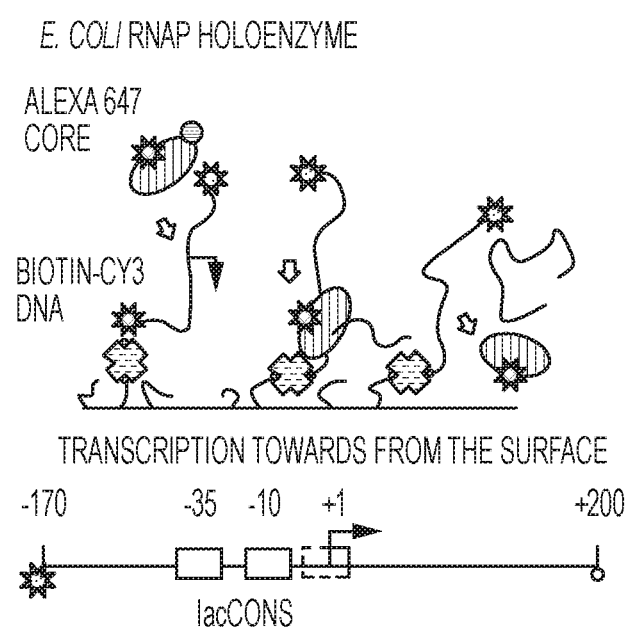

FIG. 11D shows a schematic of 370 bp construct −170 . . . +200 tethered with promoter downstream direction towards the surface.

Figure 11E:
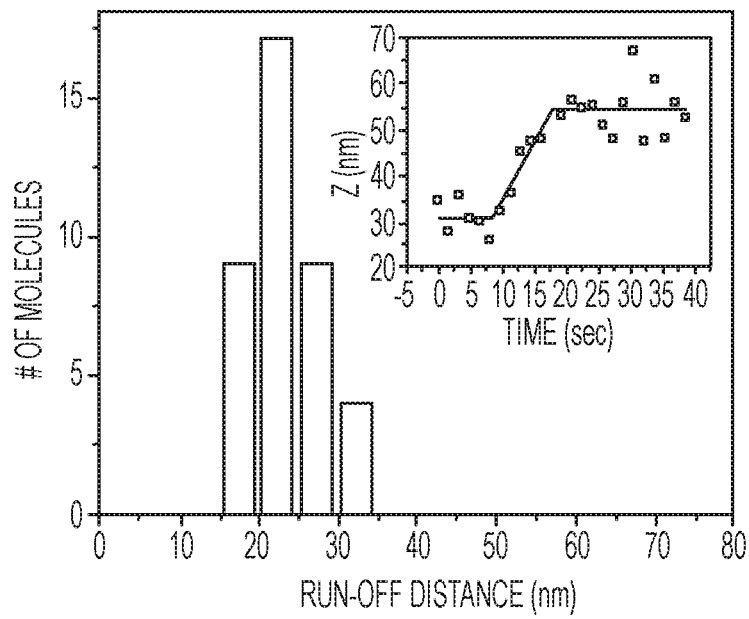

FIG. 11E shows a distribution of run-off lengths from constructs in (FIG. 10C), peaking at +23 nm. Inset shows RNAP movement away from the surface (+z direction).

Figure 11F:
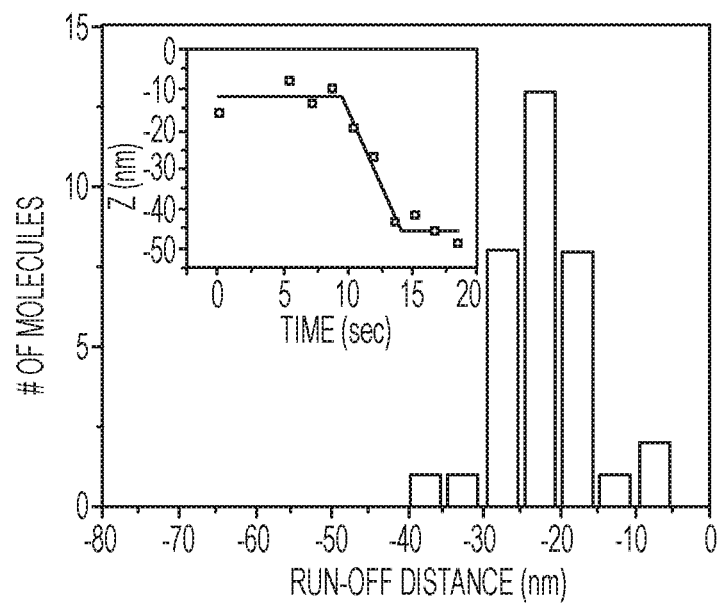

FIG. 11F shows a distribution of run-off lengths from constructs in (FIG. 10D), peaking at −23 nm. Inset shows RNAP movement towards the surface (−z direction).

Figure 12:
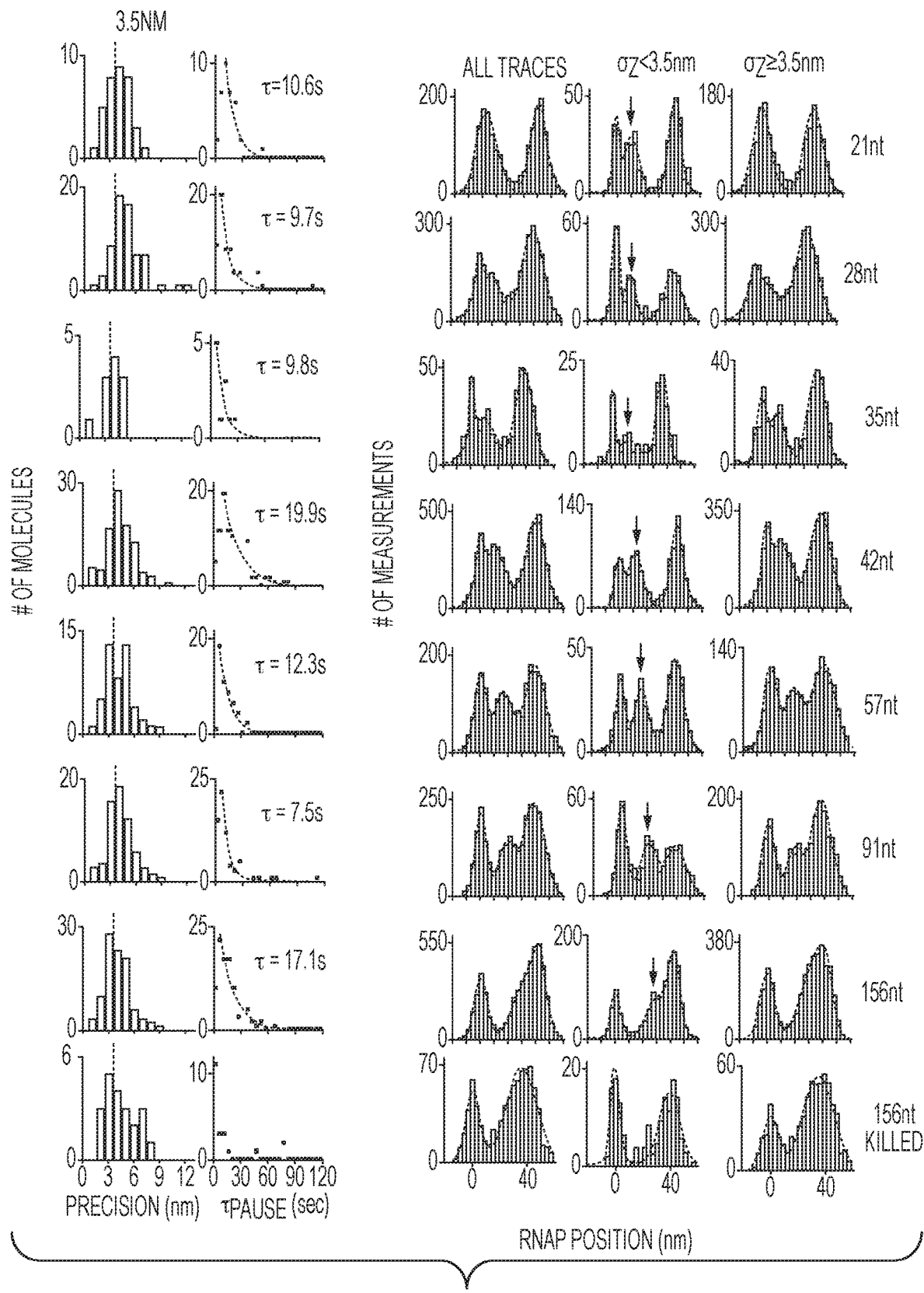

FIG. 12 shows RNAP Pausing, Related to FIGS. 6A-6E. Tracking precision histograms ($1^{st}$ column), pause duration histograms ($2^{nd}$ column) and aligned traces ($3^{rd}$, $4^{th}$, and $5^{th}$ columns) for various pausing constructs. Number of traces n=35, 66, 11, 89, 48, 67, 95, 21 for 21 nt, 28 nt, 35 nt, 42 nt, 57 nt, 91 nt, 156 nt consensus pause and 156 nt killed pause constructs respectively. Solid lines are single exponential ($\tau_{pause}$ histograms) and 2 or 3 Gaussian peaks (RNAP position histograms). The paused RNAP density (indicated by arrows) is resolved with much higher contrast in the sub-set of traces with tracking precision σz better than 3.5 nm ($4^{th}$ column) rather in the total population ($3^{rd}$ column) or in the traces with tracking precision worse than 3.5 nm ($5^{th}$ column).

FIGS. 13A-13H show bulk-level biochemistry assays, related to FIGS. 7A-7F.

Figure 13A:
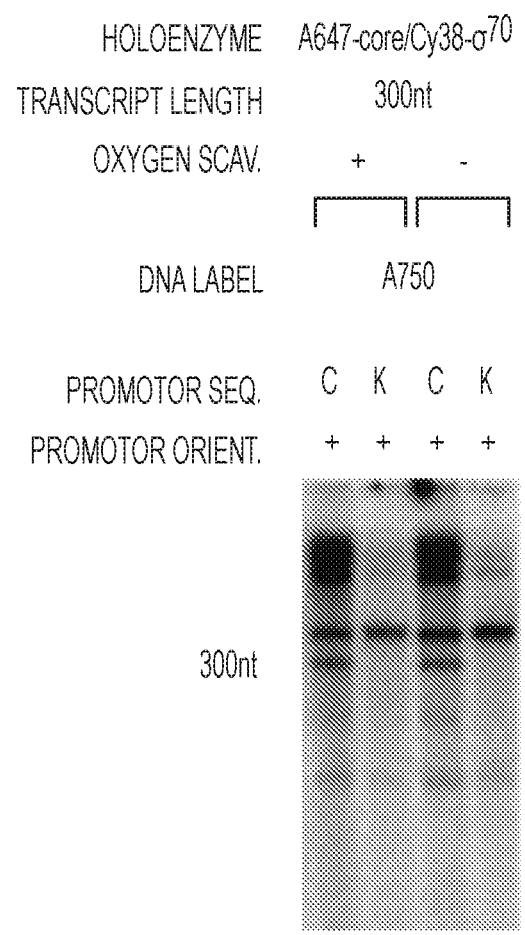

FIG. 13A shows transcription run-off bulk assay shows that the expected promoter-specific initiation 300 nt transcripts are observed when using doubly-labeled RNAP holoenzyme (Alexa 647-core/Cy3B-670) in both the presence (+) and absence (−) of oxygen scavenger components.

Figure 13B:
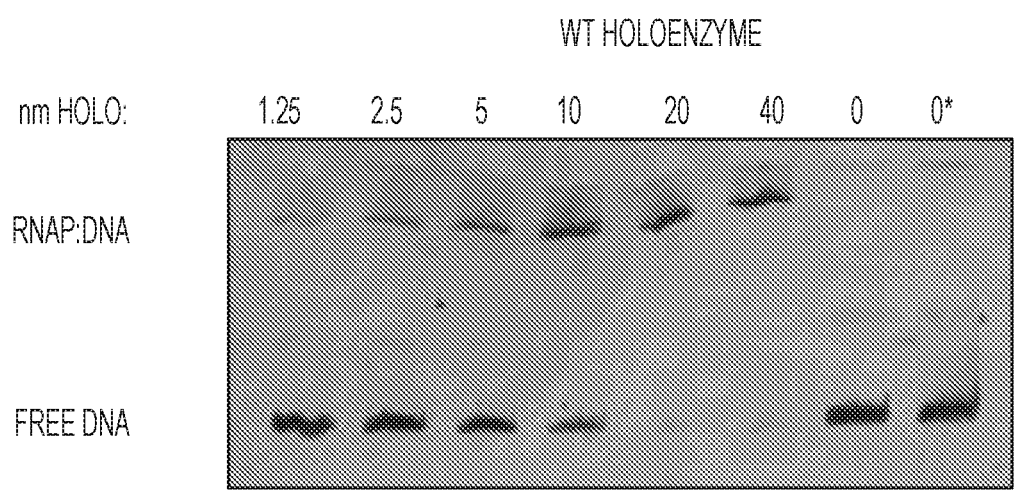
Figure 13C:
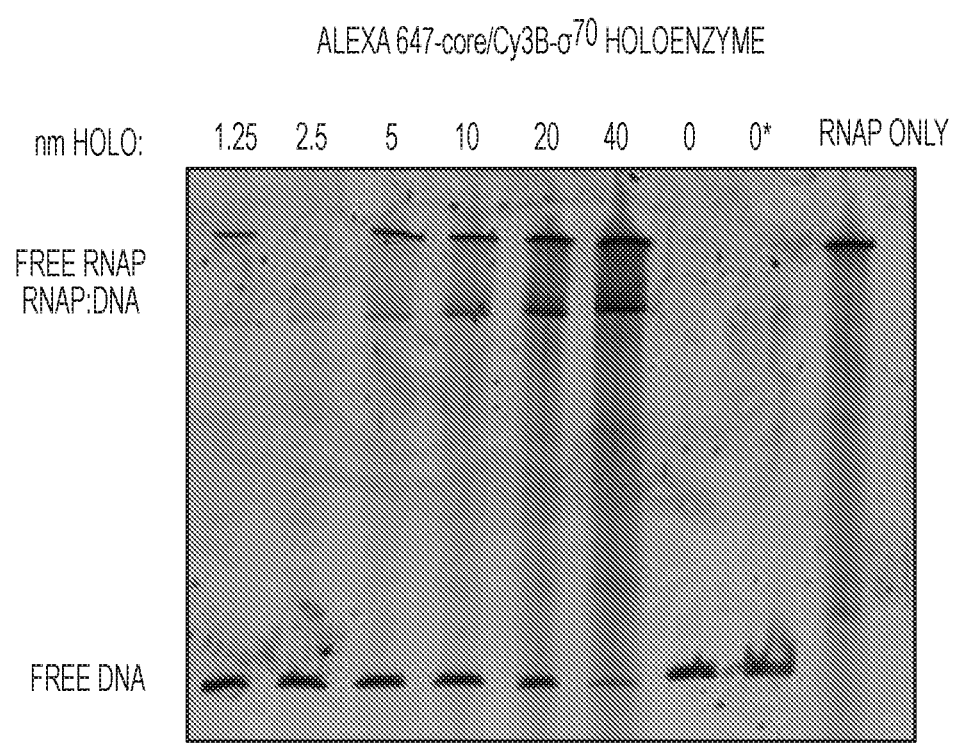
Figure 13D:
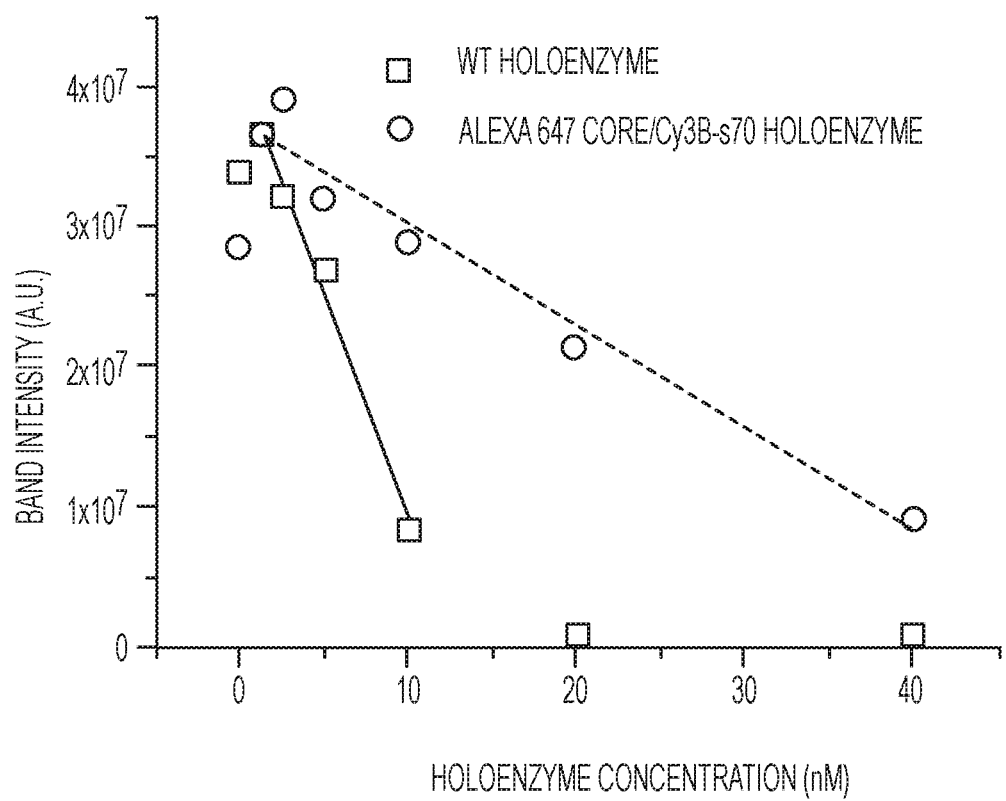

FIGS. 13B-13D show gel-shift assays that were performed with 10 nM 370 bp lacCONS Cy3-DNA templates, using WT RNAP holoenzyme (FIG. 12B) and Alexa 647-core/Cy3B-$\sigma^{70}$ fluorescently labeled holoenzyme (FIG. 12C) respectively. Note that since RNAP contains fluorescent Cy3B-$\sigma^{70}$, the gel in FIG. 12C was run longer that in FIG. 12D to separate RNAP:DNA bands from free RNAP bands. Lanes marked 0*: DNA only, loaded in buffer without heparin. Since the concentration of DNA template is greater than 10-fold above the equilibrium association constant ($K_D$<1 nM) for open-complex formation, the amount of free DNA is expected to decrease linearly with the concentration of active RNAP holoenzyme (i.e. RNAP holoenzyme capable for open-complex formation).

FIG. 13C shows the quantification for the free DNA bands in FIGS. 13B and 13C. The specific activities, 78% and 20% for the WT and labeled RNAP holoenzymes respectively (2 experiments), are within the expected range of preparation-to-preparation variability (Chamberlin et al., 1979).

Figure 13E:
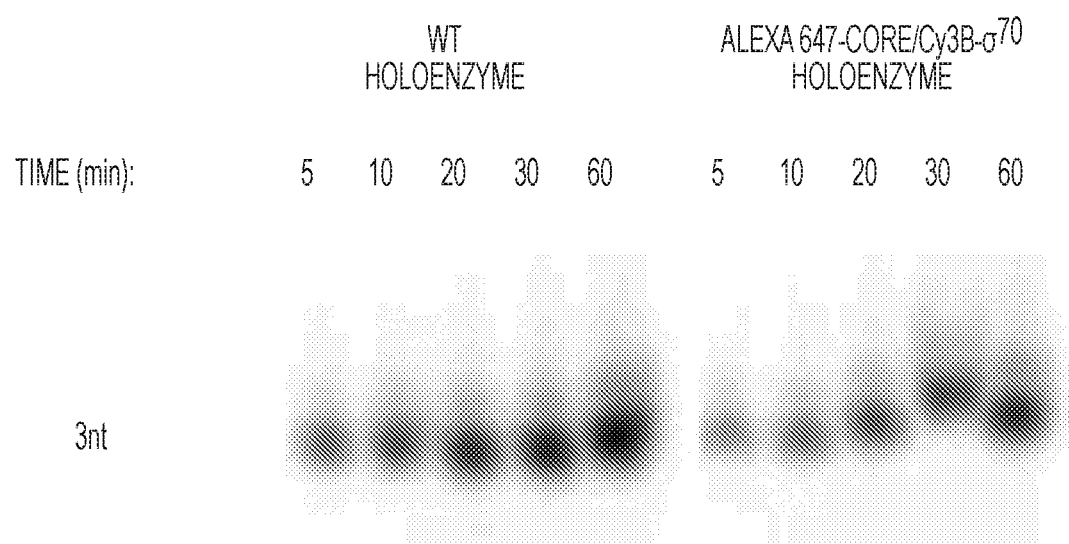
Figure 13F:
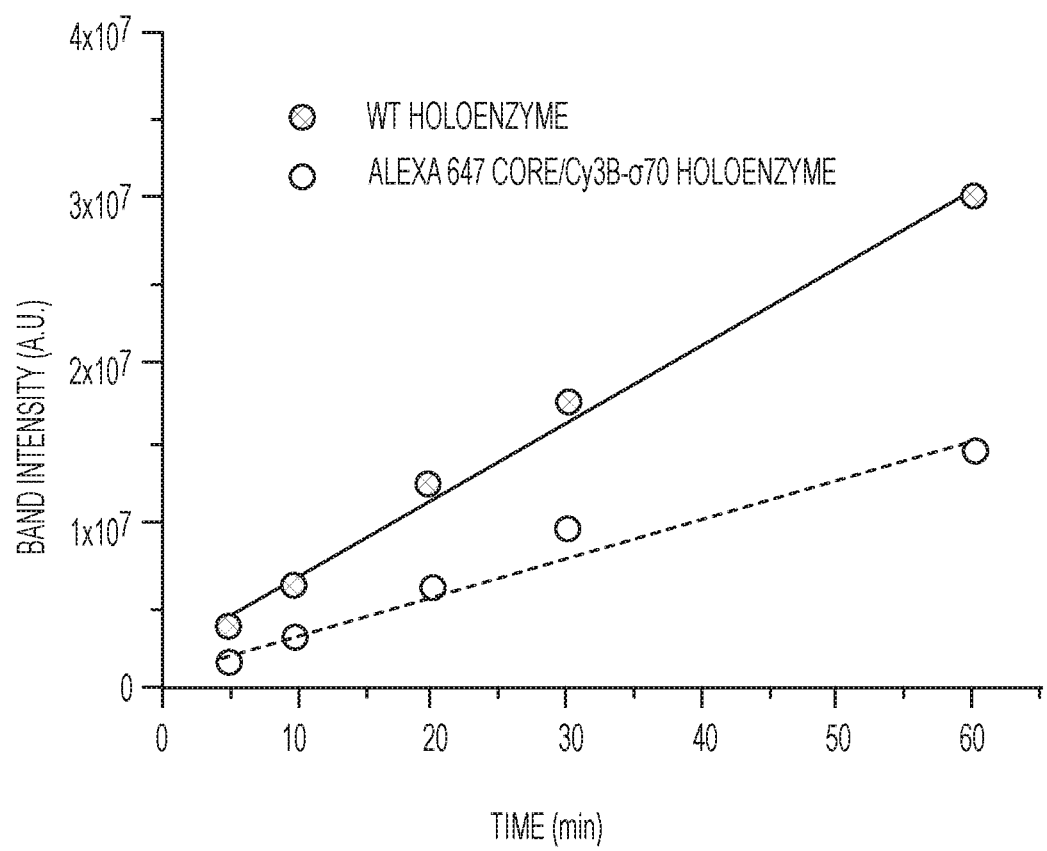

FIGS. 13E and 13F show a time course of 3 nt abortive RNA production was visualized for WT and Alexa 647-core/Cy3B-$\sigma^{70}$ fluorescently labeled holoenzymes on lacCONS promoter DNA (FIG. 13E). Quantification of the rates of abortive transcription (FIG. 13F) indicates 1.8-fold higher rate for WT vs. labeled RNAP (mean from 4 experiments). Solid/dashed lines in (FIG. 13F) are linear fits. Based on the specific activities of the WT and labeled RNAP holoenzymes, at 40 nM RNAP and 10 nM DNA about 100% and 80% of DNAs contain WT and labeled RNAP open complexes respectively. Thus, the abortive transcription rate of WT RNAP is ~1.4× higher than the labeled RNAP.

Figure 13G:
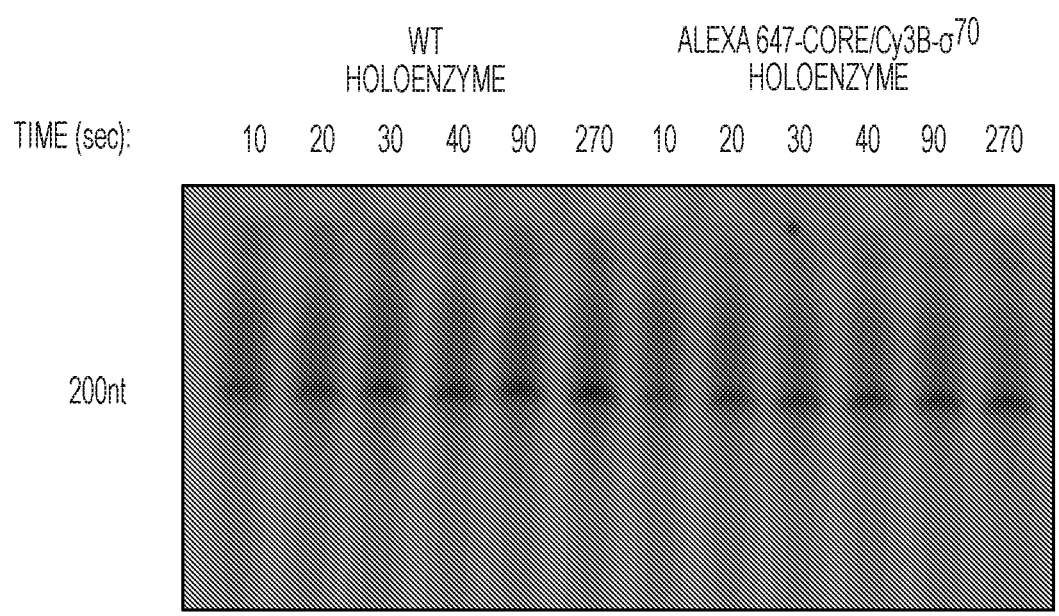
Figure 13H:
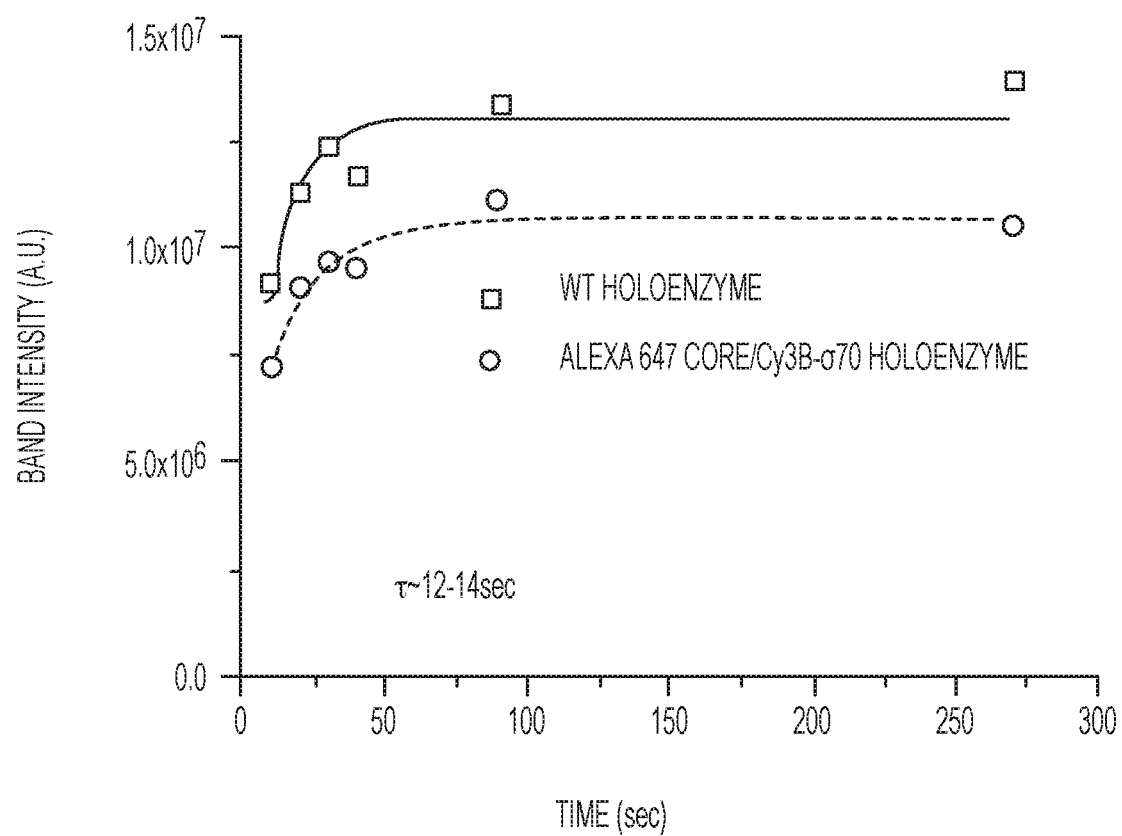

FIGS. 13G and 13H show a time course of single-round transcription reactions that produce a 200 nt run-off product from the lacCONS promoter (FIG. 13G) using WT and Alexa 647-core/Cy3B-$^{70}$ fluorescently labeled RNAP holoenzymes. Quantification of RNA bands (FIG. 13H) shows very similar rates (12 sec vs. 14 sec; mean from 2 experiments) for WT and labeled RNAP respectively. Solid/dashed lines are exponential fits to the data. The total RNA yield, which reflects the fraction of RNAP complexes that can clear the promoter and produce a full-length product, is ~1.3× higher (mean from 2 experiments) for WT vs. labeled RNAP. Correcting for 100% WT vs. 80% labeled open complexes formed at 40 nM RNAP/10 nM DNA, the efficiency of WT vs. labeled RNAP holoenzymes in single-round transcription is virtually indistinguishable (~1.04-fold difference).

FIGS. 14A-14J show a side-by-side comparison of single-molecule transcription from lacCONS and lacUV5 promoters at 35° C., related to FIGS. 7A-7F.

Figure 14A:
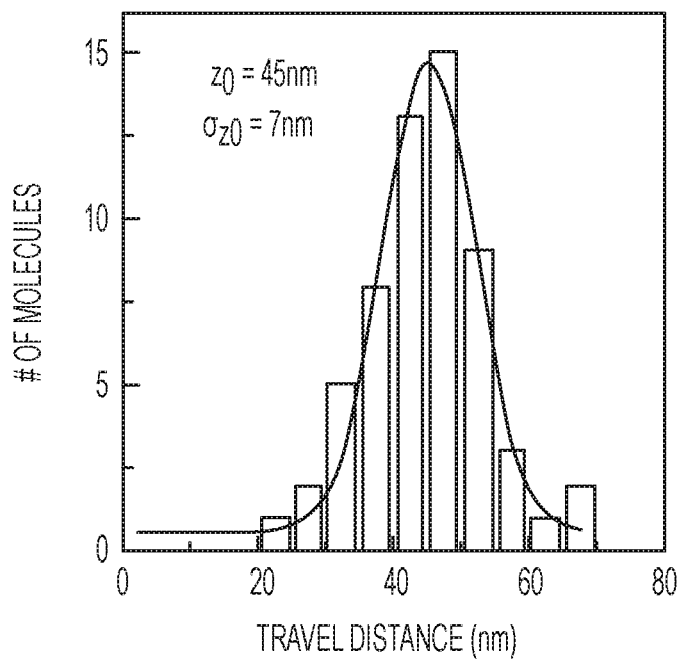
Figure 14B:
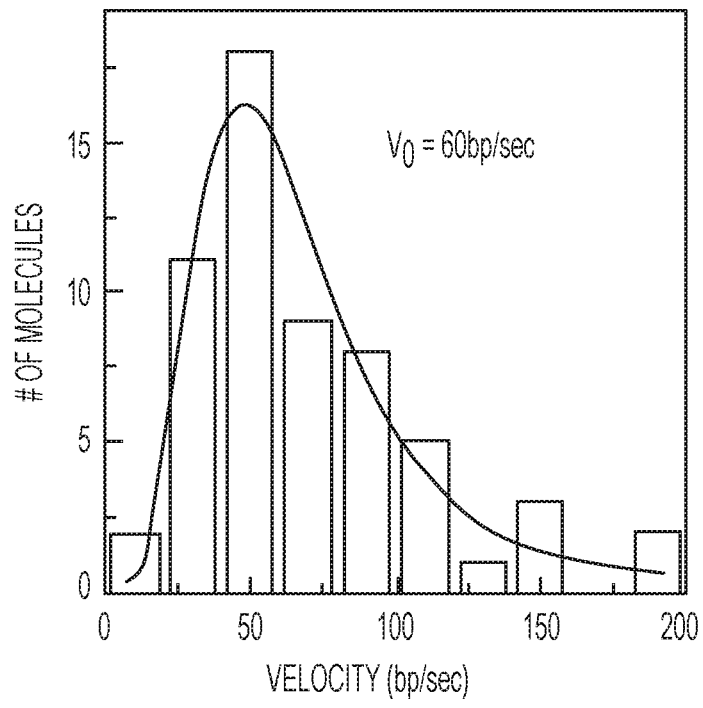
Figure 14C:
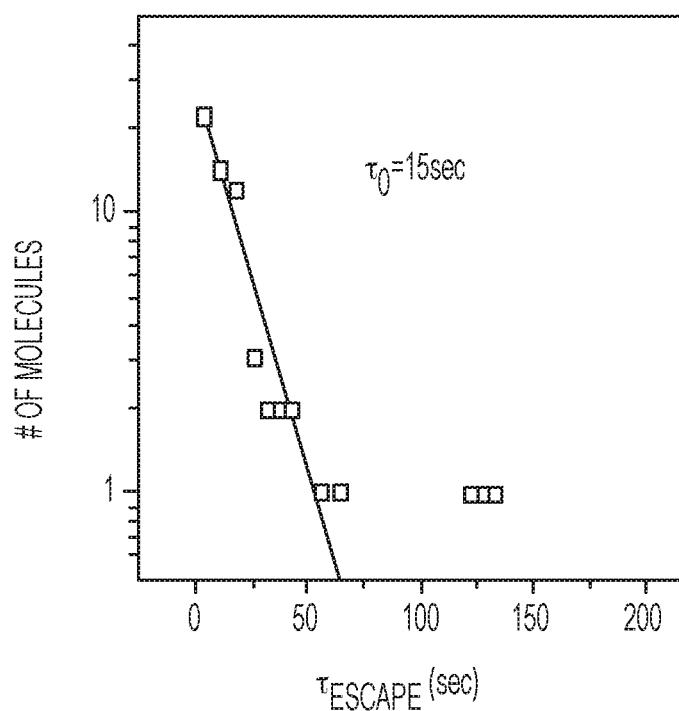
Figure 14D:
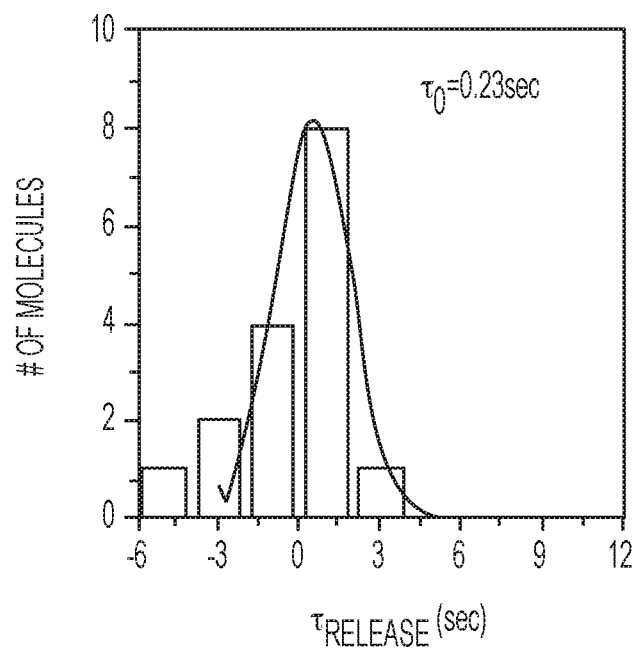
Figure 14E:
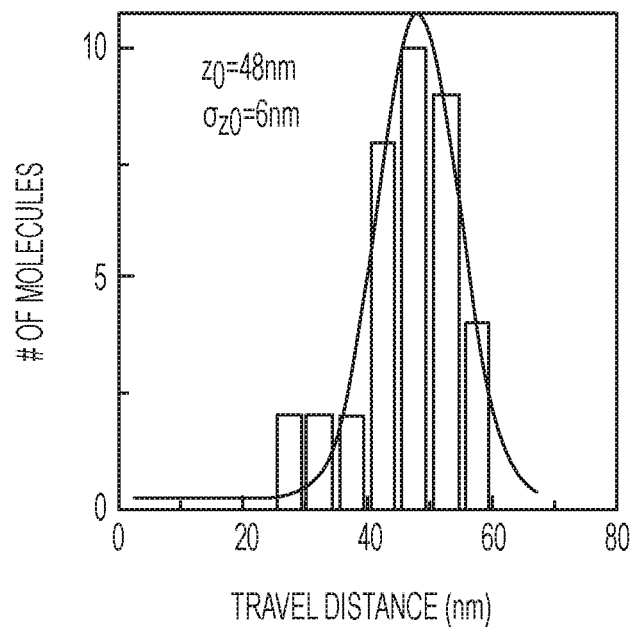

FIGS. 14A and 14D show distributions of RNAP run-off lengths.

Figure 14F:
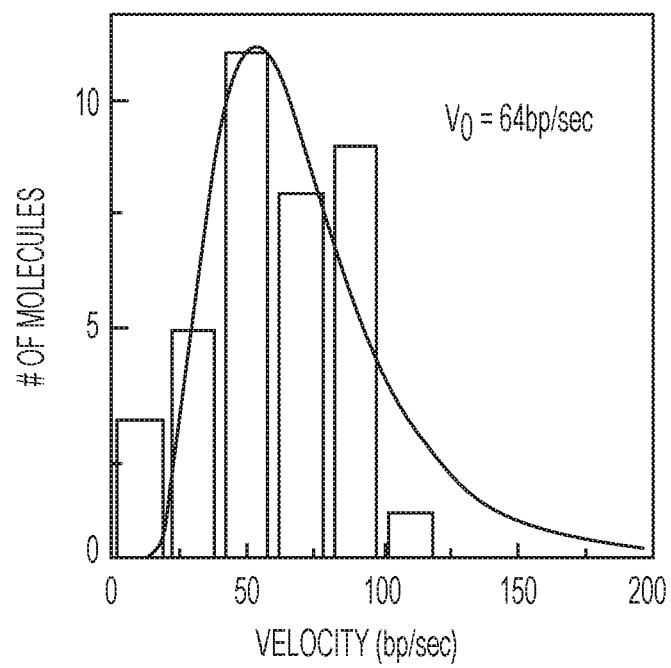

FIGS. 14B and 14F show distributions of RNAP velocities. Solid lines are log-normal fit, indicating mean velocities v0=60 bp/sec and v0=64 bp/sec.

Figure 14G:
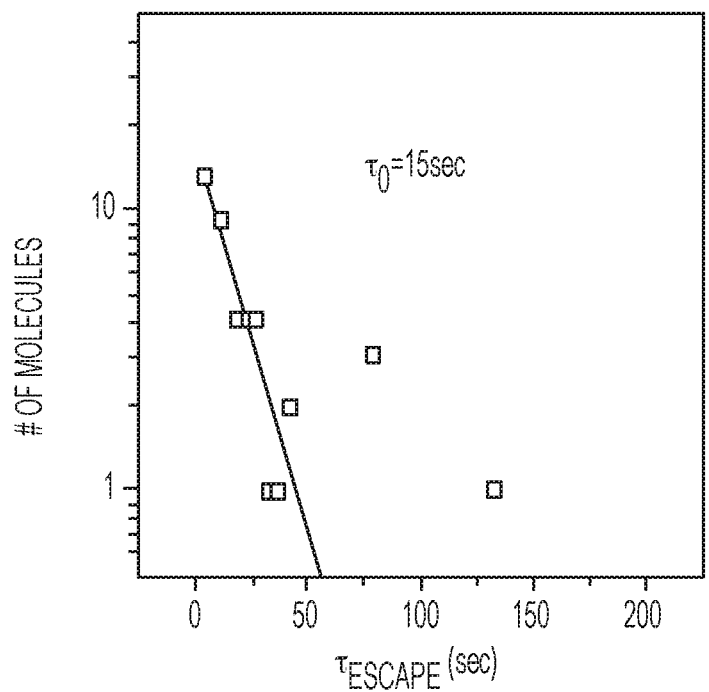

FIGS. 14C and 14G show distributions of $\tau_{escape}$. Solid lines are exponential fit with $\tau_{fast}$=15 sec.

Figure 14H:
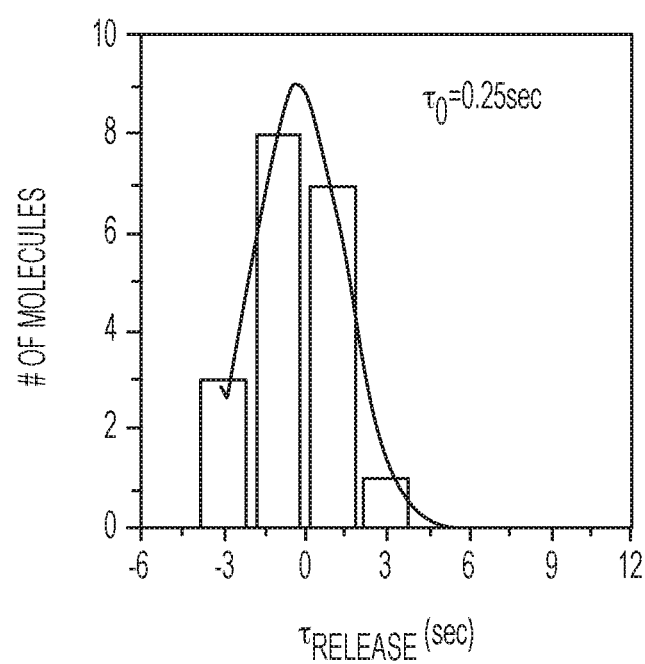

FIGS. 14D and 14H show distributions of $\tau_{release}$. Solid lines are fits to the convolution of an exponential decay with a Gaussian peak, equation (13), indicating characteristic release times $\tau_0$=0.23±0.27 sec (SE) and $\tau_0$=0.25±0.13 sec (SE) for lacCONS and lacUV5 respectively. Number of traces: n=59 (FIGS. 14A-14C), n=37 (FIGS. 14E-14G), n=18 (FIG. 14D) and n=19 (FIG. 14H).

Figure 14I:
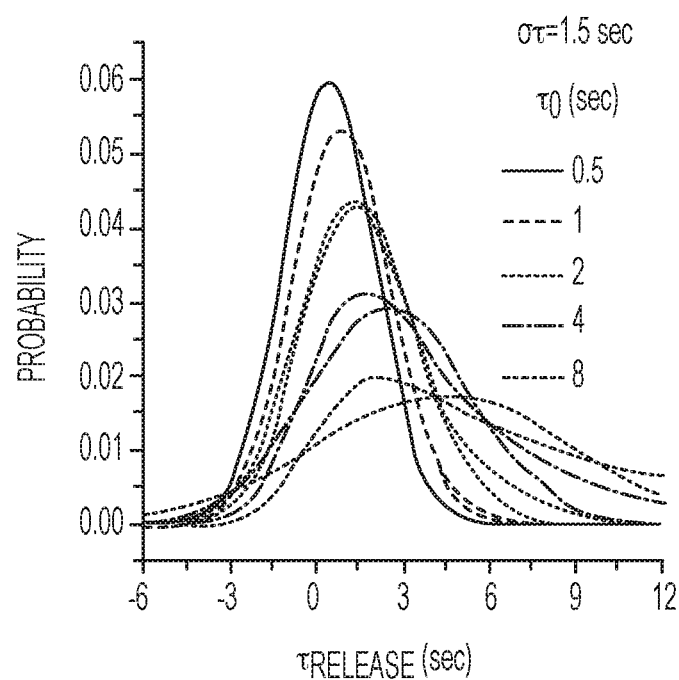

FIG. 14I shows release time distributions (solid lines) based on equation (13), for $\sigma_\tau$=1.5 sec and $\tau_{offset}$=0 sec, and for varying exponential decay times to. Dashed lines are attempts to fit the solid lines to Gaussian peaks. The fit becomes progressively worse for increasing to.

Figure 14J:
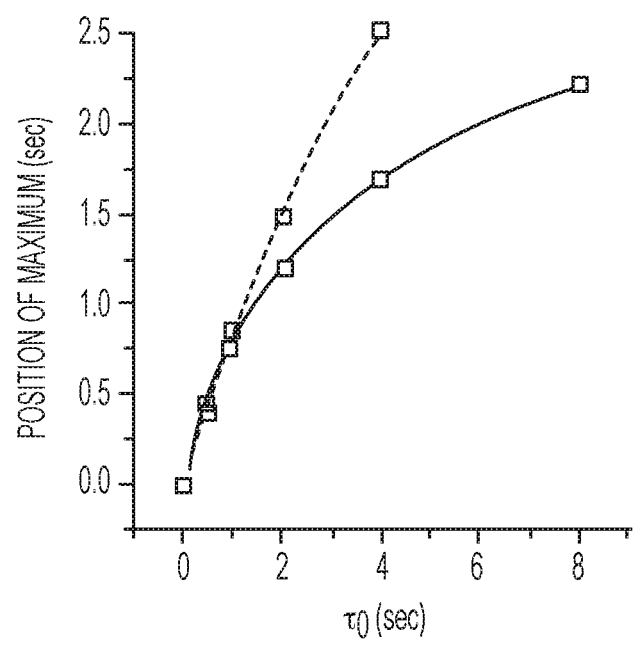

FIG. 14J shows a position of maximum of release time distributions (solid symbols and line) vs. exponential time constant to. Also shown are the peak positions of the Gaussian fit (open symbols and dashed line).

FIGS. 15A-15H shows various schematics of single-molecule 3D imaging with modulation interferometry.

Figure 15B:
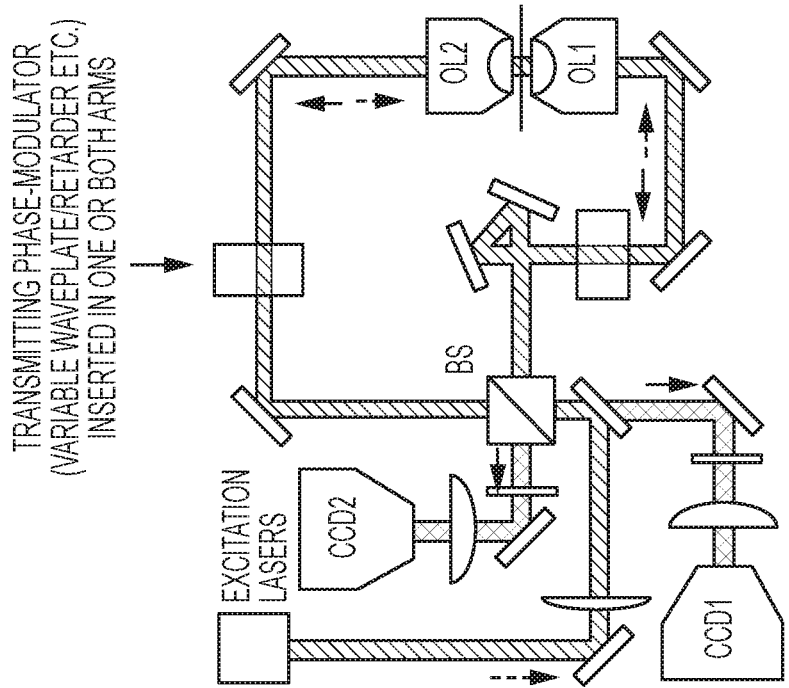
Figure 15A:
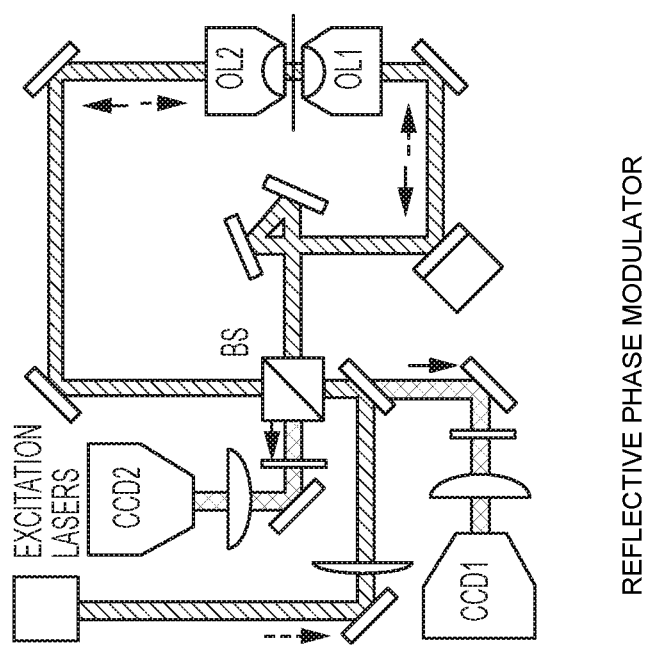

FIG. 15A shows a schematic of a single-molecule 3D imaging system with modulation interferometry using reflective devices (e.g., reflective phase modulators such as LCOS device, MEMS mirror), as an illustrative embodiment of the invention.

FIG. 15B shows a schematic of a single-molecule 3D imaging system with modulation interferometry using a transmitting device (e.g., a transmitting phase-modulator such as a variable wave or retarder) that is inserted in one or both interferometric arms, as an illustrative embodiment of the invention.

Figures 15C, 15D:
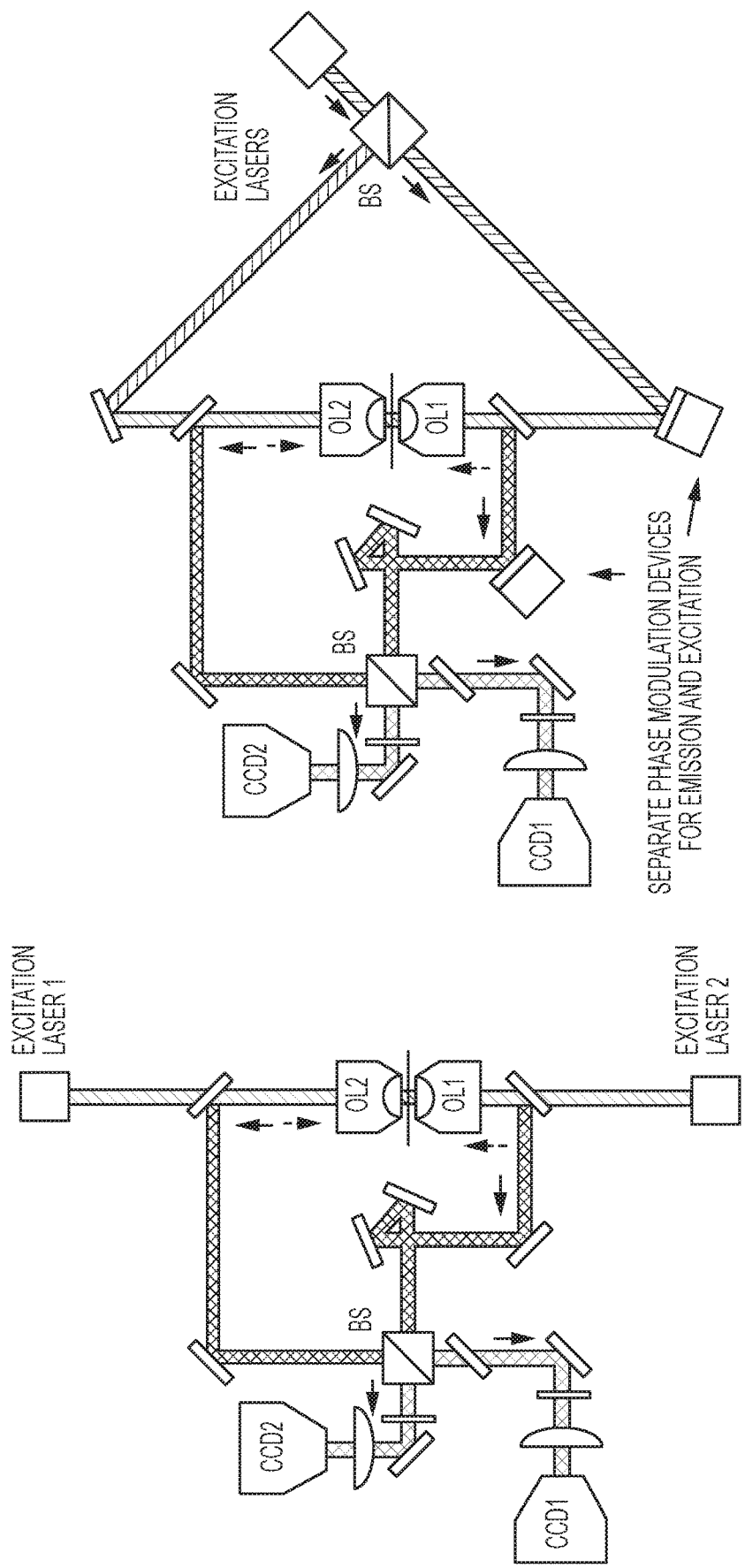

FIG. 15C shows a schematic of a single-molecule 3D imaging system with modulation interferometry using two separate phase-locked excitation sources, as an illustrative embodiment of the invention.

FIG. 15D shows a schematic of a single-molecule 3D imaging system with modulation interferometry using separate excitation and emission interferometer arms, as an illustrative embodiment of the invention.

Figure 15E:
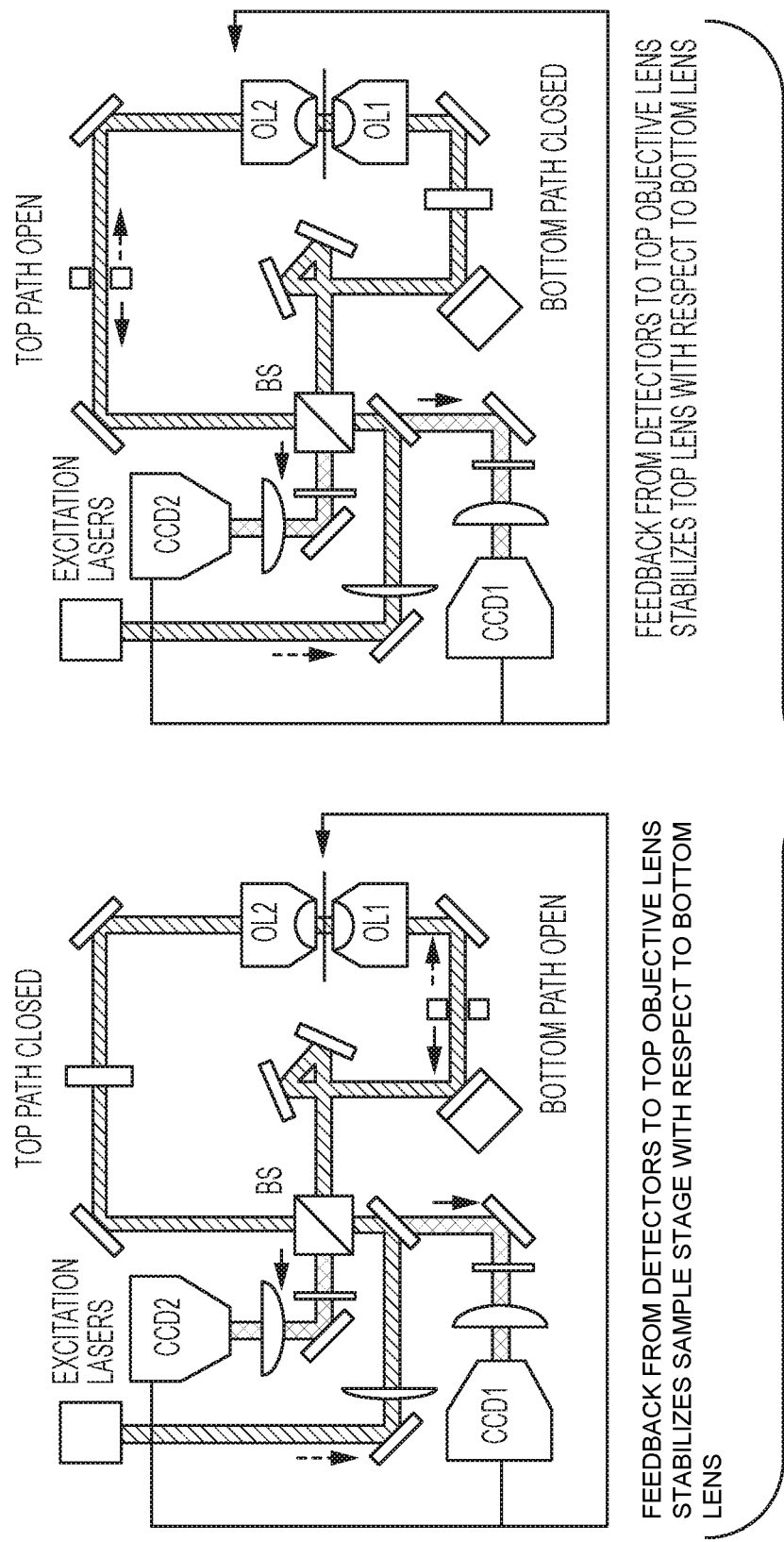

FIG. 15E shows a schematic of a single-molecule 3D imaging system with modulation interferometry using active stabilization of the sample stage with an objective alignment procedure, as an illustrative embodiment of the invention. In this embodiment, the bottom objective lens is fixed and feedback operations are interspersed between modulation cycles (e.g., every 10 modulation cycles one adjustment is performed). The left panel of FIG. 15E shows that feedback from detectors to 3D sample stage stabilization the sample stage with respect to the bottom lens. The right panel of FIG. 15E shows that feedback from detectors to the top objective lens stabilizes the top lens with respect to bottom lens.

Figure 15F:
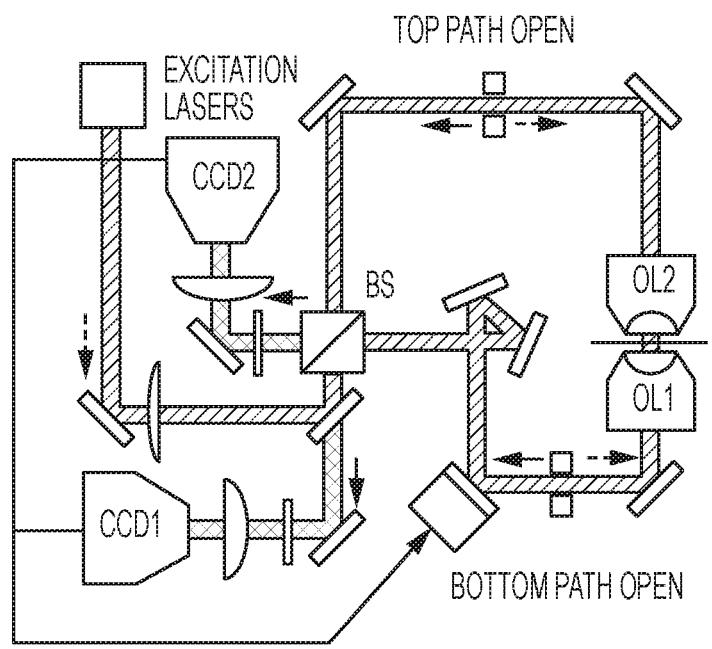

FIG. 15F shows a schematic of a single-molecule 3D imaging system with modulation interferometry using active stabilization of interferometer phase, as an illustrative embodiment of the invention. In this embodiment, feedback from detectors to PZM stabilizes the interferometer phase. In this embodiment, feedback operation is performed in every cycle.

Figure 15G:
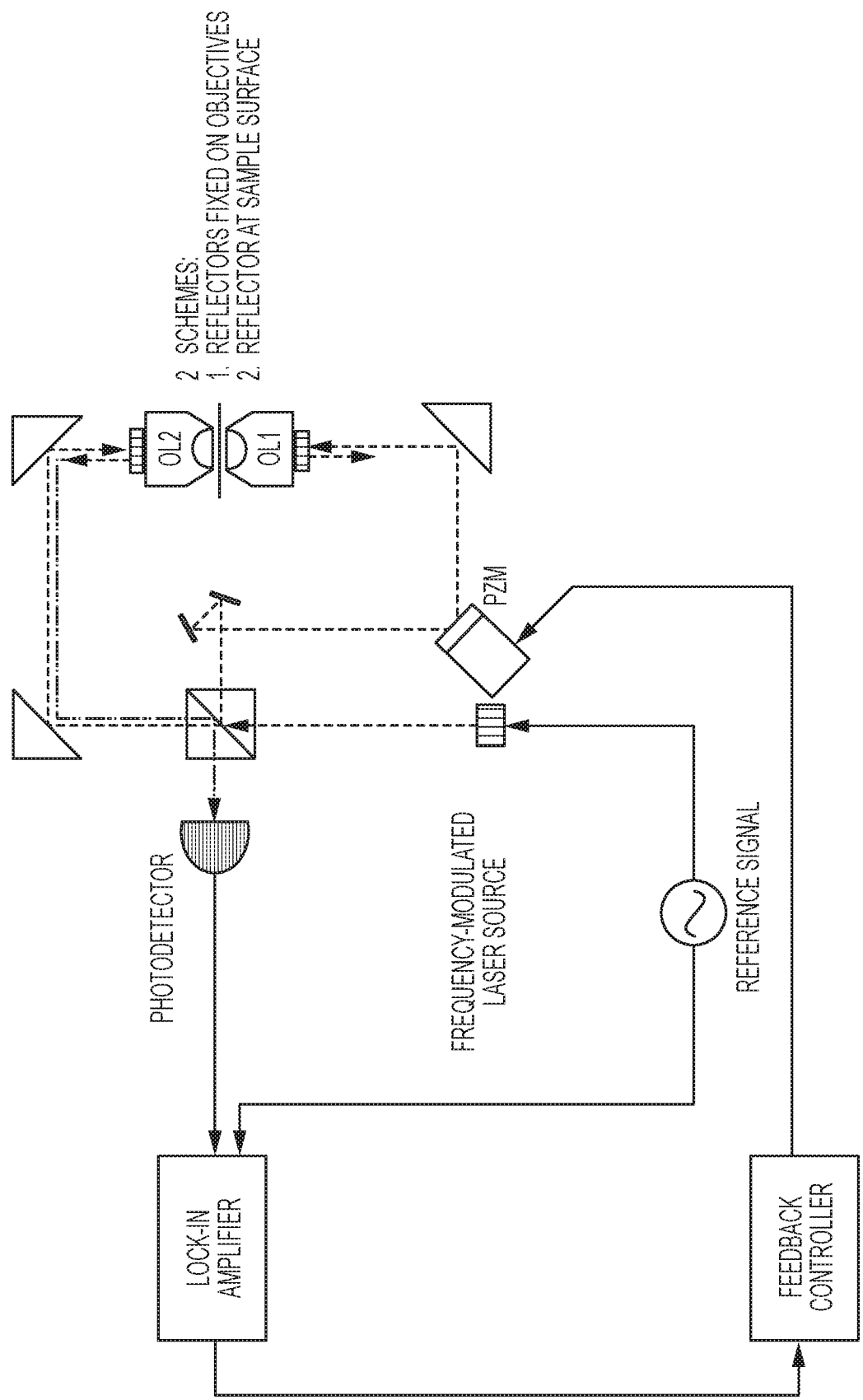

FIG. 15G shows a schematic of a single-molecule 3D imaging system with modulation interferometry using a scheme for stabilization of the interferometer phase, as an illustrative embodiment of the invention. In this embodiment, the setup operates at path-length difference $\delta_l$: $\delta_l/\lambda \sim / \Delta\lambda$. For example, for laser modulation: $\Delta\lambda/\lambda \sim 10^{-4}$, $\delta_l \sim 10^4 \times \lambda$. Thus $\lambda \sim 0.4$-1 µm, $\delta_l \sim 0.4$-1 cm. The lock-in amplifier shown in FIG. 15G can be used to detect electronic signals from the photo-detector. The phase information is then given to the feedback controller to adjust the piezo-electric mirror (PZM) to stabilize the interferometer phase and to control the closed-loop scheme, described in detail herein.

Figure 15H:
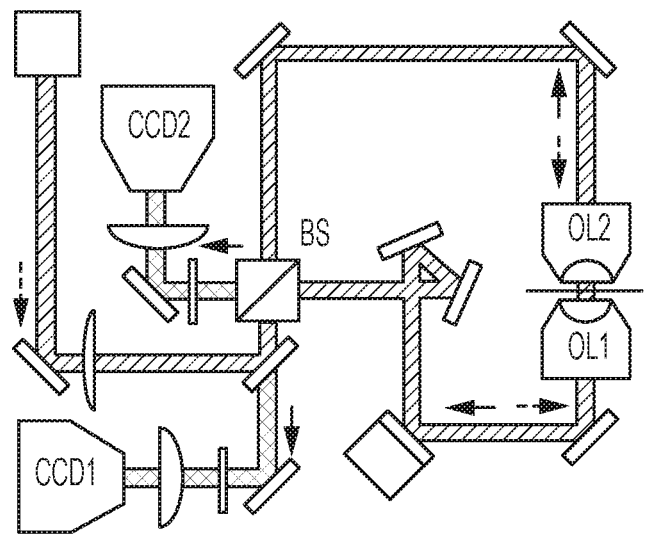

FIG. 15H shows a schematic of a single-molecule 3D imaging system with modulation interferometry using laser frequency modulation, as an illustrative embodiment of the invention. The emitted light is combined by the beam-splitter (BS) and then detected by the CCD/sCMOS fluorescence detectors. In this embodiment, the setup operates at a path-length difference $\delta_l$: $\delta_l/\lambda \sim \lambda/\Delta\lambda$.

FIGS. 16A-16D show schematics of single-molecule 3D imaging systems with modulation interferometry using orthogonal excitation with one or more optical objective lenses in the xy plane.

Figure 16A:
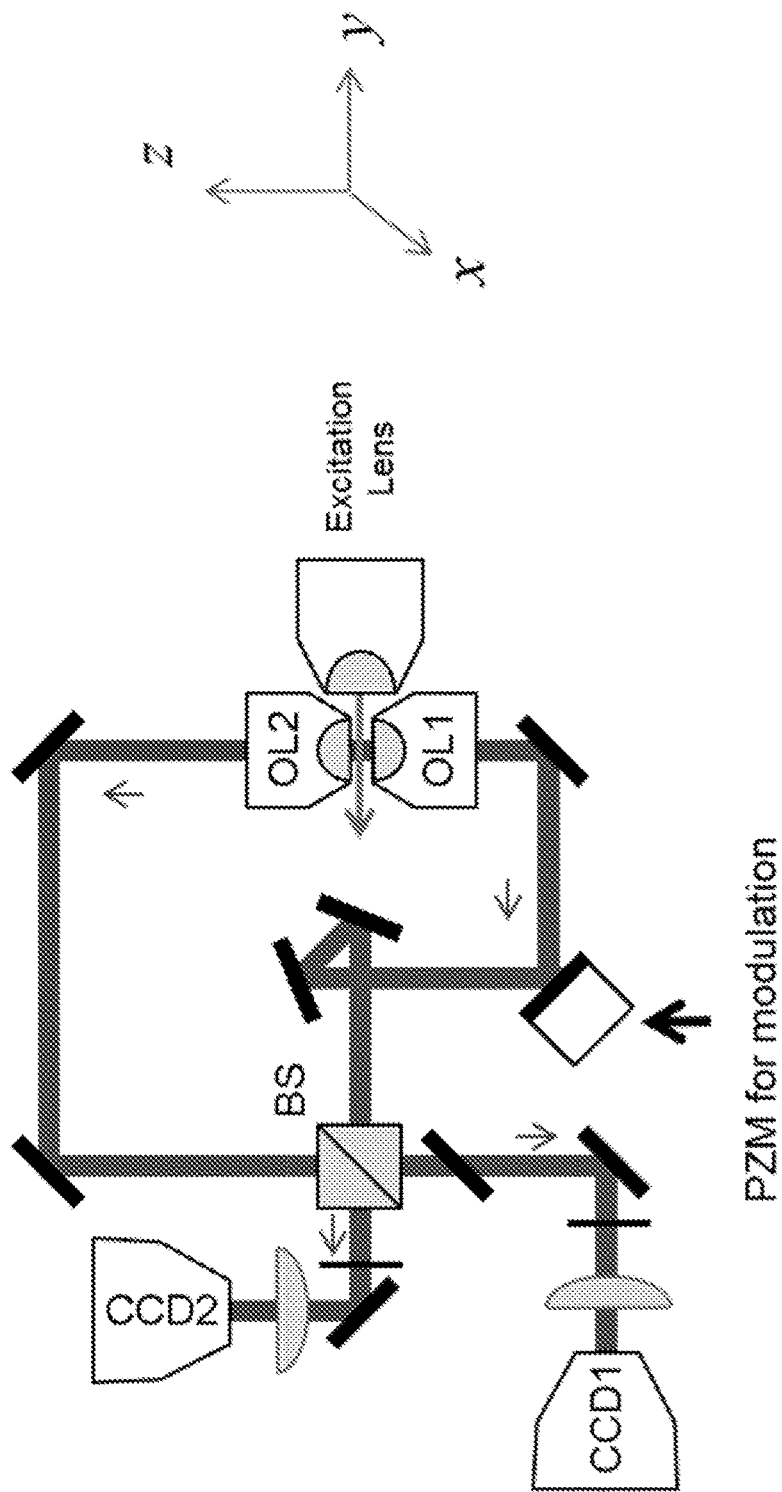

FIG. 16A shows a schematic of a single-molecule 3D imaging system using orthogonal excitation with a third optical objective lens positioned in the xy plane. In this embodiment, an illumination pattern can be a light-sheet, for example, created with a Gaussian beam, an optical lattice ("lattice light-sheet"), a Bessel beam, or an Airy beam. In this embodiment, the interferometer operates close to zero path length and the emission beams (shown in magenta) interfere.

Figure 16D:
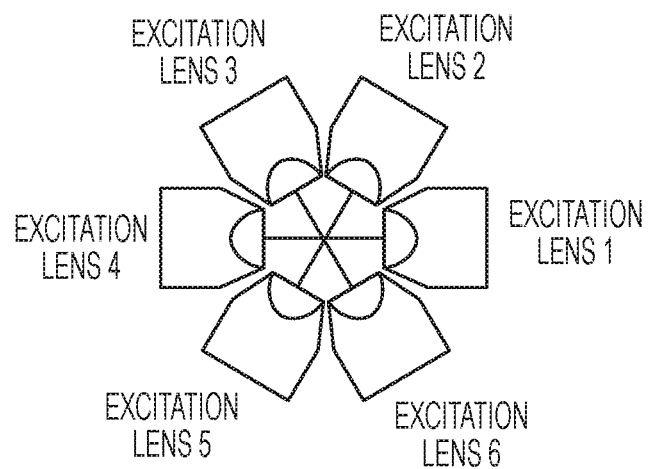
Figure 16D:
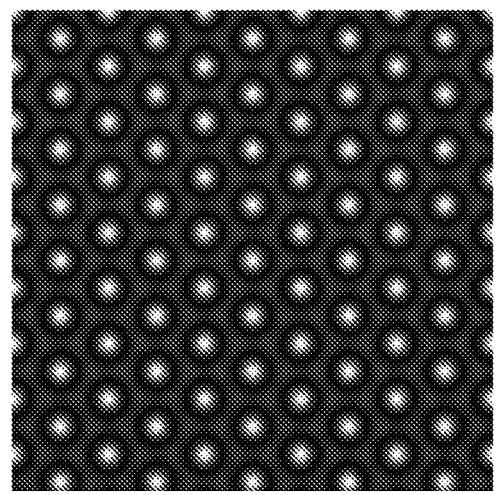

FIGS. 16B-16D show schematics of single-molecule 3D imaging systems using orthogonal excitation with multiple optical objective lenses in the xy plane. The additional 2 lenses along the z axis are not shown. Structured illumination patterns are shown using four (FIG. 16B), three (FIG. 16C), and six (FIG. 16D) excitation lens and beam interferences. Phase modulation of excitation pattern is used to extract an xy position of one or more molecules.

Figure 1A:
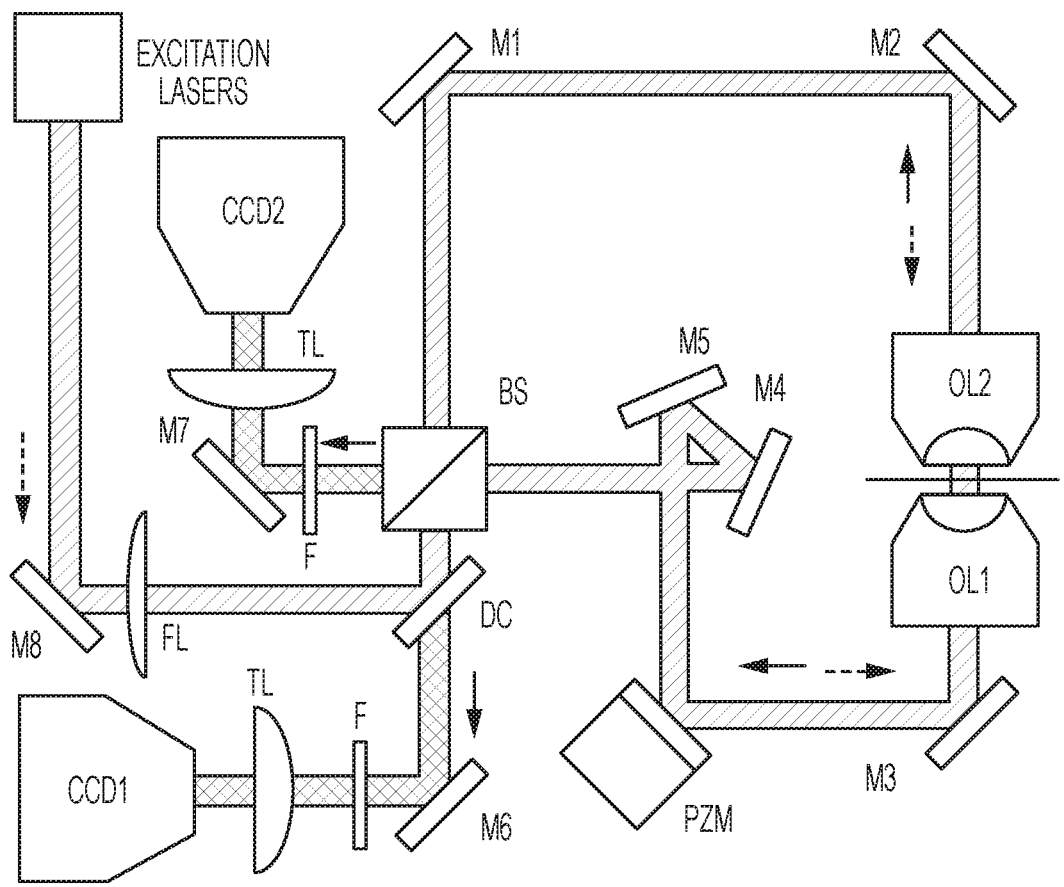
FIGS. 1A-1F show a schematic of a single-molecule 3D imaging system with modulation interferometry.
Figure 17:
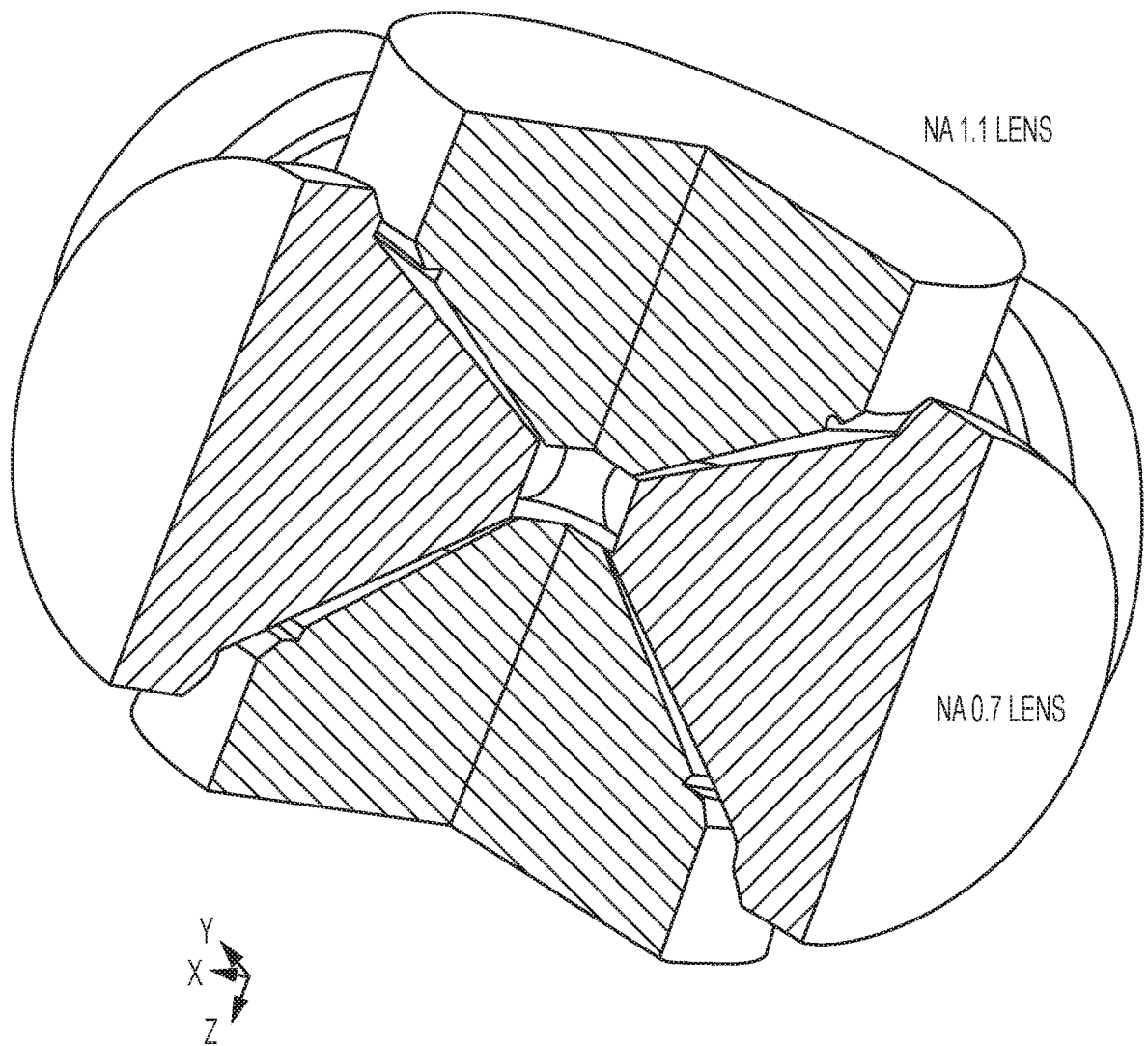

FIG. 17 shows 3D rendering (¾ cut-out view) of 4 excitation lenses (xy plane, as shown in FIG. 16B) and 2 excitation/detection lenses (z-axis, as shown e.g. in FIG. 1A). Mechanical specifications of the following water-immersion objective lenses are as follows: NA 1.1 25× Nikon (2 lenses in z-axis) and NA 0.7 28.6× Special Optics (4 lenses in xy plane).

Figure 18:
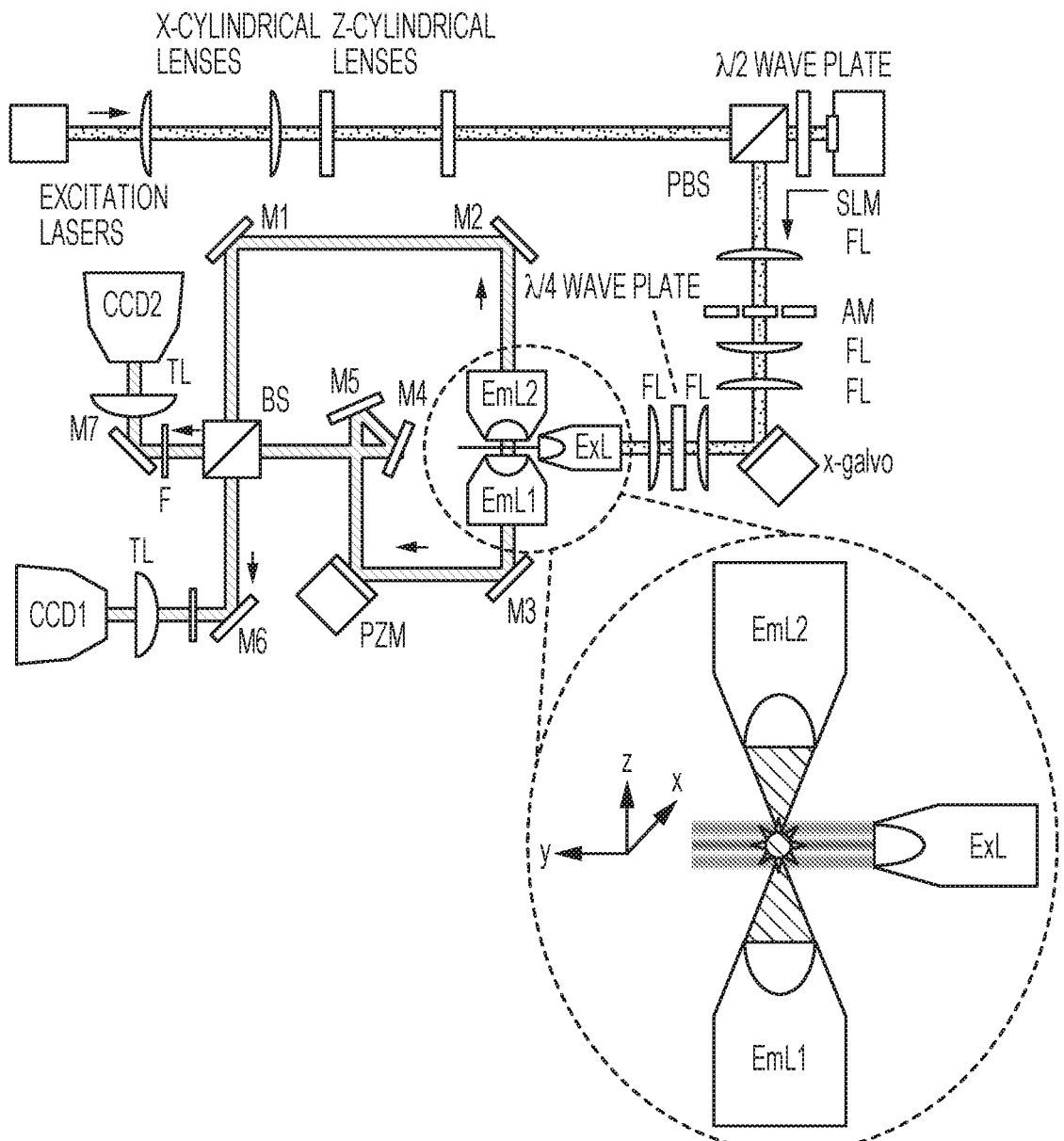

FIG. 18 shows a schematic of an optical layout of interferometric LLS microscopy with the imaging space enlarged and labeled with the Cartesian coordinate system. EmL: emission objective lens; ExL: excitation objective lens; M: mirror; PZM: piezo-mounted mirror; BS: beam splitter; F: filter; TL: tube lens; PBS: polarizing beam splitter; SLM: spatial light modulator; FL: focusing lens; AM: annular mask; x-galvo: x-axis galvanometer.

Figure 19:
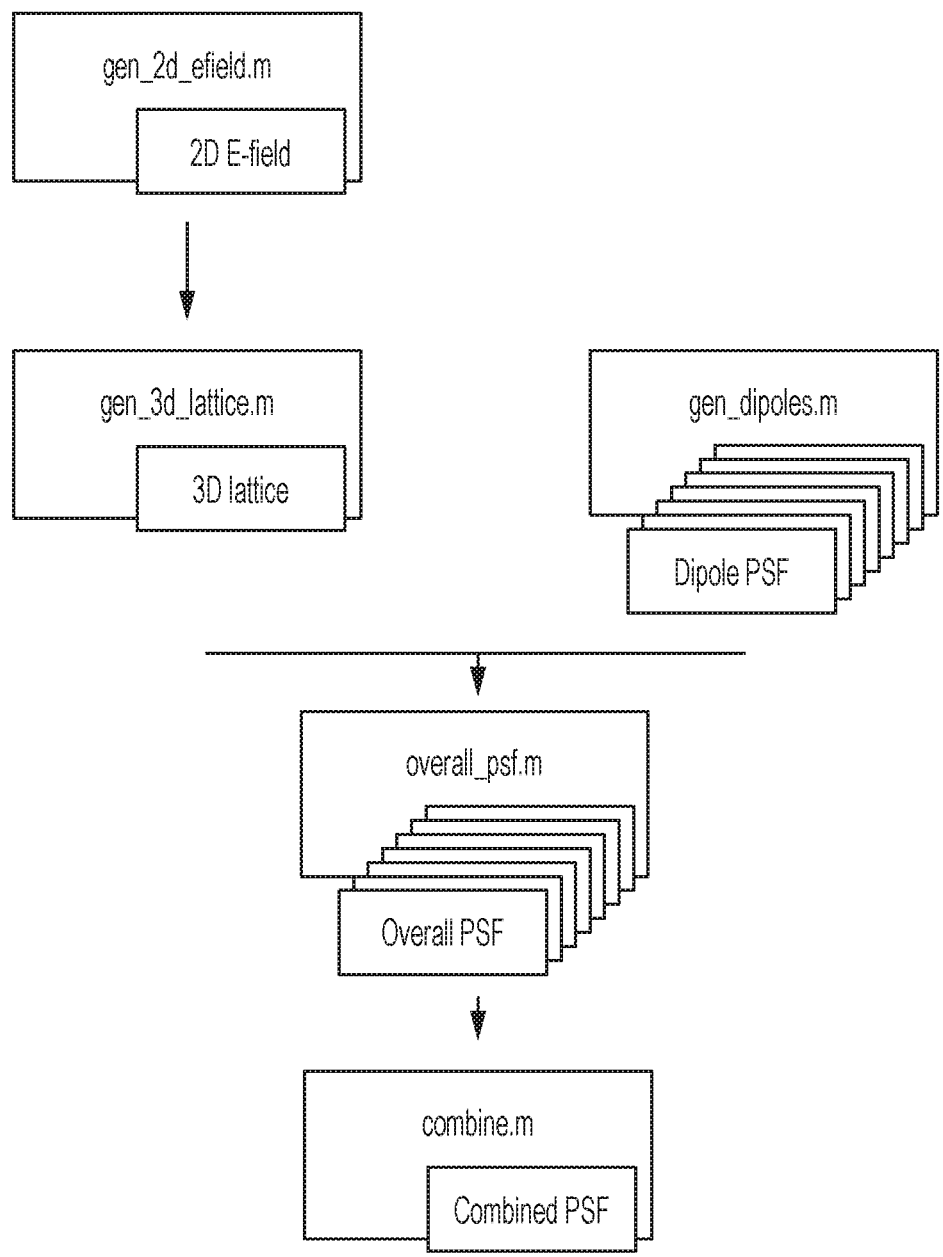

FIG. 19 shows a schematic of a simulation pipeline of electric fields at the image space, according to an illustrative embodiment of the present disclosure.

Figure 20:
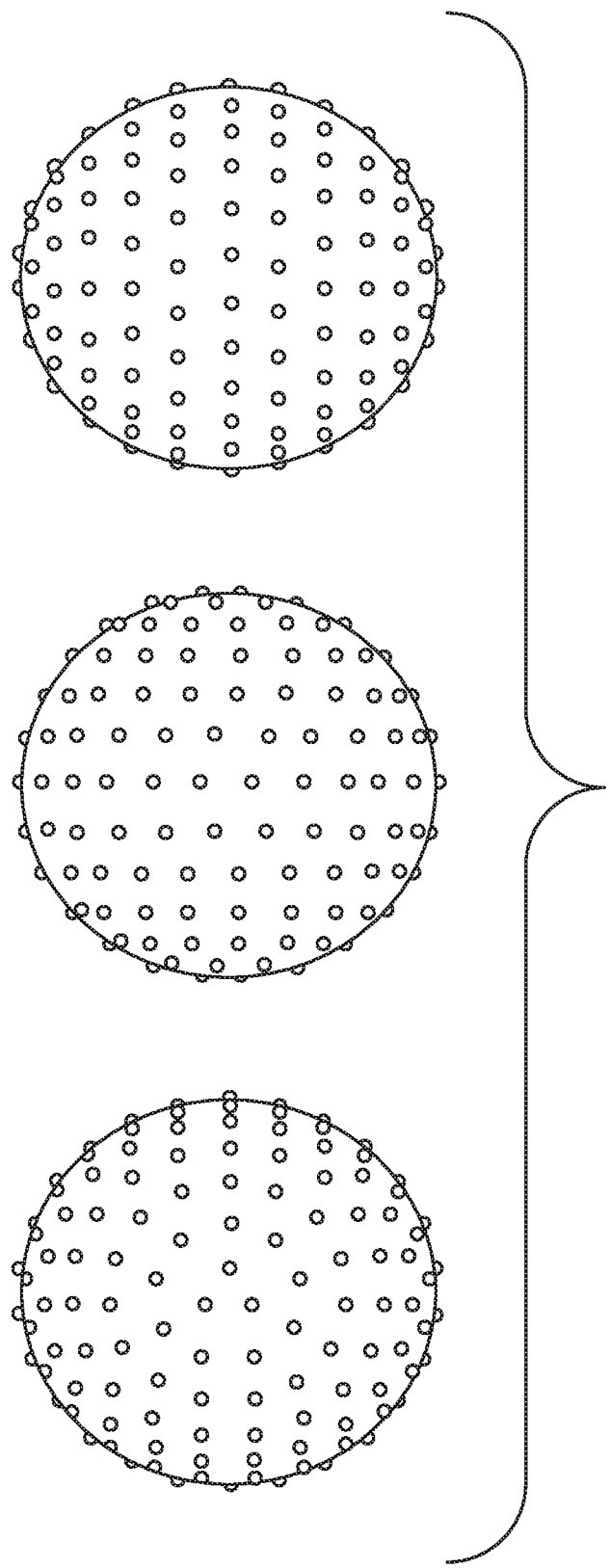

FIG. 20 shows a schematic of near uniform sampling of 214 orientations viewed from three angles, according to an illustrative embodiment of the invention.

Figure 21:
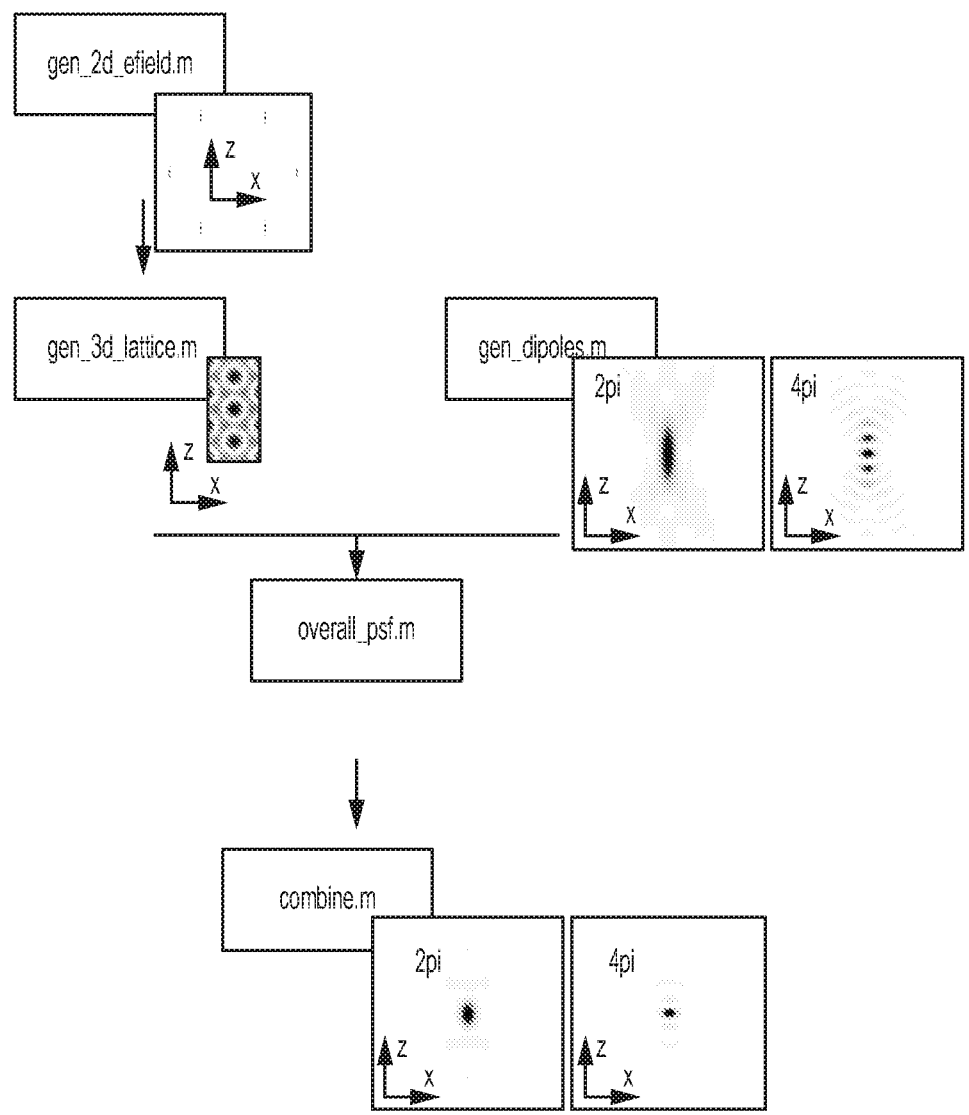

FIG. 21 shows intermediate and final results from a simulation pipeline of the electric fields. The figure panels demonstrate the excitation electric field from a numerical simulation of the fundamental hexagonal maximally symmetric 2D lattice.

Figure 22A:
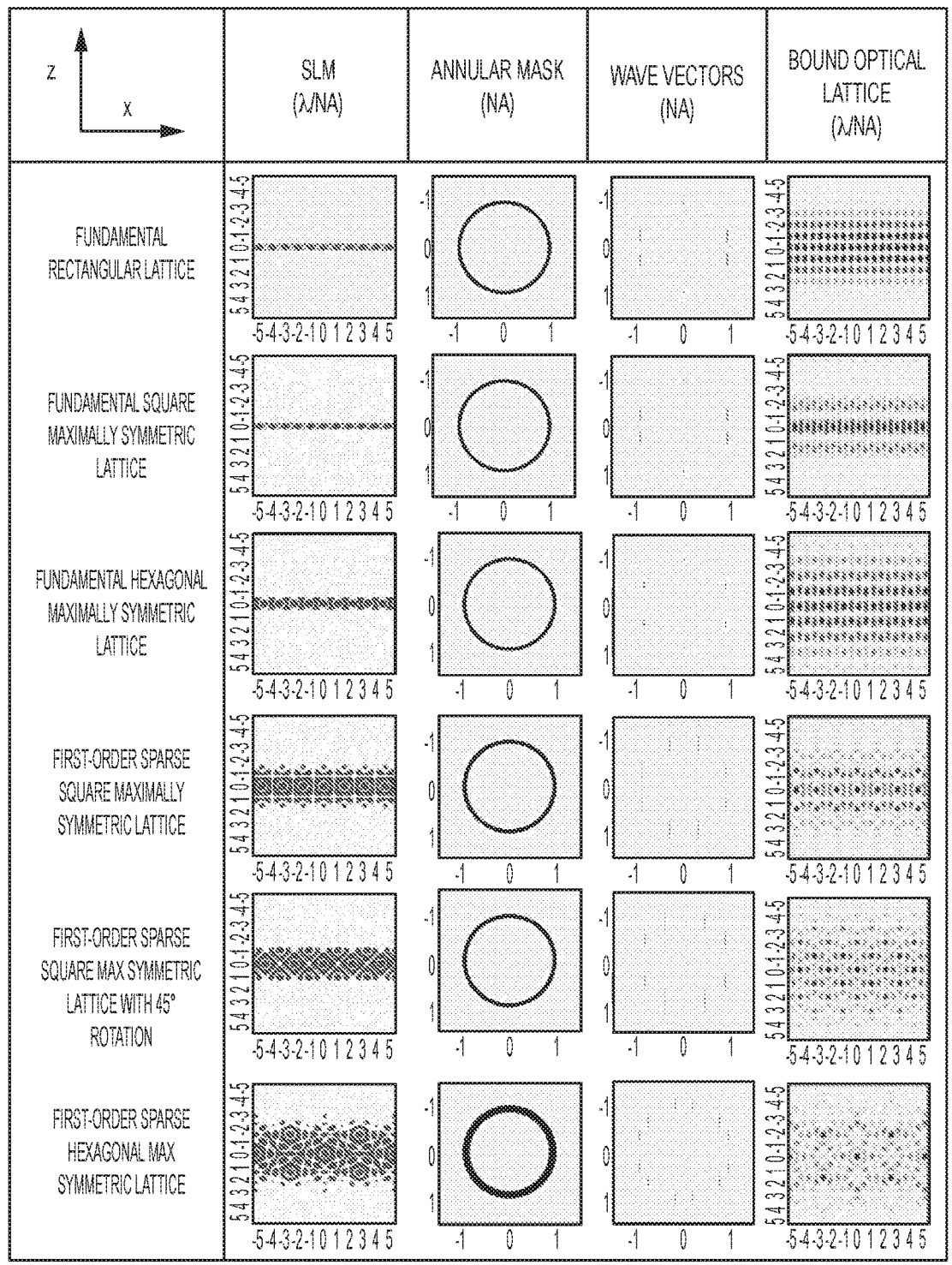

FIGS. 22A and 22B show numerically calculated averaged overall point spread functions (PSFs) and their corresponding simulating parameters.

Figure 23:
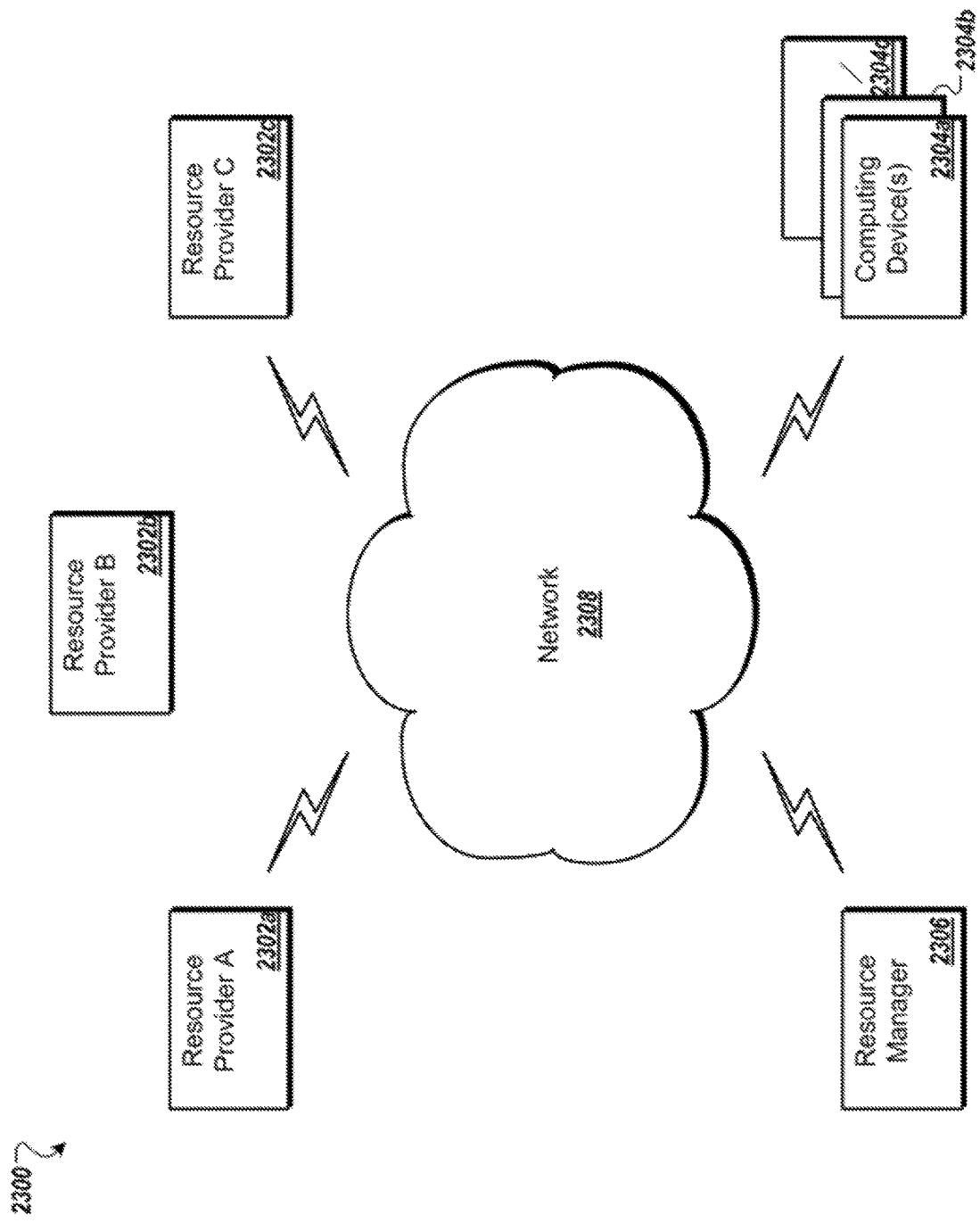

FIG. 23 is a block diagram of an example network environment for use in the methods and systems for analysis of data (e.g., fluorescence data, e.g., spectrometry data), according to an illustrative embodiment.

Figure 24:
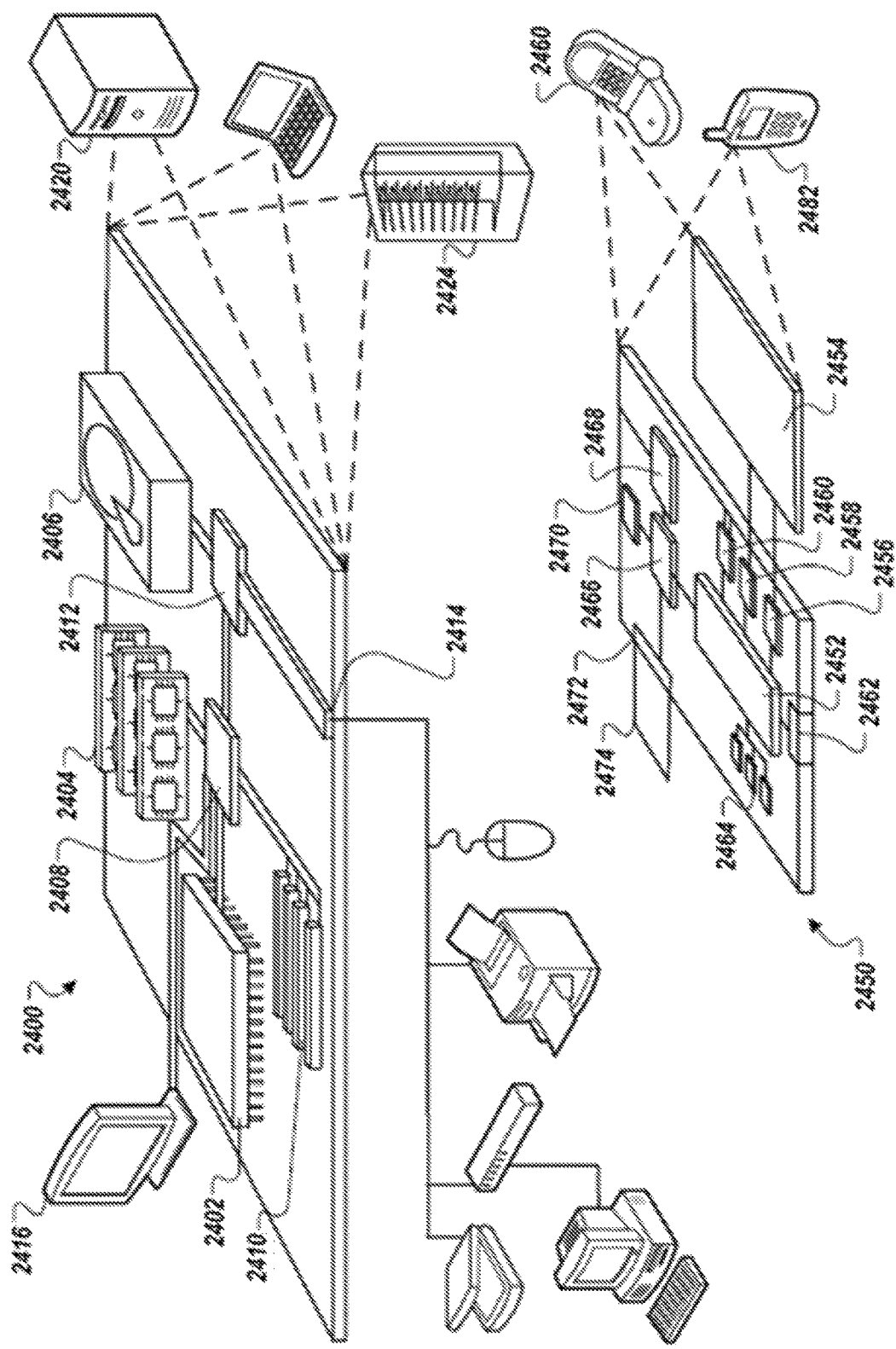

FIG. 24 is a block diagram of an example computing device and an example mobile computing device, for use in illustrative embodiments of the invention.

Figure 25:
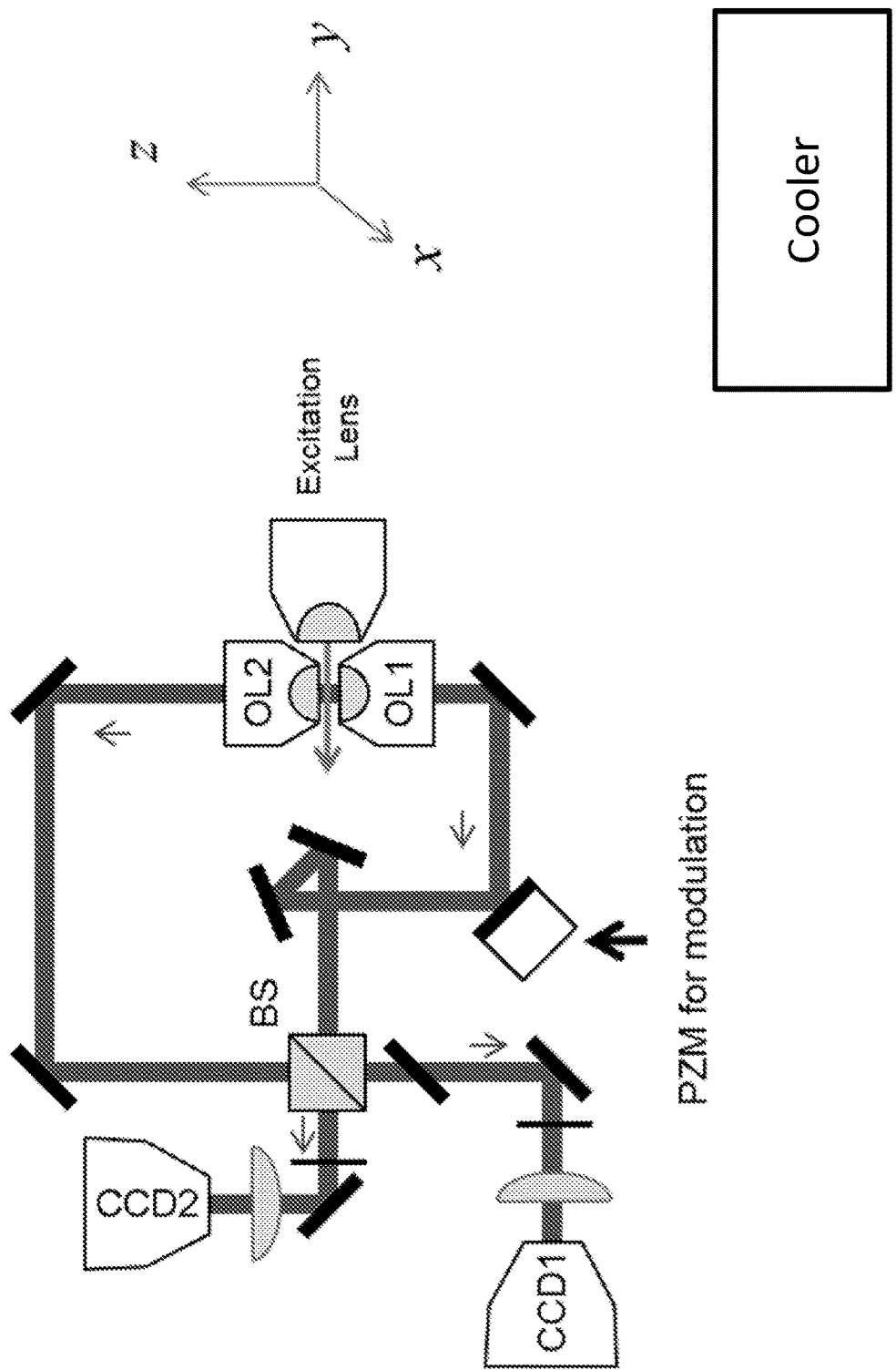

FIG. 25 shows a schematic of a single-molecule 3D imaging system and cooler, according to an illustrative embodiment.

DETAILED DESCRIPTION

Throughout the description, where compositions are described as having, including, or comprising specific components, or where methods are described as having, including, or comprising specific steps, it is contemplated that, additionally, there are compositions of the present invention that consist essentially of, or consist of, the recited components, and that there are methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Described herein are 3D single-molecule super-resolution imaging systems and methods. The provided systems and methods use modulation interferometry and phase-sensitive detection techniques that achieve less than 2 nanometer axial localization precision, which is below the 5-10-nanometer-sized individual protein components. To illustrate the capability of this technique in probing the dynamics of complex macromolecular machines, (1) movement of individual multi-subunit $E.$ $coli$ RNA Polymerases were visualized through the complete transcription cycle, (2) kinetics of the initiation-elongation transition were dissected, and (3) the fate of $\sigma^{70}$ initiation factors during promoter escape were determined.

The imaging systems and methods provided herein apply to 3D super-resolution fluorescence imaging. In certain embodiments, 3D super-resolution fluorescence imaging is achieved by single molecule localization of multiple closed emitters that are separated in time. In certain embodiments, separation of multiple fluorophores can be achieved by several mechanisms, including photo-switching, photo-activation, photo-blinking, or any other reversible or irreversible optical transitions. Reversible or irreversible optical transitions can include switching between a dark state and a bright state, or switching between resolvable states such as switching from a state of one color (e.g. green emitting) to state of another color (e.g. red emitting). Moreover, separation of multiple closely-spaced fluorophores can be achieved by using reversible and irreversible on-off binding (e.g. ligand-receptor binding, or DNA target-probe binding). Accordingly, in certain embodiments, the provided imaging systems and methods that nominally separate fluorophores that transition between distinct states and/or are separated in time (e.g., beyond fluorophores that are always "on").

Methods such as Single-Molecule Switching Nanoscopy (SMSN) (e.g., STORM, dSTORM, FPALM, PALM, PALMIRA, GSDIM, SMCAM, blink-microscopy, reversible-photobleaching microscopy (RBM), BALM), methods that use spatially-targeted fluorescence switching (e.g., STED, GSD, RESOLFT, saturated SIM etc.), and methods known as PAINT, DNA-PAINT, EXCHANGE-PAINT, uPAINT, and qPAINT have spatially resolved fluorophores. However, the provided imaging systems and methods feature comparatively better than 2-3 nanometer 3D localization precision and comparatively better than 1-2 second temporal resolution for single molecule measurements compared to previously described methods.

Limitations faced by previous systems and methods were overcome by a combination of multi-color single-molecule co-localization and interferometric super-resolution microscopy techniques. These techniques enabled sub-diffraction 3D distance measurements and tracking of RNAP and associated factors along surface-tethered DNA templates with down to about 2 nanometer localization precision at about 1 second temporal resolution.

Results

Single-Molecule Real-Time 3D Imaging with Modulation Interferometry

In order to address the limitations of current technologies, a setup was built that allows single-molecule axial localization measurements through phase-shifting interferometry. Oscillating patterns of constructive and destructive interference were created by dynamically and continuously modulating the path-length difference between the two optical paths ("interferometer arms") that guide the excitation and emission beams through the two opposed lenses. This is accomplished with less than 1 nm precision by employing a capacitive sensor-equipped piezo-electric mirror mount (PZM) (FIG. 1A, FIGS. 8A-8G). In contrast to previous setups that allowed gaining simultaneous access to only a discrete (3 or 4) number of phases of the fluorescence photons that travel through the two arms of the interferometer, the provided systems and methods enable accessing any arbitrary phase over an extended dynamic range (FIG. 1A), while also achieving simultaneous wide-field, coherent superposition of both excitation and emission beams.

Figure 1B:
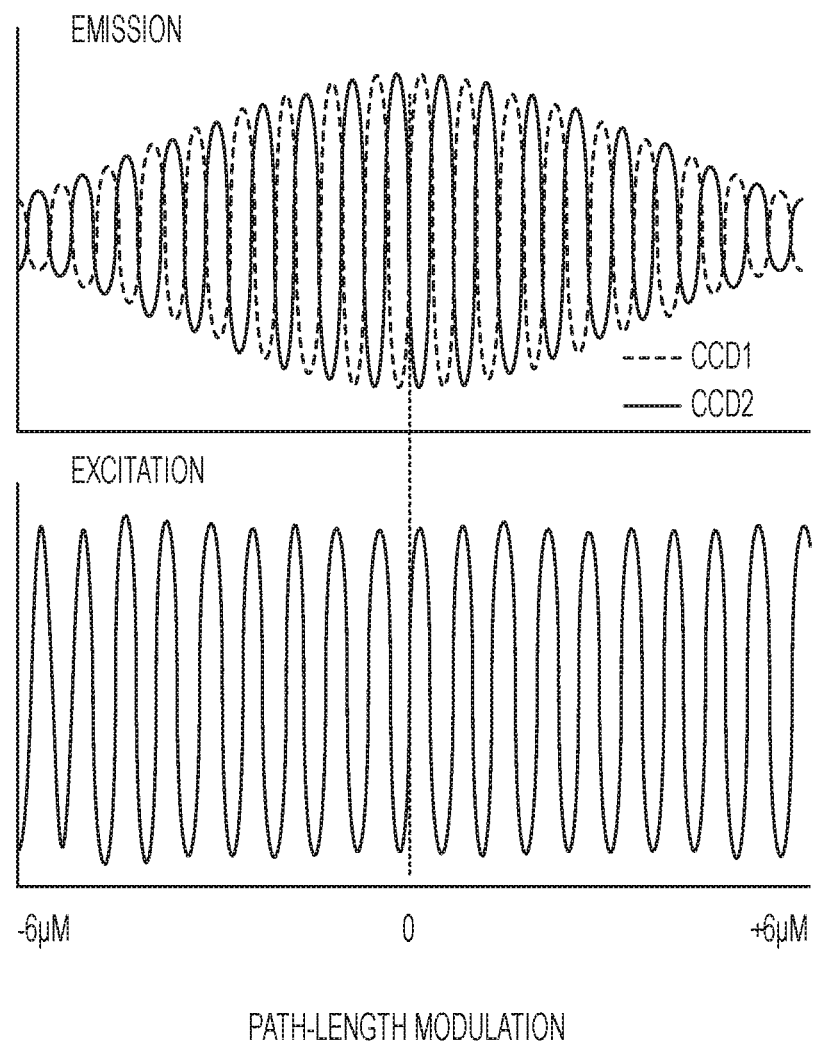
Figure 1C:
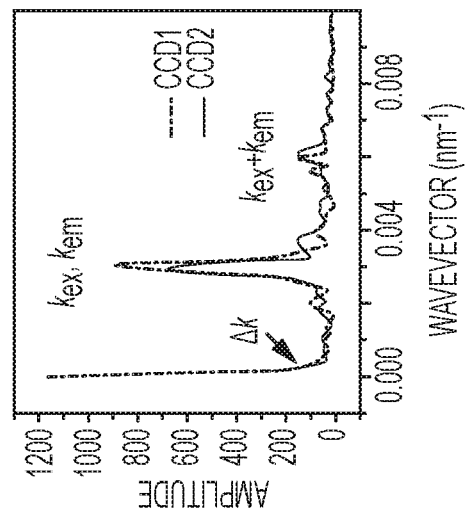
Figure 1D:
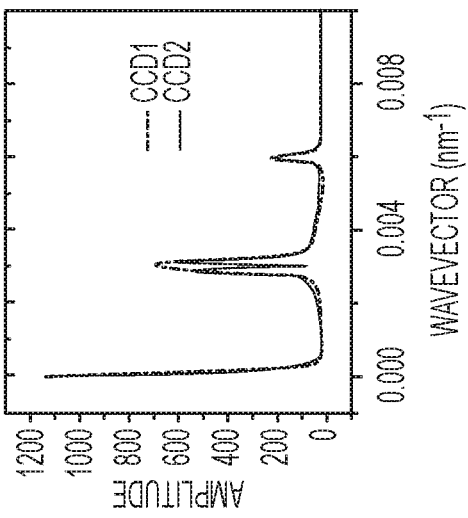
Figure 1E:
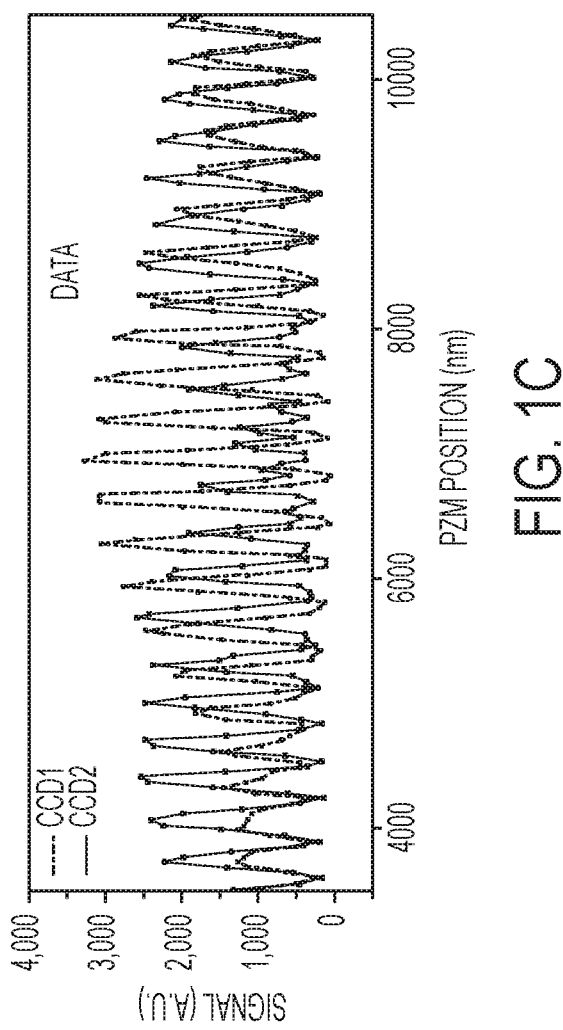
Figure 1F:
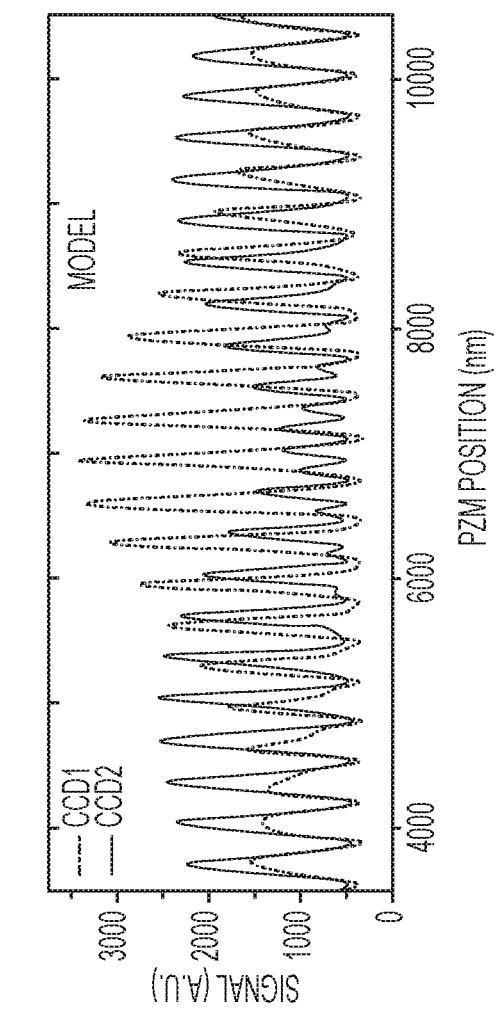

Calibrating the system by sweeping the PZM position through the zero path-length difference, revealed striking interferometric signatures (FIG. 1B) due to mixing of the different modulation frequencies of excitation and fluorescence emission (wave-vectors $k_{ex}=2\pi/\lambda_{ex}$ and $k_{em}=2\pi/\lambda_{em}$ respectively) (FIG. 1C). Interestingly, the slow-varying modulation envelop—created by the combined effects of the difference component $\Delta k=k_{ex}k_{em}$ and the finite coherence length $l_C$ of the emission (equation (7) in Extended Experimental Procedures (or Appendix A))—provided the basis for extending the axial range of unambiguous z localizations beyond a single fringe period (Extended Experimental Procedures (or Appendix A), FIGS. 8C-8G). In applications where extended dynamic range is not needed, simpler operation was achieved based on the high visibility excitation fringes that persist well beyond the point where emission coherence is lost—an approach with additional advantages (as described below).

Due to the short coherence length of fluorescence, emission interference occurs only in a very short range around the zero path-length difference. Also, emission fringe visibility is very sensitive to drift and lateral misalignment, requiring establishing and maintaining a very precise overlap of the wide-field images formed by the two objectives. To overcome these limitations, a more stable and robust operation was achieved by relying on the coherence of the (counter-propagating) excitation beams, which is maintained over longer distances (100's μm to cm depending on laser source) and is less sensitive to lateral misalignments.

Characterization of Temporal Resolution

The provided systems and methods were operated within a few 10's of µm away from zero path-length difference. The position of individual molecules by phase-sensitive detection of the fluorescence trace was obtained, and the excitation modulation wave-vector was locked (Extended Experimental Procedures (or Appendix A)). To characterize the dynamic performance, an "open-loop" modulation scheme was first implemented, by moving the PZM in a triangular trajectory that spanned several periods, while adjusting PZM velocity and CCD frame rate to achieve an integer number n of CCD frames during one modulation period (FIGS. 2A-2E). The PZM was translated with velocity corresponding to $t_{cycle}$=20 msec modulation cycle period, while running the CCDs at 400 frames/sec (n=8 frames/cycle). Importantly, although phase information can be extracted over multiple consecutive cycles to reduce tracking noise, the fastest possible dynamic tracking was achieved by obtaining one phase and correspondingly one axial position measurement in each modulation cycle. As long as enough signal photons are collected, an intensity oscillation can be detected above background and shot-noise (Experimental Procedures, Extended Experimental Procedures (or Appendix A), FIG. 9A). Accordingly, the temporal resolution of the provided systems and methods, given by $t_{cycle}$, can be pushed to a source brightness-limited regime. Phase information for single Cy5 molecules was extracted from oscillations with amplitudes A down to 30-40 photons, corresponding to $N_{photons}$=A×n~300 detected photons in each CCD, obtained in a single n=8 steps, $t_{cycle}$=20 msec modulation cycle (FIG. 9Q). The results that were obtained by modulation interferometry are comparable to multi-phase fluorescence self-interference techniques (FIG. 9Q, Table 1), illustrating that the limitation is fluorophore brightness, and the need for multiple CCD exposures does not appreciably degrade dynamic performance. It is noted that, as detector and PZM hardware can operate at significantly faster speeds (~kHz), further increase in temporal resolution is possible.

Table 1 shows the dynamic performance of the provided systems and methods compared to other methods.

spatial noise in the excitation fringes need to be characterized and corrected (Extended Experimental Procedures (or Appendix A)).

Active feedback systems were employed in the provided imaging systems and methods to: (1) stabilize the sample stage; (2) maintain alignment of the two objectives; (3) clamp the path-length difference between the interferometer arms (Extended Experimental Procedures (or Appendix A)). To better control the phase modulation, a 'closed-loop' scheme was implemented, moving the PZM in discrete steps, and synchronized with the CCD acquisition (FIGS. 2F-2J) and the stepping pattern was repeated with a real-time servo-controlled offset every tcycle=0.4-4 sec. Active stabilization of the interferometer using single 40 nm reference spheres enabled maintaining alignment over more than 0.5 hr-long time periods and reduced z fluctuations to a few 10's of nanometers (often less than 10 nm) in the raw data, a significant improvement over the 100's nm drift often observed when operating open-loop. These residual fluctuations were correlated between traces of different molecules, suggesting that they reflect, at least partly, uncorrected time-dependent instabilities of the apparatus, and are likely subtractable as common-mode noise.

Interestingly, when a global correction of stationary Cy5 traces was performed by subtracting the average z from all the molecules in the field of view, it was noticed that excess noise remained, above the expected random noise level based on number of photons and background level (Extended Experimental Procedures (or Appendix A), FIGS. 9B-9I). Upon further examination, it was discovered that this excess noise exhibited spatial correlations between Cy5 molecules (FIGS. 9J, 9K). Thus, without wishing to be bound to any theory, it appears that spatially non-uniform modulation characteristics (e.g., due to finite width and curvature of the excitation fringes at the sample) introduce systematic phase errors that are not completely eliminated when subtracting the common-mode of fiducials over the field of view. To achieve the highest spatial localization precision possible, an alternative correction scheme was implemented by taking into account the spatial noise corre-

TABLE 1

|  | Fluorophore | Temporal resolution (msec) | $N_{photons}$ | # phases (n) | Precision $\sigma_z$ (nm) | Excitation Intensity (kW/cm²) |
|---|---|---|---|---|---|---|
| Modulation interferometry | Cy5 | 20 | 1,085[a] | 8 | 6[a] | ~14 |
| iPALM | td-EOS/ m-KikGR | 50 | ~1,000 | 3 | ~5 | n.s.[b] |
| 4PI-SMS | Rhodamine/ Atto 532 | 10 | 380- 800 | 4 | 5-7 | 7-14 |

[a]Mean number of photos per cycle collected by both CCDs and mean precision, see FIG. 9Q.
[b]Not specified.

Characterization of Spatial Localization Precision

The fundamental limit in the precision of phase measurements is determined by random photon/background noise (Extended Experimental Procedures (or Appendix A)). In practice, in order to achieve localization precisions for individual fluorophores higher than the previously demonstrated $\sigma_z$~5 nm precision of fluorescence self-interference techniques at $N_{photon}$~1000 from single molecules, in addition to reducing random noise by increase $N_{photon}$, the combined systematic errors of drift and misalignment of the apparatus, phase modulation jitter, as well as temporal and lations and performing corrections locally in the neighborhood of each molecule (Extended Experimental Procedures (or Appendix A)).

When excitation fringe uniformity is maximized and a local, optimized correction is performed (FIGS. 9N-9P), it was observed that the phase precision and thus the spatial resolution are mainly limited by the number of photons $N_{photons}$ in each modulation cycle and exhibit a characteristic $1/\sqrt{N_{photons}}$ scaling over 2 orders of magnitude (FIG. 9K). Notably, this photon-noise-limited performance is achieved over a broad range of photon fluxes and modulation speeds and without any major resolution degradation due to the need to acquire multiple CCD images (FIG. 2K).

Figure 2A:
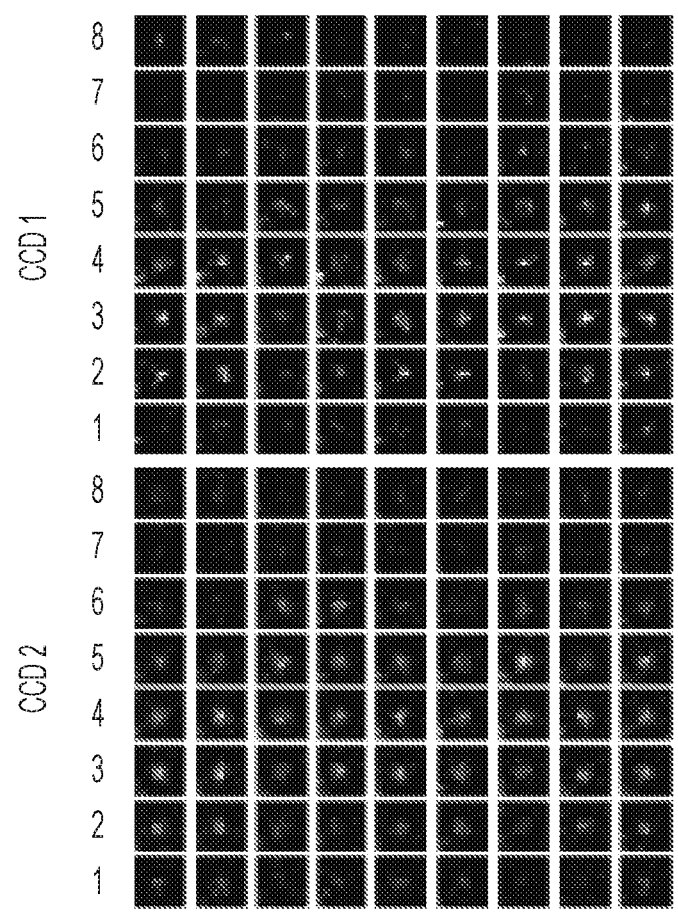
FIGS. 2A-2L show temporal and spatial resolution provided by the systems and methods herein.
Figure 2B:
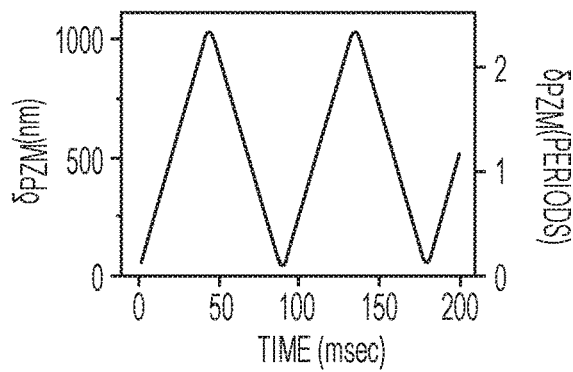
Figure 2C:
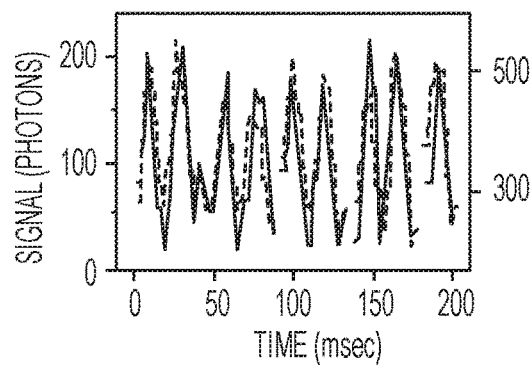
Figure 2D:
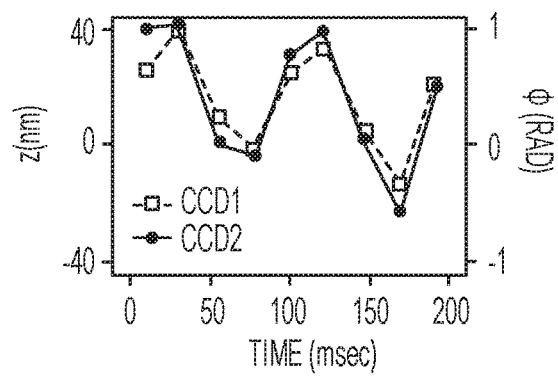
Figure 2E:
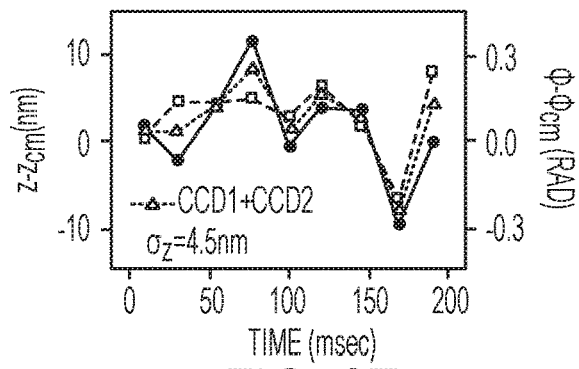
Figure 2F:
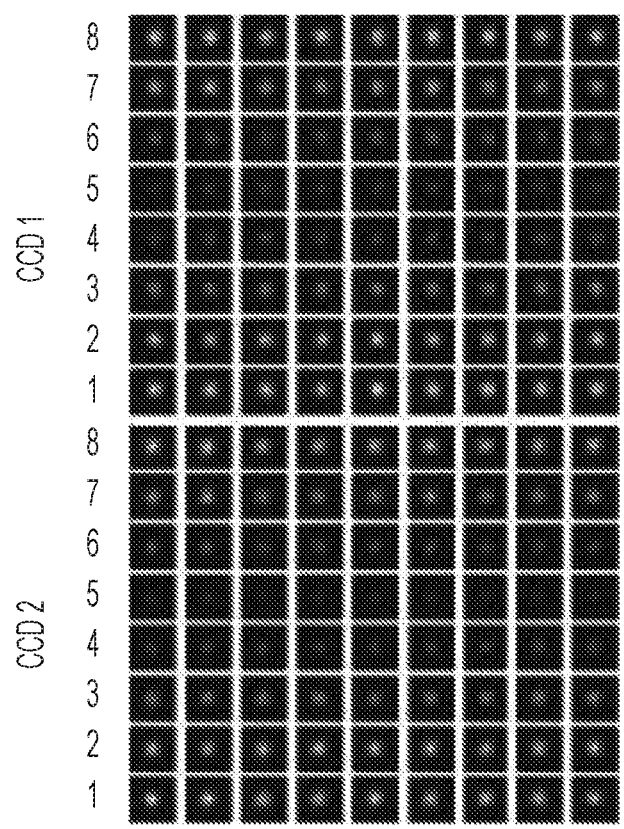
Figure 2G:
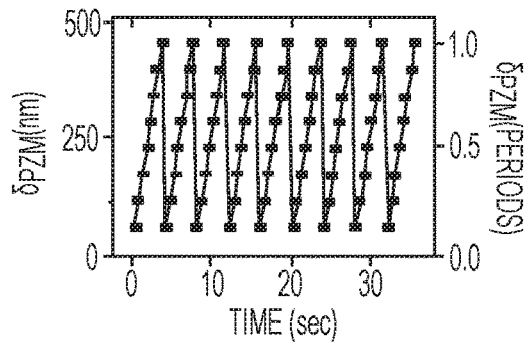
Figure 2H:
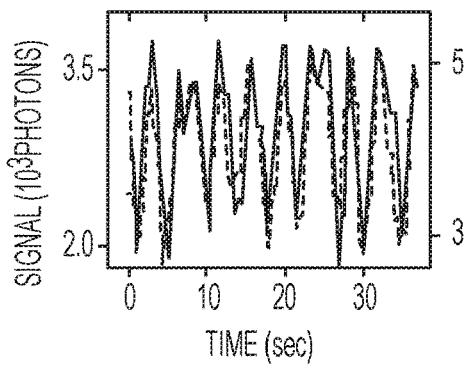
Figure 2I:
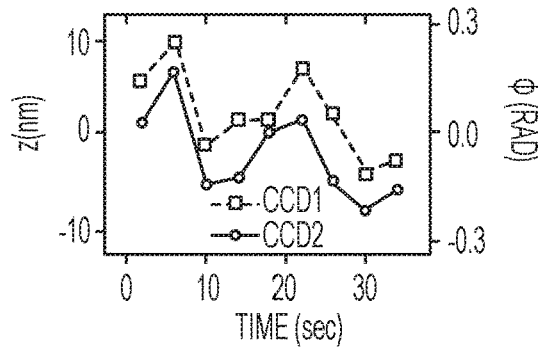
Figure 2J:
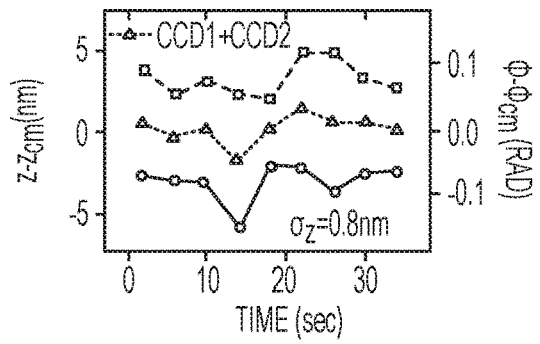
Figure 2K:
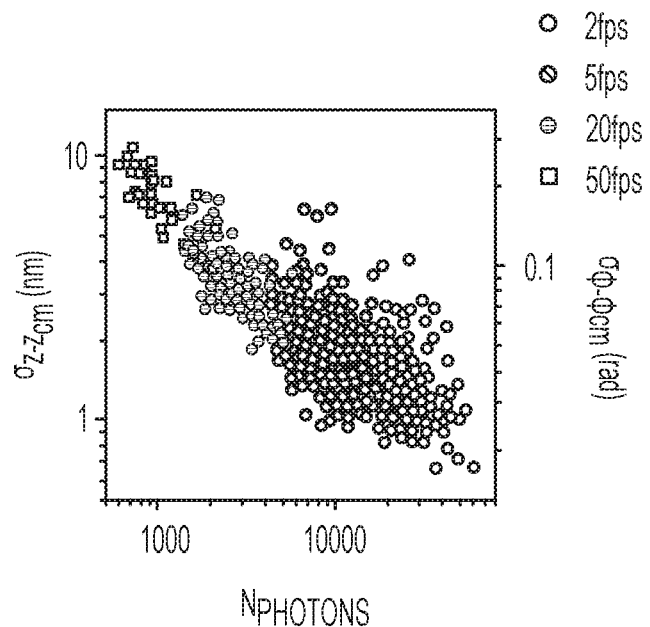
Figure 2L:
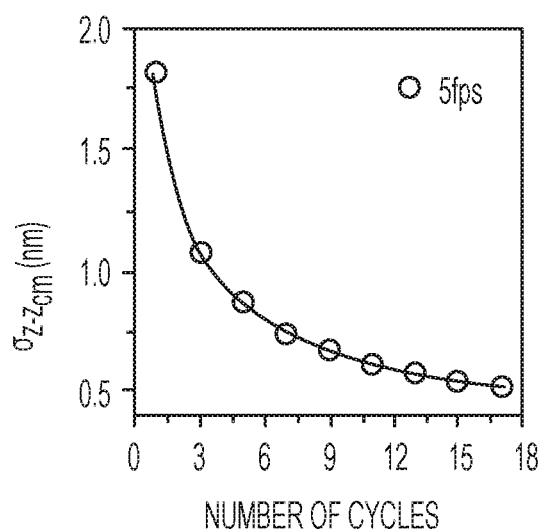
Figure 3A:
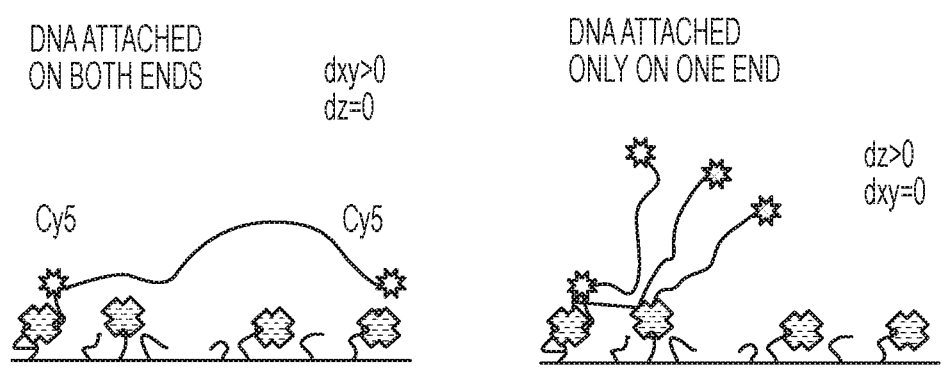
FIGS. 3A-3G show 3D Nanometer Distance Measurements on dsDNA Rulers. See also Table 2.
Figure 3B:
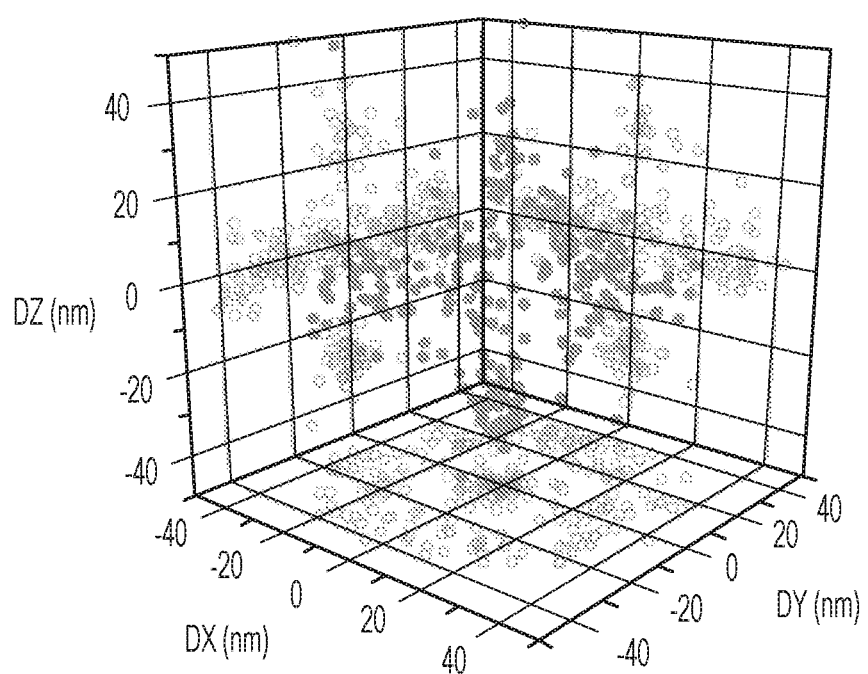

For emitter brightness $N_{photons} \sim 10^4$ (collected over 4 second cycles), FIGS. 2J, 2K show that, remarkably, the phase of individual Cy5 molecules can be obtained with residual phase noise of $\sigma_\phi < 40$ mrad, corresponding to median z localization precisions of $\sigma_z = 1.4$ nm that reflect a contribution $\sigma_{z,random} = 0.8$ nm due to random photon/background noise and an additional $\sigma_{z,excess} = 1.1$ nm due to spatial nonuniformity of the fringe modulation (FIGS. 9O, 9P). At 1.6 seconds/cycle and for $N_{photons} \sim 4 \times 10^3$, the median precision is $\sigma_z = 1.7$ nm. As time-dependent excess noise averages to ~zero, even higher precisions, down to 0.5 nm can be obtained by averaging multiple consecutive cycles (FIG. 2L). 3D Distance Measurements The described capability of sub-2 nm axial (z) localization precision was combined with a sub-nanometer focal plane (xy) resolution to enable measuring 3D inter-molecular distances. As test samples, analyses were performed on short (e.g., from below and up to the persistence length) dsDNA rulers of defined contour length $L_C$, labeled on each end with Cy5 and biotin and surface-tethered through biotin-streptavidin interactions. The two Cy5 dyes on the dsDNA ends were resolved by sequential photobleaching. Such linear templates can be attached on the surface in two stereospecific configurations (FIG. 3A): (i) lying flat with both ends tethered or (ii) tethered on one end only that serves as a pivot point allowing the free end to diffuse, exploring possible positions on a hemispherical shell. These experimental 3D distance measurements validate this notion, revealing two distinct populations (FIG. 3B): (i) points along a ring of a finite diameter in the xy (dz=0) plane and (ii) two clusters symmetrically above and below the xy plane along the z axis (dxy=0). The 3D parameters obtained by averaging multiple single-molecule measurements of DNA constructs with $L_C$ in the range of 70-160 bp (FIGS. 3E, 3F, 3G) deviate from fitted calibration curves by 1-2 nanometers, for both a rigid-rod linear behavior and for a more realistic non-linear behavior based on the Worm-Like-Chain (WLC) model (Table 2).

Figure 3C:
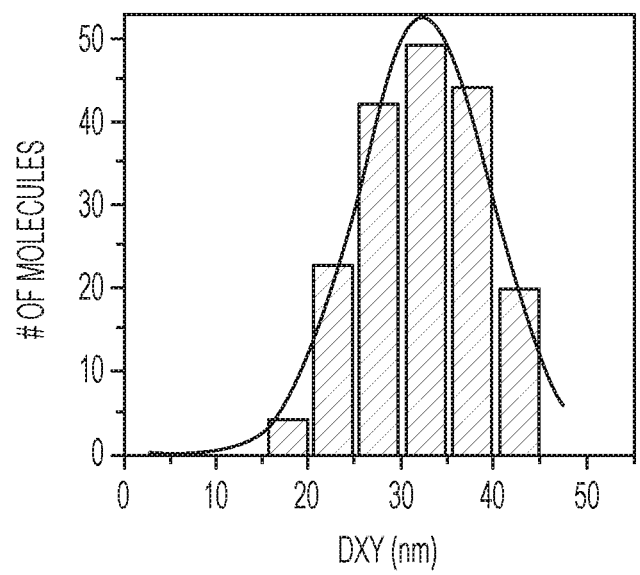
Figure 3D:
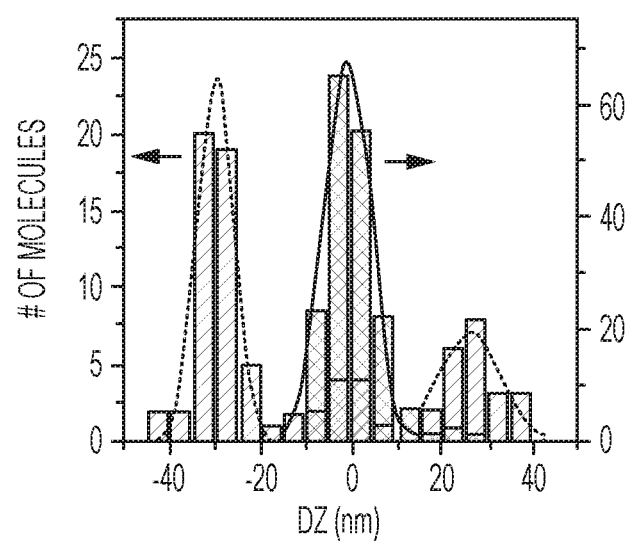
Figure 3E:
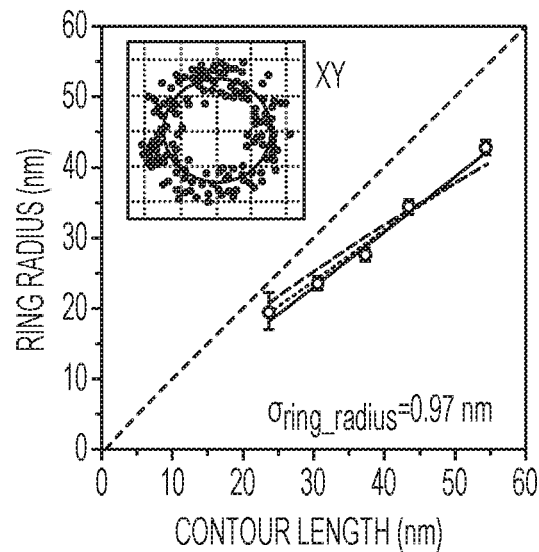
Figure 3F:
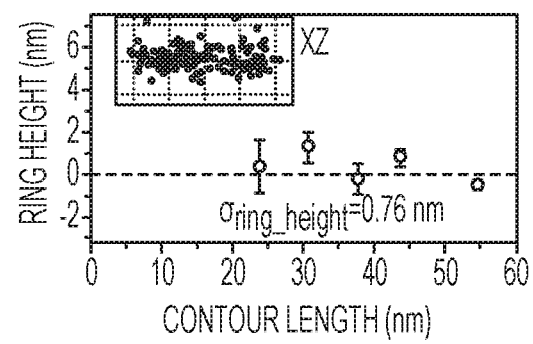
Figure 3G:
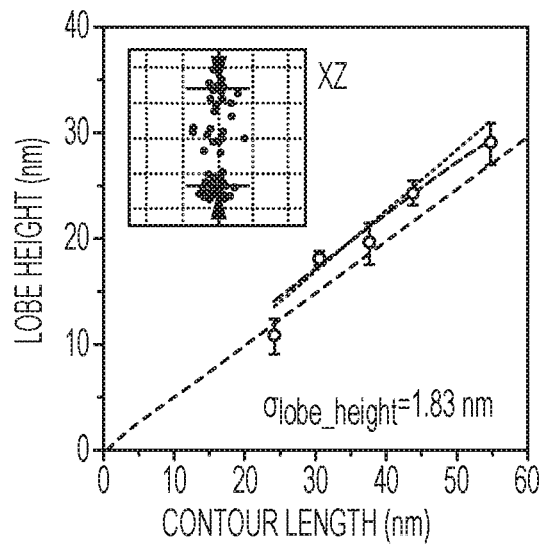

Table 2 shows fitting parameters for 3D DNA distance measurements (FIGS. 3E-3G).

streptavidin link between each DNA and the surface and on the interaction of each DNA with its environment on the local PEG-coated glass. Higher absolute accuracies, possibly less than 1 nm, can be obtained with better defined calibration standards, based on identically prepared single molecules—such as dsDNA molecules that are oriented using optical trapping (Pertsinidis et al., 2010) and/or employing 3D DNA scaffolds such as DNA origamis (Iinuma et al., 2014; Schmied et al., 2012).

3D Super-Resolution Imaging of Molecular Complexes in Cells

To further illustrate the range of structural biology applications enabled by modulation interferometry, human nuclear pore complexes (NPCs) in whole cells were analyzed using 3D super-resolution (SR) imaging and single particle averaging. Electron microscopy and cryo-electron tomography have revealed a stacked-ring NPC architecture (Hoelz et al., 2011; von Appen and Beck, 2016). A central 8-fold symmetric framework—comprised of an inner ring that surrounds the central ~40 nm transport channel—spans the 30 nm-thick nuclear envelope. The central framework is joined by asymmetric 100-120 nm diameter cytoplasmic and nucleoplasmic rings (CR and NR respectively). Additional peripheral structures complete the whole NPC: eight ~30 nm long cytoplasmic filaments (CF) originating from the CR and eight ~60 nm long filaments attached to the NR are bundled together into a distal ring, forming the nuclear basket (NB). Previous 2D SR imaging had analyzed the orientation of the "Y" sub-complex of the NPC scaffold (Szymborska et al., 2013) and determined the luminal positioning of the trans-membrane subunit gp210 (Loschberger et al., 2012). In 3D, the axial separation of cytoplasmic filaments, central channel and nuclear basket have been resolved with 4 pi (Huve et al., 2008), SIM (Chatel et al., 2012; Schermelleh et al., 2008) and STED (Gottfert et al., 2013) imaging. However, analyzing finer structural details, such as the 3D localization of individual nucleoporins (nups) within the NPC stacked-ring structure, has not yet been reported.

TABLE 2

| Contour Length (bp) | Residuals (nm) | | | | | | | |
|---|---|---|---|---|---|---|---|---|
| | WLC fit[a] | WLC fit[b] | y = Ax fit Ring Radius | y = Ax + B fit | y = 0 fit Ring Height | y = Ax fit | y = Ax + B fit Lobe Height | WLC fit |
| 70 | 0.20 | −1.00 | 1.27 | 2.05 | 0.38 | −2.84 | −3.39 | −3.30 |
| 90 | −0.91 | −2.02 | −0.06 | 0.42 | 1.31 | 0.52 | 0.35 | 0.30 |
| 110 | −1.75 | −2.62 | −1.31 | −1.13 | −0.23 | −1.92 | −1.71 | −1.76 |
| 128 | 0.96 | 0.39 | 0.88 | 0.78 | 0.85 | −0.61 | −0.06 | 0.01 |
| 160 | 2.19 | 2.32 | 0.81 | 0.23 | −0.47 | −2.08 | −0.92 | −0.39 |
| r.m.s. residual (nm) | 1.39 | 1.87 | 0.97 | 1.12 | 0.76 | 1.83 | 1.76 | 1.69 |

[a]Lp = 50 nm (fixed), α = 0.88, [b]Lp = 26 nm, α = 1 (fixed).

These results demonstrate that, once a z calibration has been established, modulation interferometry can measure average intermolecular 3D distances with ~1-2 nm uncertainties in the mean by averaging multiple nominally identical molecules. It is noted that, in this example, the ensemble of conformations and orientations of the surface-tethered DNA molecules is not exactly known and could also vary between individual molecules (e.g., as indicated from the spread of the histograms in FIGS. 3C, 3D). Such effects likely depend on the properties of the PEG-biotin- NPCs were visualized using domain-specific antibodies (Table 3) against nucleoporins nup358, nup98, and nup153 and Tpr. Previously, related epitopes on these subunits were localized by immuno-EM at the CFs, (Walther et al., 2002; Wu et al., 1995), the central framework (Chatel et al., 2012; Krull et al., 2004), the NR (Fahrenkrog et al., 2002; Krull et al., 2004), and on the NB near the distal ring (Frosst et al., 2002; Krull et al., 2004), for nup358, nup153 and Tpr, respectively. 3D SR imaging by modulation interferometry shows individual nups organized as rings with distinct diameters and at distinct axial separations from each other (FIG. 4A, FIGS. 10A-10J). The axial separations and radial positions are consistent with the overall NPC dimensions and the expected epitope localizations from immunogold labeling. From the average images, combining the information from up to ~200 pores, the average radial positions and the (pairwise) axial separations of the fluorescent labels with ~1-2 nm precision were obtained (FIG. 4B, FIGS. 10A-10J). Moreover, the nup153-nup98 relative axial separation independently deduced using the nup358 and Tpr as references agree to less than 1 nm (11.6 and 10.7 nm respectively).

Table 3 shows a list of primary antibodies used for NPC imaging.

TABLE 3

| Source | Catalog # | Type | Antigen | Dilution |
|---|---|---|---|---|
| Abcam | Ab84872 | Rabbit polyclonal IgG | human Nup153, aa 50-100 | 1:100 |
| Abcam | Ab84516 | Rabbit polyclonal IgG | human TPR Aa 2300-2349 | 1:50 |
| Cell Signaling Technology | C39A3 | Rabbit monoclonal IgG | human Nup98, residues surrounding Pro671 | 1:50 |
| Elias Coutavas and Gunter Blobel, (Wu et al., 1995) | n.a. | Rabbit polyclonal IgG | Human Nup358, aa 2550-2837 (C-288) | 1:400 |

These results demonstrate that modulation interferometry can resolve the average positions of fluorescent labels targeting subunits of a large macromolecular complex, in situ, with 3D localization precisions down to a few nanometers after averaging multiple single particles. At this level of resolution, the size of the bulky primary and secondary antibodies becomes non-negligible, as the dye positions can be systematically offset from the epitopes by up to ~10-15 nanometers (Szymborska et al., 2013). Thus, the exact mapping of nup98 and nup153 will require smaller probes that can position the fluorescent labels closer to the targets, e.g., within 2 nm using nup-specific nanobodies (Pleiner et al., 2015), as well as 3D registration relative to nups that have been fit to EM structural models (rather than the flexible and less well characterized peripheral CF and NB structures that was used here).

Real-Time Tracking of the Transcription Cycle in 3D

Figure 5A:
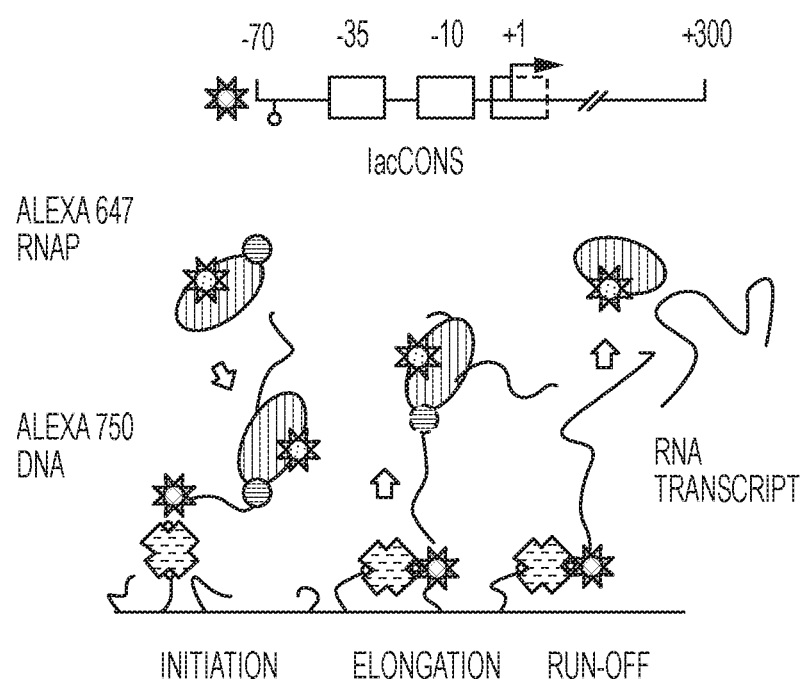
FIGS. 5A-5E show 3D tracking of RNA polymerase transcription in Real-Time.
Figure 5B:
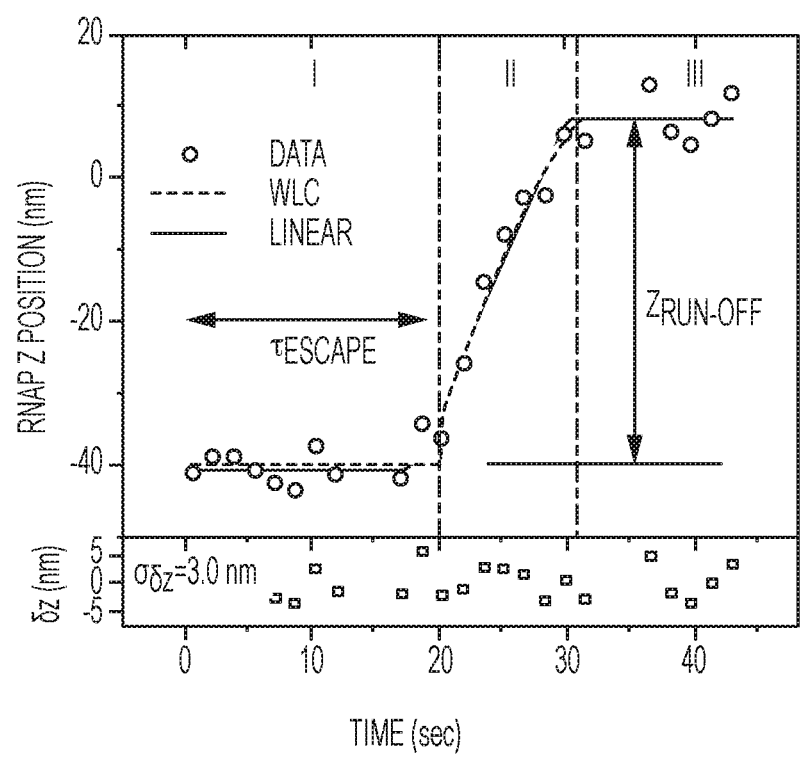
Figure 5C:
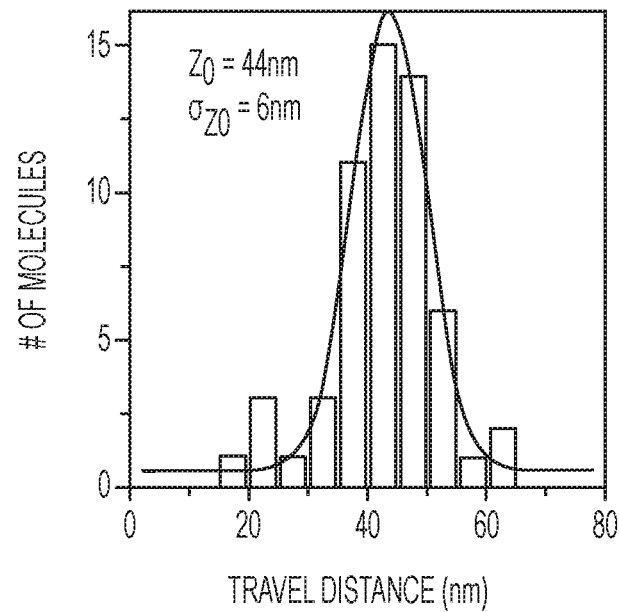

To extend the improved 3D localization capabilities beyond measurements of static, time averaged distances and enable imaging dynamic phenomena, a single molecule transcription assay was developed based on real-time nanometer-scale axial tracking of proteins on surface-tethered DNA molecules and in the absence of externally applied stretching force (FIG. 5A). DNA templates were designed containing a consensus lac promoter (lacCONS) that allow synthesis of 300 nt run-off transcripts in the direction away from the surface-tethered end. Traces of single Alexa 647-RNAP that co-localized with promoter DNAs typically showed an initial stationary period, followed by an interval of directional z movement away from the surface, another stationary phase and eventual disappearance of the Alexa 647 signal (FIG. 5B). Several control experiments (Table 4, FIG. 11A) indicate that such events correspond to promoter-specific RNAP transcription: (A) significantly fewer events were observed for (i) DNA with a mutated promoter, (ii) in the absence of NTPs; (B) directional z movement (i) was predominantly away from the surface, corresponding to the downstream direction, (ii) was reversed towards the surface when the biotin was placed at the downstream DNA end; (C) the total distance travelled has a tight distribution that depends on the downstream template length, increasing from ~0.23 nm for a 200 nt run-off transcript (−170 . . . +200 DNA templates, FIGS. 11C-11F) to ~0.44 nm for a 300 nt run-off transcript (~70 . . . +0.300 DNA templates, FIG. 5C).

Table 4 shows RNAP sliding movement control experiments.

TABLE 4

| Experiment[a] | Template | # DNAs | # FWD events | # BWD events | % DNA FWD | % DNA BWD[b] |
|---|---|---|---|---|---|---|
| #1 | A750 KILLED | 218 | 7 | 10 | 3.2% | 4.6% |
|  | Cy3 CONS | 380 | 73 | 10 | 15.3% | 2.4% |
|  | A750 CONS | 276 | 74 | 4 | 19.2% | 1.4% |
|  | Cy3 KILLED | 511 | 45 | 12 | 7.8% | 2.3% |
| #2 | A750 KILLED | 298 | 7 | 2 | 2.0% | 0.7% |
|  | Cy3 CONS | 300 | 14 | 5 | 4.3% | 1.7% |
|  | A750 CONS | 300 | 36 | 1 | 9.3% | 0.3% |
|  | Cy3 KILLED | 300 | 6 | 1 | 2.0% | 0.3% |
| #3 | A750 KILLED | 251 | 13 | 6 | 4.0% | 2.0% |
|  | Cy3 CONS | 427 | 59 | 3 | 11.5% | 0.7% |
|  | A750 CONS | 515 | 172 | 17 | 25.0% | 3.3% |
|  | Cy3 KILLED | 534 | 65 | 26 | 10.5% | 4.9% |
| #4 | A750 KILLED | 764 | 36 | 62 | 4.5% | 8.0% |
|  | Cy3 CONS | 725 | 107 | 41 | 12.3% | 5.0% |
|  | A750 CONS | 281 | 47 | 6 | 14.2% | 2.1% |
|  | Cy3 KILLED | 497 | 28 | 13 | 5.4% | 2.4% |
|  | A750 CONS-NTPs | 140 | 1 |  | 0.7% |  |
|  | Cy3 CONS-NTPs | 667 | 11 |  | 1.6% |  |
| #5 | Cy3-bio KILLED | 433 | 1 | 3 | 0.2% | 0.7% |
|  | Cy3-bio CONS | 366 | 46 | 2 | 10.1% | 0.5% |
|  | bio-Cy3 CONS | 519 | 4 | 41 | 0.8% | 7.1% |
| #6 | Cy3-bio KILLED | 548 | 7 | 4 | 1.3% | 0.7% |
|  | Cy3-bio CONS | 541 | 50 | 5 | 7.2% | 0.9% |
|  | bio-Cy3 CONS | 690 | 8 | 57 | 1.2% | 6.7% |

[a]Experiments #1-4: 370 bp DNA templates containing positions −70 . . . 300. Experiments #5, 6: 370 bp DNA templates containing positions −170 . . . 200. All experiments performed with Alexa 647 - core/unlabeled 670 holoenzyme. Total observation time 1950 sec (975 sec for #2).
[b]Percentage of DNA molecules that show FWD/BWD sliding events.

Figure 5D:
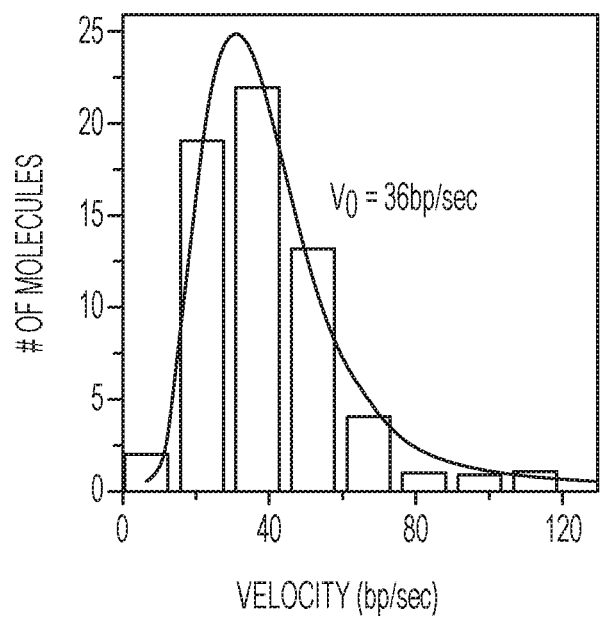

The velocity of individual transcribing polymerases varied from trace to trace, exhibiting a distribution that can be fitted to a log-normal curve with mean $v_0$=36 bp/sec (FIG. 5D). The observed trace-to-trace variability is in agreement with previous observations (Neuman et al., 2003; Tolic-Norrelykke et al., 2004) and possibly reflects inherent heterogeneity in the catalytic activity over the population of molecules.

Figure 5E:
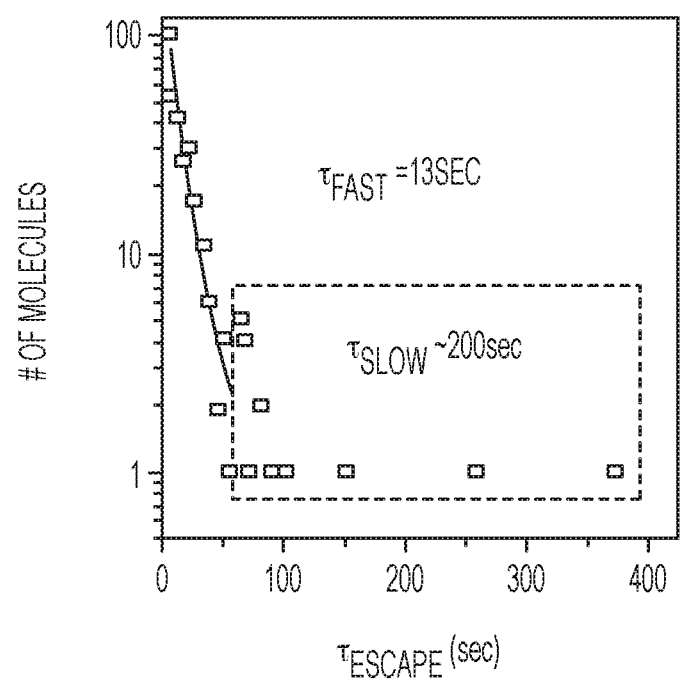

It was discovered that the lifetime distribution of the initial stationary state I, which reflects the time $\tau_{escape}$ to clear the promoter (FIG. 5B), exhibited complex kinetics (FIG. 5E). Most of the RNAP complexes (96%) clear the promoter and start elongating with a characteristic time $\tau_{fast}$=13 sec. Interestingly, a second population of molecules (4%) took significantly longer to clear the promoter ($\tau_{slow}$~200 sec), which could possibly reflect alternative initiation/promoter clearance pathways, such as previously hypothesized "moribund" complexes (Susa et al., 2002). Alternatively, without wishing to be bound to any theory, a fraction of molecules might be entering minute-long $\sigma^{70}$-dependent promoter-proximal pauses at an extended −10 element at position +17 of the lac promoter (Brodolin et al., 2004; Nickels et al., 2004). These results underscore the importance of the single-molecule approach to tease out heterogeneous populations and dissect complex kinetics and strongly suggest that such assays can track, in real-time with nanometer precision, individual RNA Polymerases as they progress through a full transcription cycle of promoter recognition, initiation, elongation and run-off on single DNA templates.

Resolving Promoter-Proximal Transcription Pausing

During transcription the movement of RNA Polymerase is often interrupted by DNA sequence-dependent pauses that facilitate interactions of RNAP with regulatory factors and coordinate the emergence of the nascent RNA transcript with cellular processes that utilize it. Optical tweezers have provided many quantitative insights on the pausing of mature elongation complexes; however transcription initiation and promoter clearance can be very sensitive to externally applied force/torque. Pausing in the context of the full transcription cycle, and in particular of early elongating complexes soon after they have cleared the promoter, has thus been very challenging to observe with single-molecule techniques. The ability of the provided imaging systems and methods to resolve pauses at the "core recognition" element (Larson et al., 2014; Vvedenskaya et al., 2014), a motif recently discovered to be enriched at translation initiation sites; at typical distances 20-200 nt beyond the transcription start site (TSS) was tested. Such pauses are speculated to facilitate synchronization of transcription and translation in bacteria.

Figure 6A:
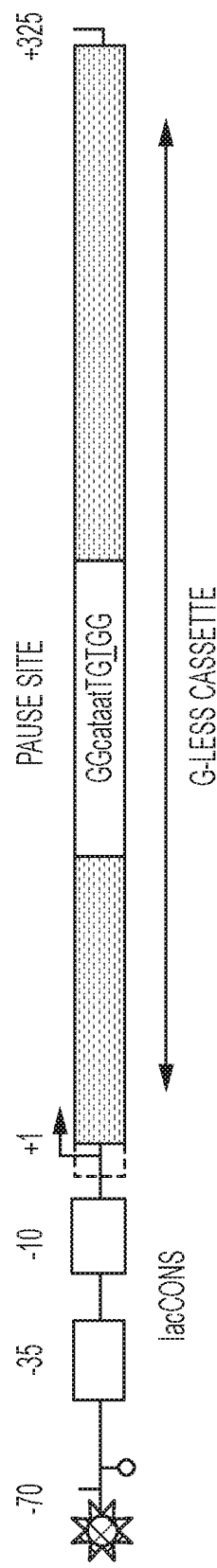
FIGS. 6A-6G show resolving transcriptional pausing and open complex to elongation complex conformational changes.
Figure 6B:
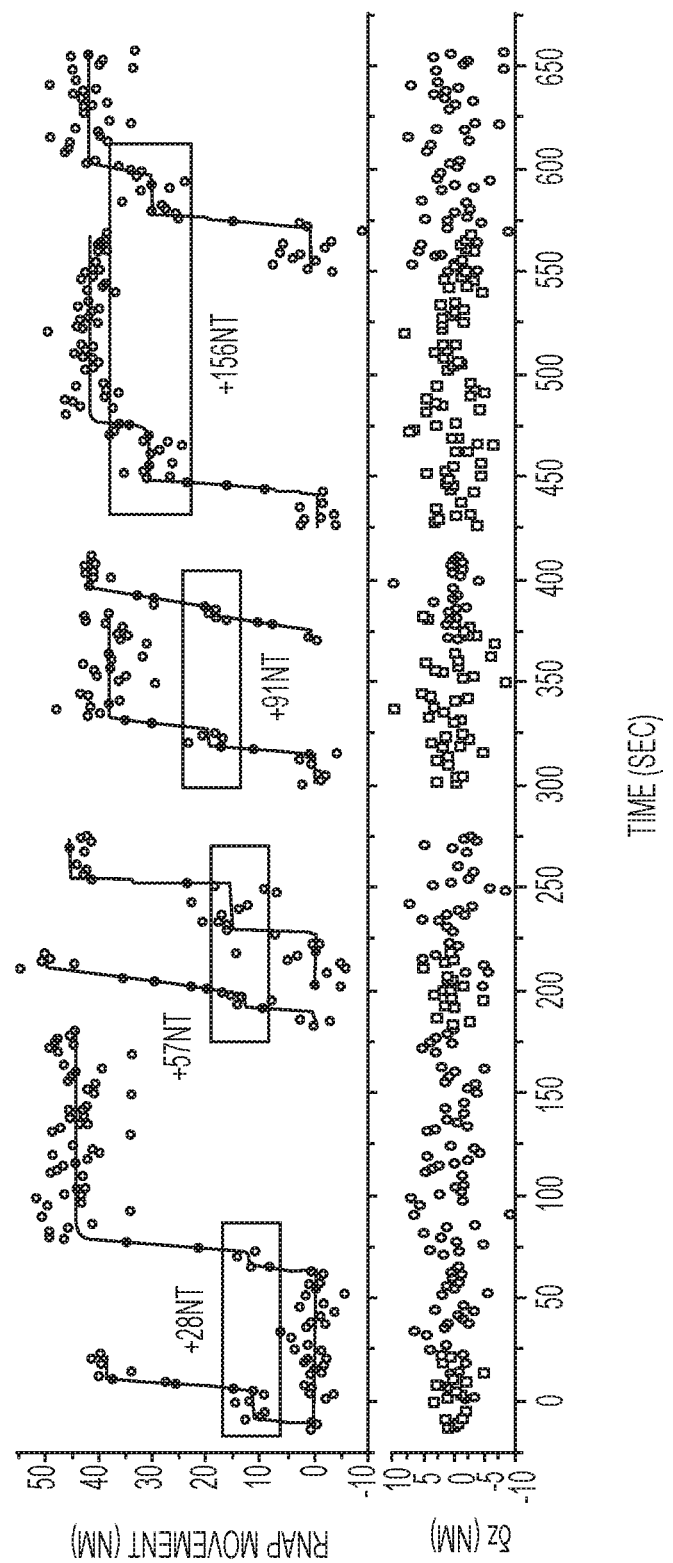

Transcription DNA templates with a single consensus pause embedded at various positions (21 nt-156 nt) downstream of the lacCONS TSS in a ~300 nt G-less cassette were created (FIG. 6A). As the pause escape rate depends on GTP concentration (Larson et al., 2014), using the G-less cassette allowed tuning the pause duration independently of the RNAP velocity along the rest of the transcription template. Real-time traces of individual RNAPs showed a clear additional plateau between the 2 stationary phases observed for constructs without pause site (FIG. 6B). In ~60% of the traces that showed discernible plateaus, the RNAP resided long enough at the pause site before eventually escaping to allow accurate determination of the pause duration and plateau position (see Experimental Procedures details for 5-segment linear model fitting). The pause escape lifetime distributions can be fitted to a single-exponential decay, with $\tau_{pause}$=7.5-20 sec for the various pause constructs (FIG. 12). An additional ~40% of traces showed continuous RNAP movement between the initial and final plateaus, with no discernible pausing plateau-likely reflecting a sub-population of molecules that do not pause (Larson et al., 2014; Vvedenskaya et al., 2014) as well as short pauses lasting less than 5 seconds (<3 frames) that are missed due to the 1.6 second time resolution.

Figure 6C:
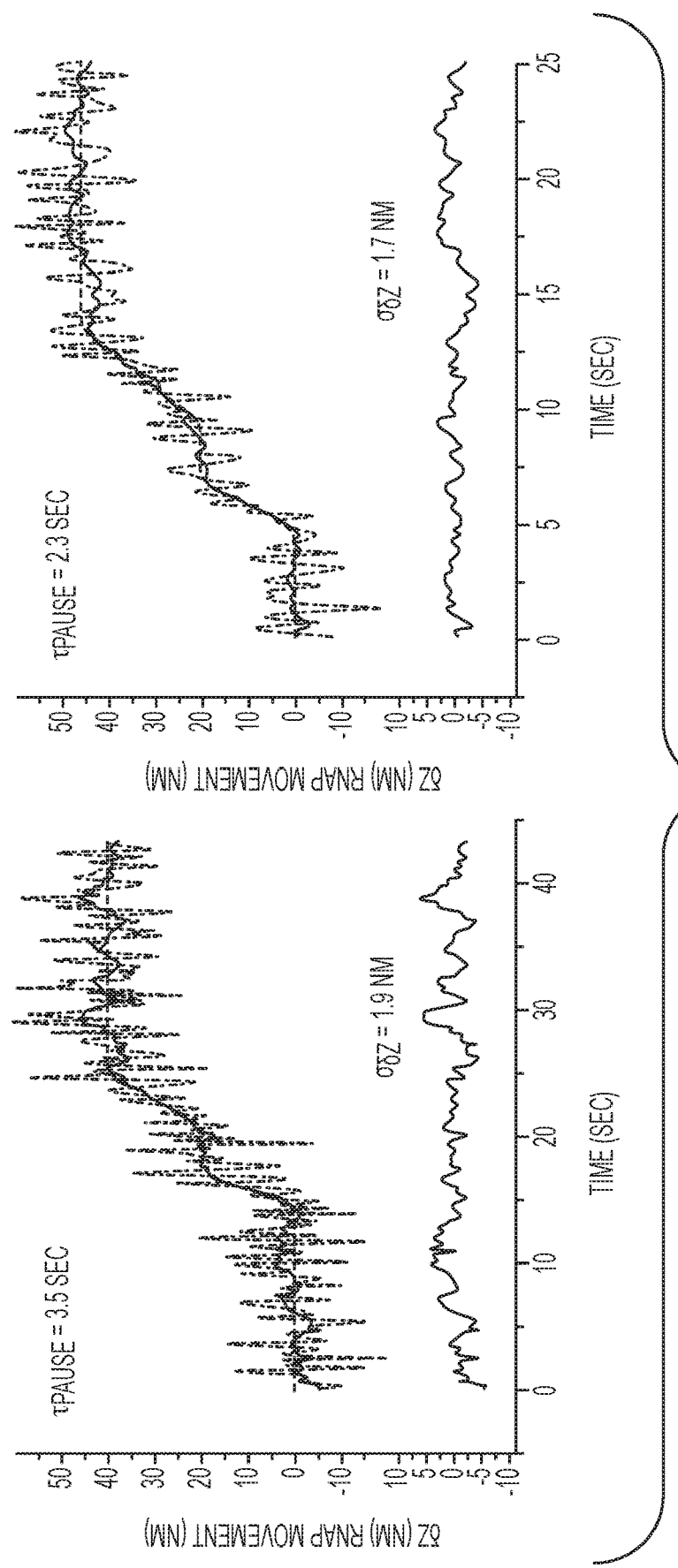
Figure 6D:
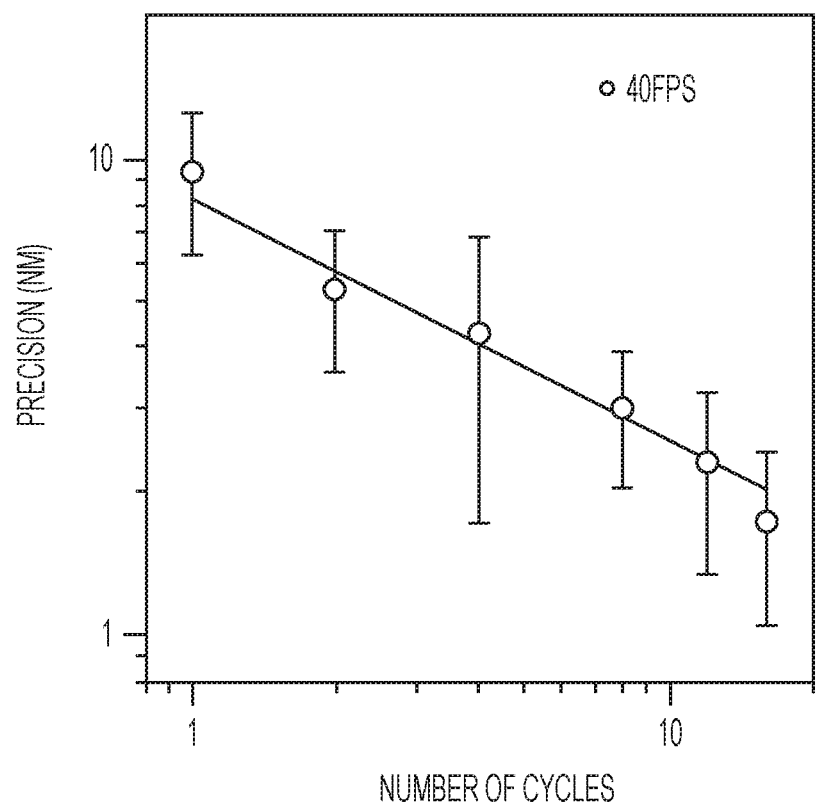

It is noted that shorter pauses, down to a few seconds, can be resolved by sampling the RNAP trajectory at 8-fold higher temporal resolution (200 msec/cycle) (FIG. 6C). Faster sampling also enables reducing time-dependent excess localization noise by averaging multiple adjacent cycles, down to ~2 nm tracking precision (FIG. 6D).

Figure 6E:
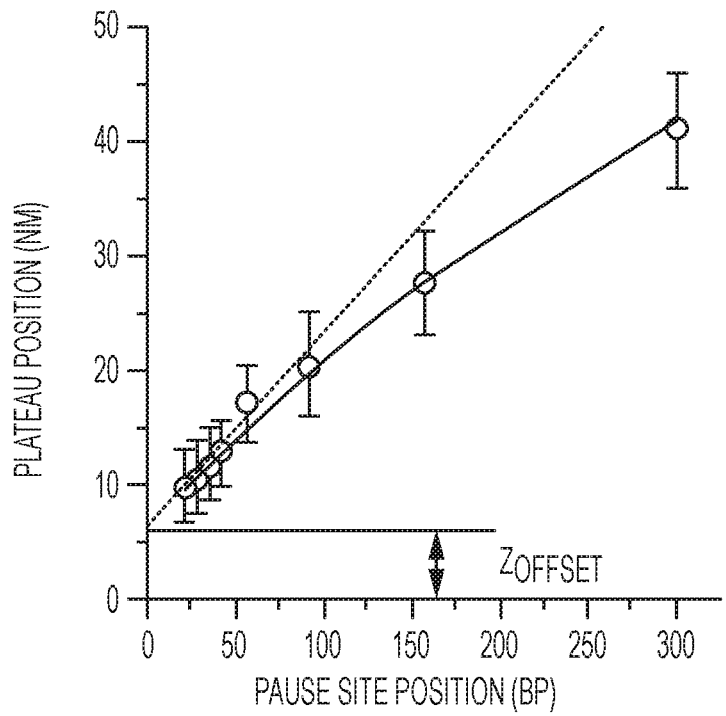

The data showed excellent reproducibility of the pause plateau position: 2.8-3.2 nm and 4-4.5 nm r.m.s. for pauses at 21 nt-57 nt and 91 nt/156 nt respectively (FIG. 6E). The high localization precision of modulation interferometry allowed resolving the accumulation of paused RNAP density (FIG. 12), for pauses 21 nt and 28 nt from the TSS, which are separated only by 9-10 nm from the initial plateau. Importantly, paused RNAP density is resolved significantly better with tracking precision less than 3.5 nm compared to greater than 3.5 nm (FIG. 12), illustrating the advantage of modulation interferometry in tracking RNAP movement and resolving promoter-proximal pausing.

RNAP Trajectory and Conformational Changes from Open to Elongation Complex

The dependence of the measured pause plateau position vs. the pause site position was used in the DNA sequence to perform a detailed calibration of the RNAP trajectory. For movement up to 91 nt, the physical pause position increases linearly with DNA sequence spacing, however beyond 91 nt the trajectory deviates substantially from linearity, as expected from the semi-flexible nature of the DNA template. The data fit well to a Worm-Like-Chain (WLC) model, typically used to describe DNA end-to-end distance fluctuations (FIG. 6E).

Figure 6F:
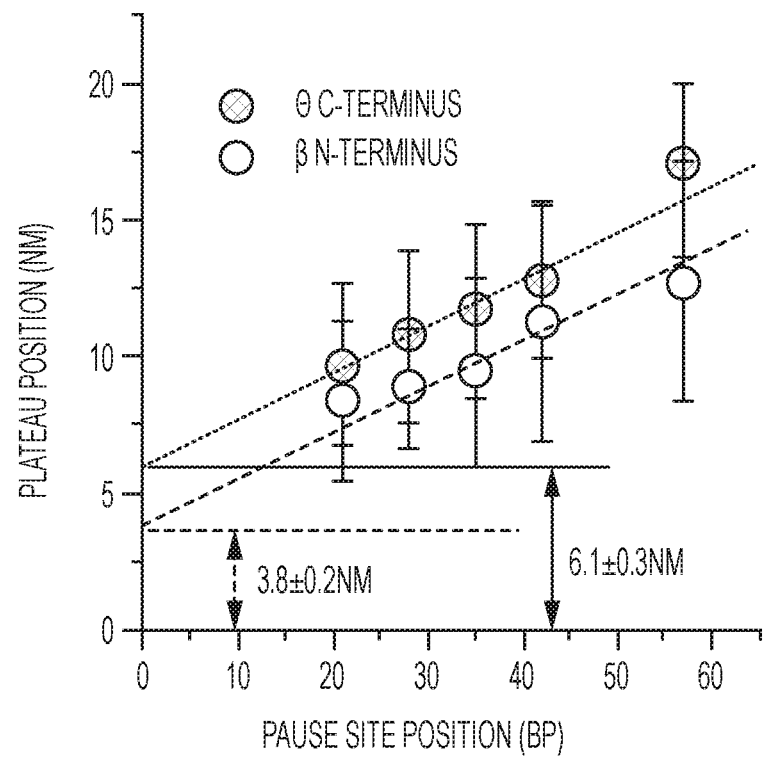
Figure 6G:
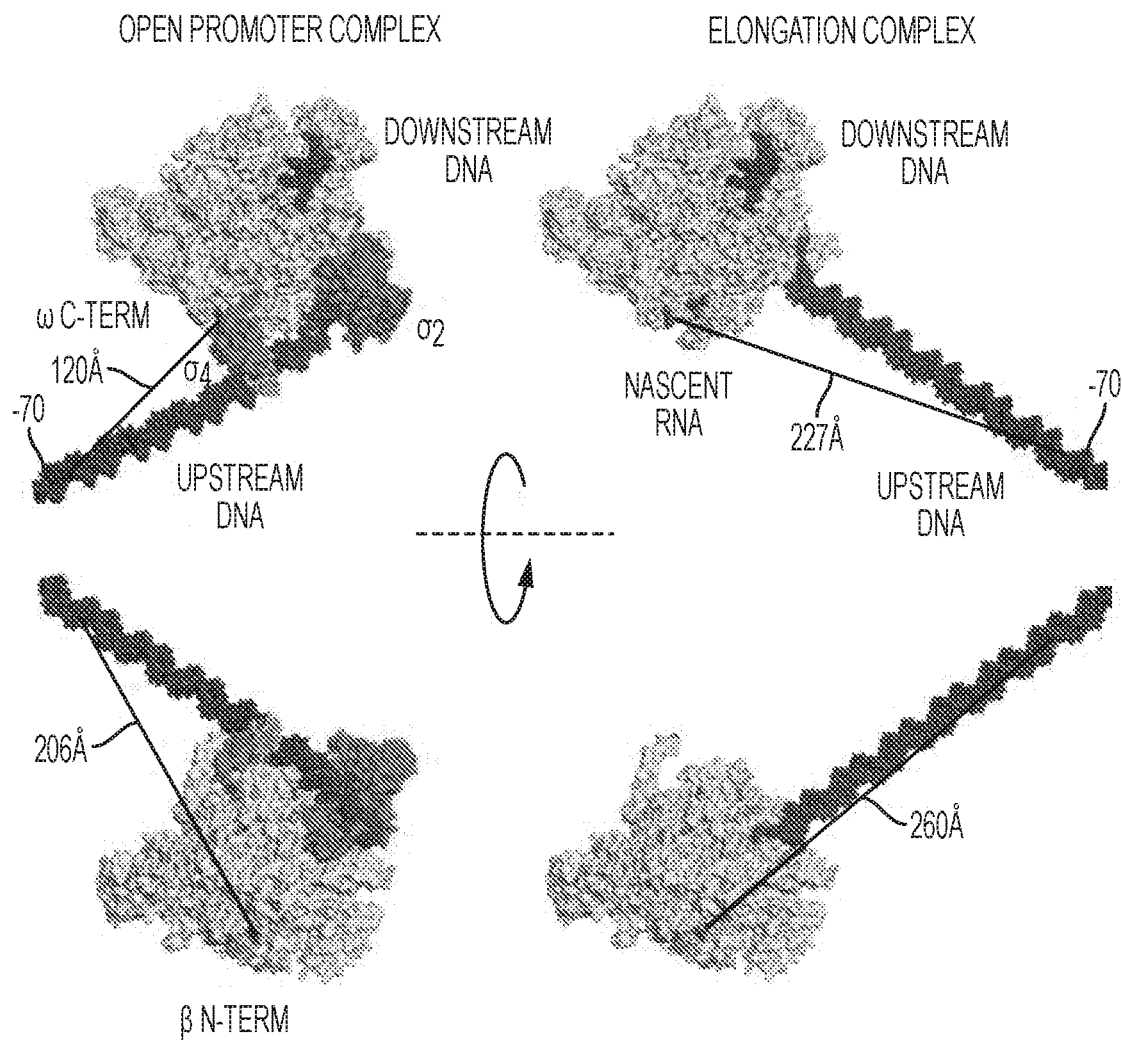

Strikingly, it was discovered that, when extrapolated to the TSS, the pause plateau position does not reach zero but exhibits a positive y-axis offset of 6 nm. This offset likely reflects a finite increase in the distance between the SNAP-tag label on the omega subunit of RNAP and the −70 position on the lacCONS DNA upon the transition from an open/initially transcribing RNAP complex to the elongating RNAP complex (FIGS. 6F, 6G). Placing the SNAP-tag at an alternative location on the core RNAP complex—the N-terminus of the beta subunit—decreases the y-axis offset to 3.8 nm, consistent to 0.7-1.1 nm with the distance changes based on the structural models (FIG. 6G and Table 5). These results further exemplify the ability of modulation interferometry to probe movements and conformations of molecular complexes with nanometer resolution.

Table 5 shows distances [a] between −70 position on DNA and positions on RNAP.

TABLE 5

| Position on RNAP | Distance to position −70 OC | Distance to position −70 TEC | Difference TEC − OC | Expected z-offset[b] | Measured z-offset | Deviation |
|---|---|---|---|---|---|---|
| Omega C-terminus | 12.0 | 22.7 | 10.7 | 5.4 | 6.1 | 0.7 |
| Beta N-terminus | 20.6 | 26.0 | 5.4 | 2.7 | 3.8 | 1.1 |

[a]Distances in nanomeneters.
[b]Assuming the dye on RNAP explores a semi-spherical shell centered on the tethering point at −70 position on the DNA.

Simultaneous Multi-Color Imaging Reveals the Fate of Initiation Factors

To address the cycling of the sigma factor during transcription, the provided methods were extended to 3 colors to simultaneously track sigma and core RNAP subunits (FIG. 7A, FIGS. 13A-13H). In the literature, "obligate release" models postulate a precise point —typically when the nascent RNA transcript grows to the point where it completely displaces core-bound sigma (Krummel and Chamberlin, 1989; Metzger et al., 1993)—beyond which sigma cannot remain bound to the elongation complex. An alternative view suggests that upon promoter clearance sigma remains bound to RNAP, albeit with lower affinity and dissociates "stochastically" (Raffaelle et al., 2005; Shimamoto et al., 1986), with a rate given by the residual sigma-core interactions—notably, estimates on the extent and duration of sigma retention vary over orders of magnitude (4 sec to greater than 50 min). The release models are challenged by a contrasting class of "non-release/partial-release" models, according to which a fraction of sigma might remain bound to the elongating RNAP, where it can enable multi-round transcription or regulate RNAP elongation (Bar-Nahum and Nudler, 2001).

Figure 7A:
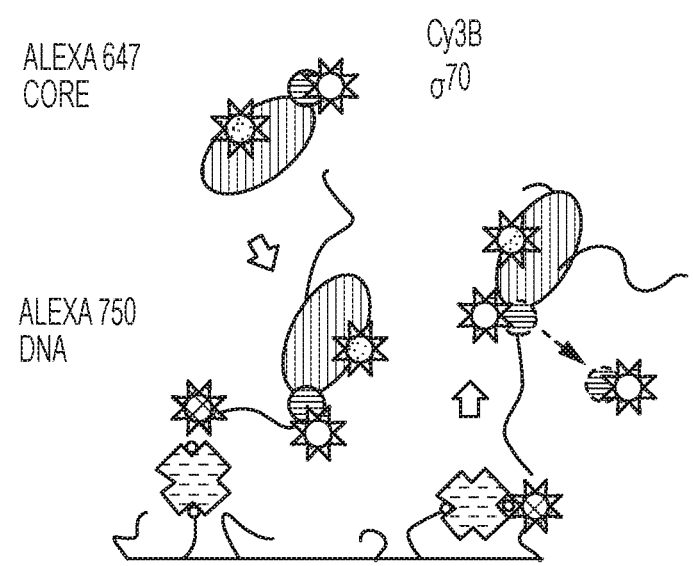
FIGS. 7A-7F show that multi-color imaging reveals the fate of initiation Factors.
Figure 7B:
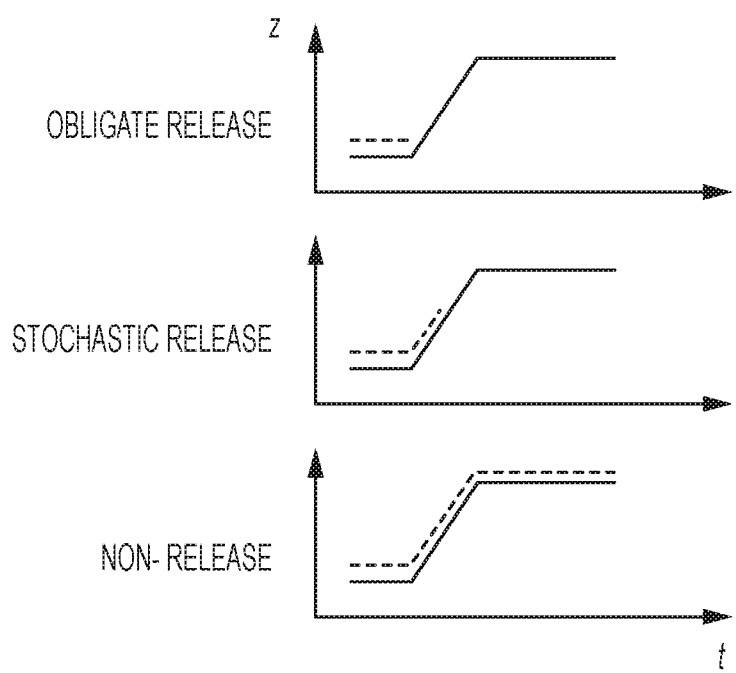
Figure 7C:
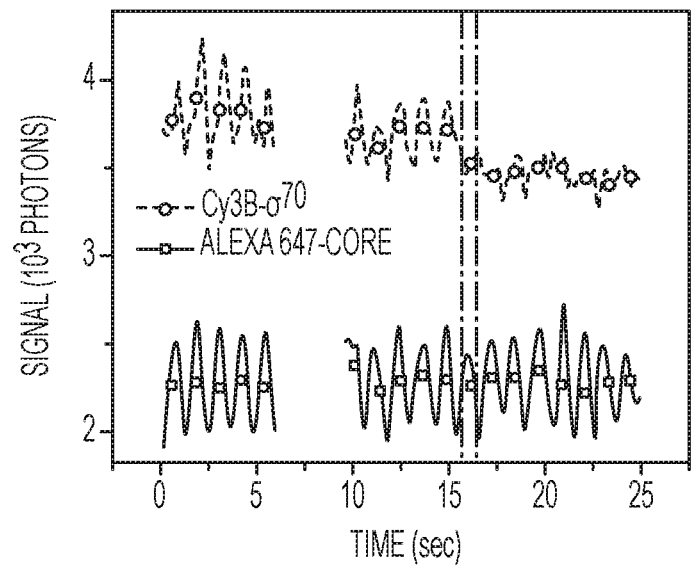
Figure 7D:
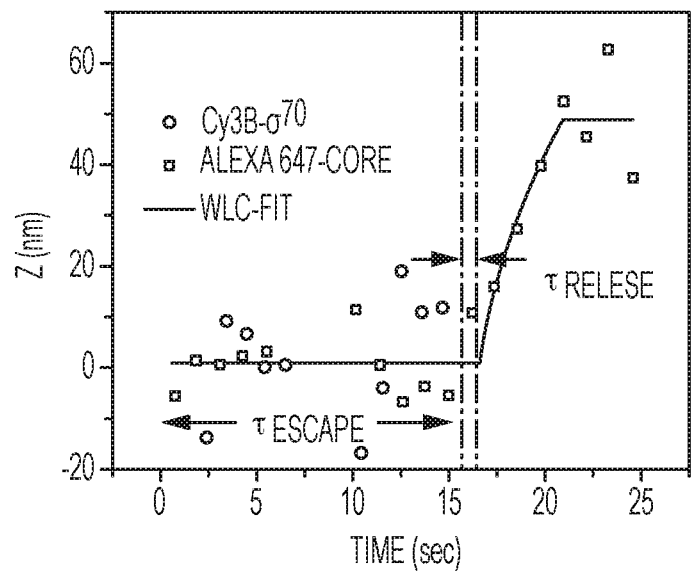
Figure 7E:
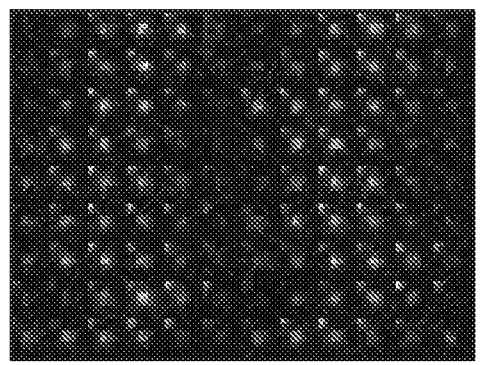
Figure 7E:
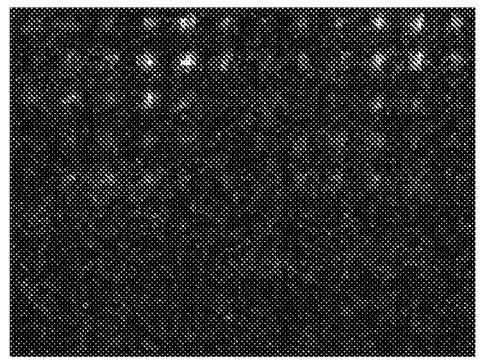

The provided systems and methods differentiated among the three proposed models based on the very distinct behaviors the models predict for sigma and core trajectories (FIG. 7B). In real-time traces it was observed that Alexa 647-labeled core RNAP and Cy3B-labeled $\sigma^{70}$ appear simultaneously on Alexa 750 DNA templates and both sigma and core remain stationary until core movement begins (FIGS. 7C, 7D). As RNAP proceeds to elongate along the template, the majority (>85%) of Cy3B-labeled $\sigma^{70}$ molecules disappear almost coincidental with the onset of Alexa 647-core movement (FIGS. 7D, 7E). The distribution of time delays $\tau_{release}$ between promoter clearance (as reflected by the onset of Alexa 647-core movement) and Cy3B-$\sigma^{70}$ release (as reflected by the disappearance of Cy3B signal), exhibits a tight peak (FIG. 7F) at +0.2 sec, with a width of 1.4 sec ($1\sigma$). The measured distribution reflects the actual release rate, convolved with the experimental uncertainties (Extended Experimental Procedures (or Appendix A), equation (13)). Quantitative analysis of the $\tau_{release}$ distribution indicates upper bounds for release time ~0.25-0.5 sec (Table 6).

Table 6 shows fitting parameters [a] for $\sigma^{70}$ release time distributions.

TABLE 6

| | Convolution of exponential and Gaussian | | | Gauss peak | |
|---|---|---|---|---|---|
| | $\tau_0$ | $\sigma_\tau$ | $\tau_{Offset}$ (sec) | Peak position (sec) | $\sigma$ (sec) |
| lacCONS, 25° C.[b] | 0.25 ± 0.22 | 1.38 ± 0.18 | −0.06 ± 0.01 | 0.17 ± 0.19 | 1.40 ± 0.09 |
| lacCONS, 35 C.[c] | 0.23 ± 0.27 | 1.36 ± 0.17 | 0.29 ± 0.17 | 0.51 ± 0.19 | 1.29 ± 0.19 |
| lacUV5, 35° C.[d] | 0.25 ± 0.13 | 1.66 ± 0.11 | −0.51 ± 0.21 | −0.31 ± 0.06 | 1.74 ± 0.07 |

Figure 7F:
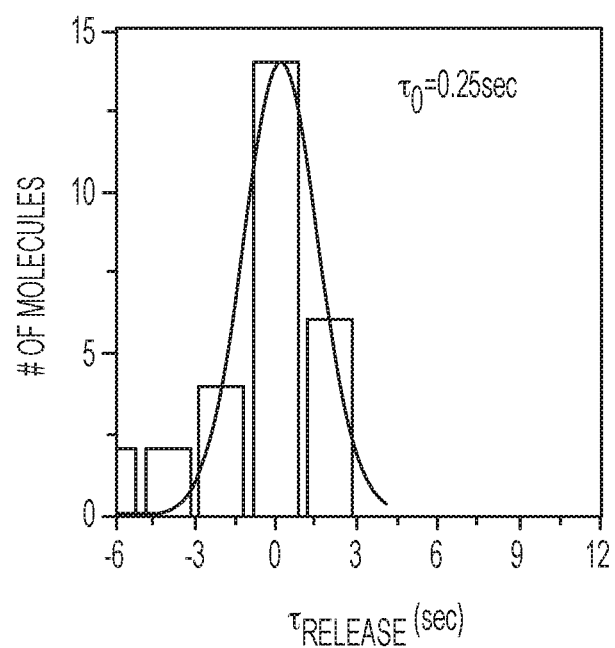
Figure 8A:
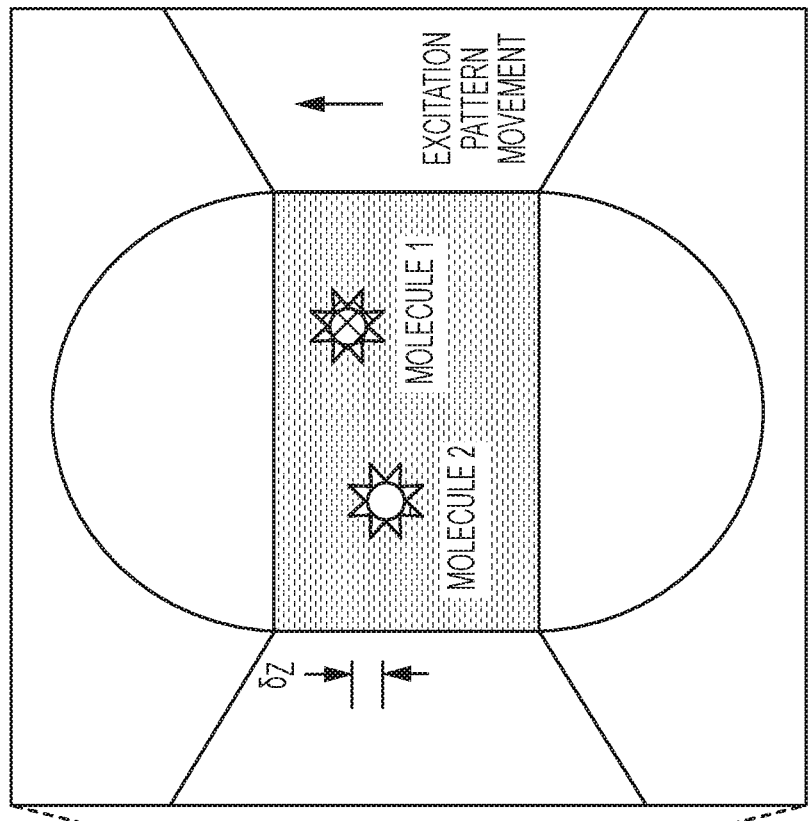
FIGS. 8A-8G show principles of single-molecule axial localization using modulation interferometry, related to FIG. 1.
Figure 8C:
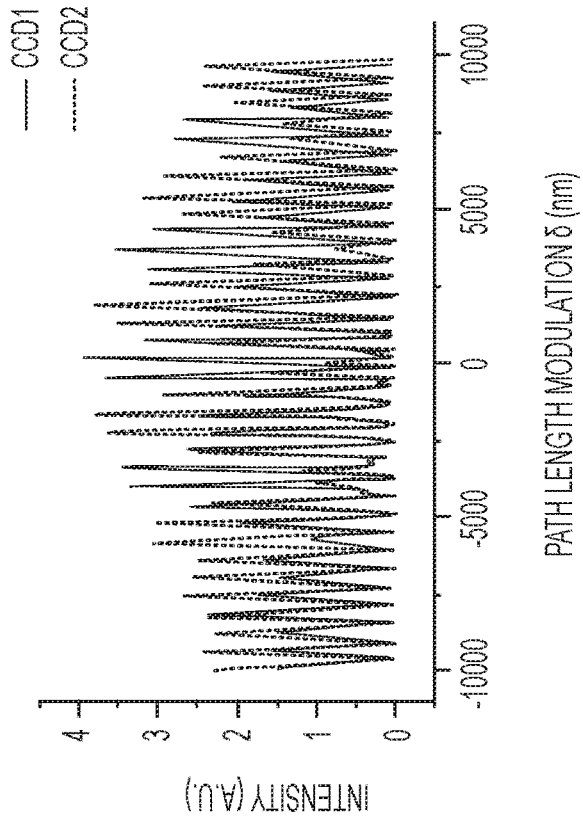
Figure 8B:
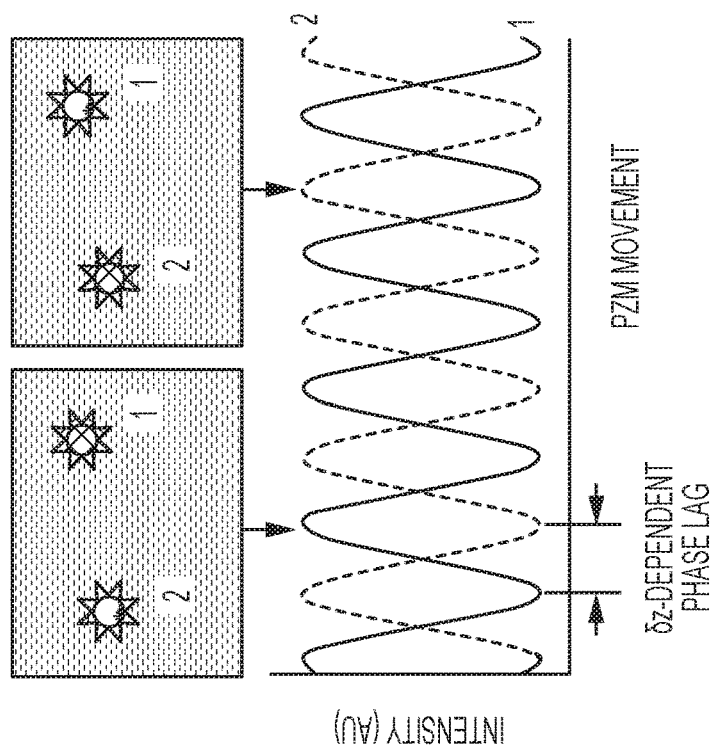
Figure 8D:
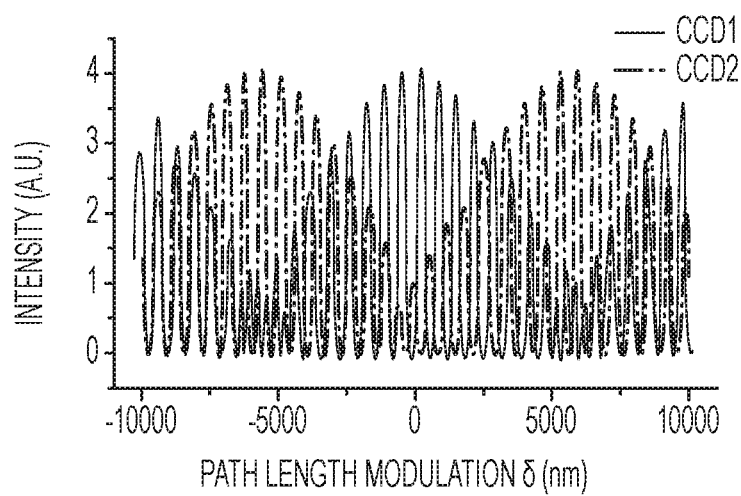
Figure 8E:
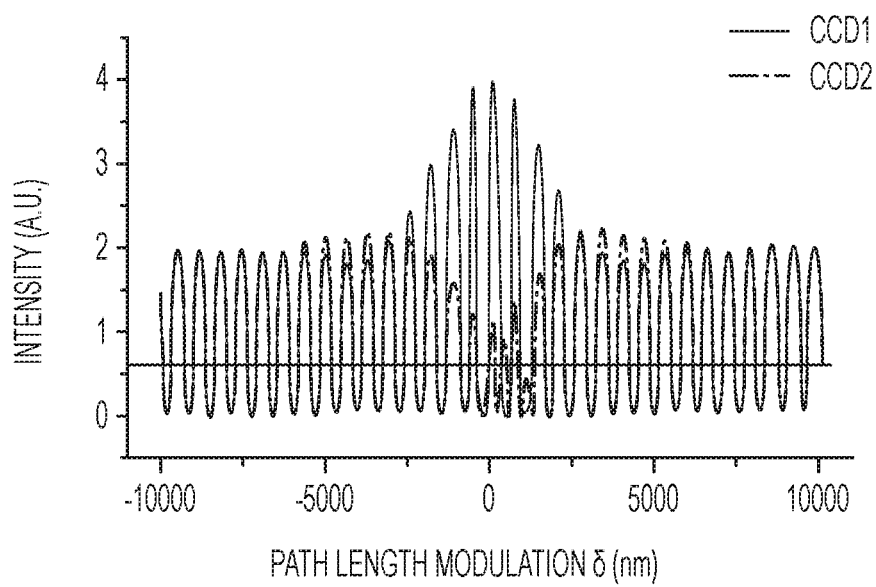
Figure 8F:
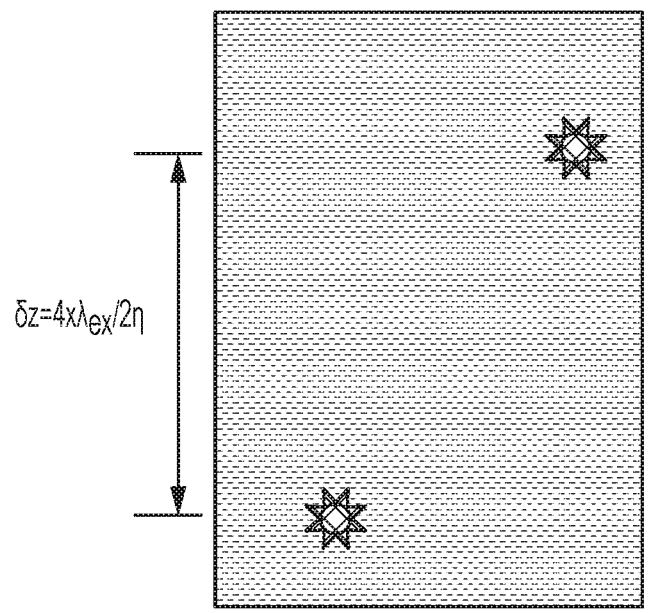
Figure 8G:
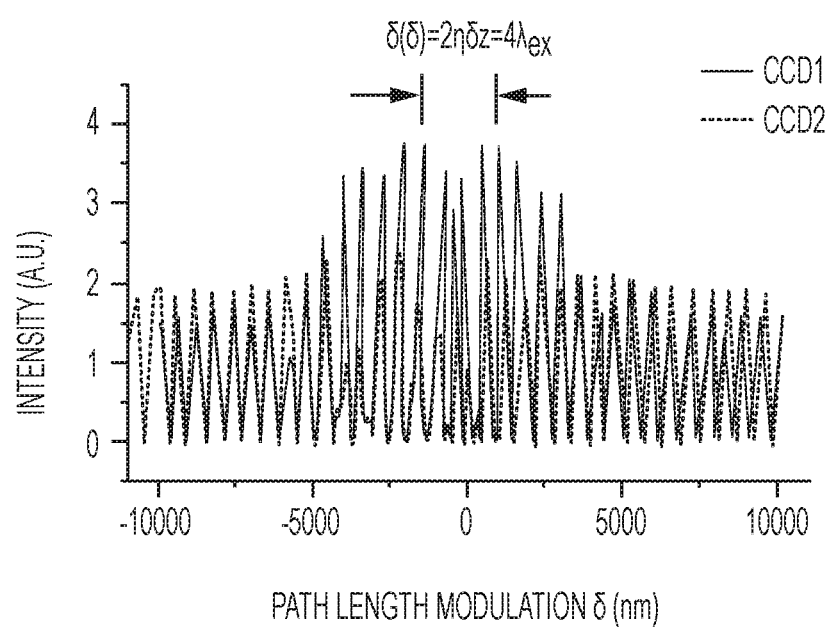

[a]Uncertainties are ± standard error.
[b]FIG. 7F;
[c]FIG. 14D;
[d]FIG. 14H

Also tested was the release of $\sigma^{70}$ at the lacUV5 promoter that had been used in previous ensemble and single-molecule FRET experiments. At 25° C., contrary to lacCONS, it was observed very infrequent productive initiation events for lacUV5 (>14×lower event frequency), consistent with biochemical experiments showing that the equilibrium between closed and open promoter complexes, as well as the rate of open complex formation at the lacUV5 promoter change very abruptly between 20-30° C. (Buc and McClure, 1985; Spassky et al., 1985). Thus, single-molecule transcription assays were performed on lacUV5 and lacCONS side-by-side at 35° C. (FIGS. 14A-14J), where frequent productive events for both promoters were observed (~2× difference). For both lacUV5 and lacCONS at 35° C., it was observed that no $\sigma^{70}$ molecules travelling with the elongating RNAP—sigma release occurs within <0.25-0.5 sec of promoter clearance (0.25 sec upper bounds, FIGS. 14D, 14H, Table 6)—further corroborating the results obtained for lacCONS at 25° C.

Discussion

Comparison of Modulation Interferometry with Other Single-Molecule Localization and Super-Resolution Approaches 3D modulation interferometry offers a powerful combination of molecular-scale spatial localization precision and accuracy, real-time tracking and multi-color capabilities that make it well-suited for studying large macromolecular assemblies at the single-molecule level. Compared to conventional single-lens super-resolution methods (Jia et al., 2014; Kao and Verkman, 1994; Pavani et al., 2009), it offers ≥10×higher axial resolution. Importantly, the improved performance, reaching sub-2 nanometer z localization precision, is achieved without compromising the focal-plane characteristics of the detection system and can be readily combined with other sub-nanometer xy capabilities.

In certain embodiments, the full potential of 3D modulation interferometry is realized in multi-color experiments. Compared to two-lens fluorescence self-interference methods (Aquino et al., 2011; Shtengel et al., 2009), modulation interferometry not only offers robust operation that is less prone to errors due to drift and misalignment, with a demonstrated 2-4× higher axial localization accuracy for single fluorophores, but also enables straightforward simultaneous multi-color imaging via simple addition of extra excitation wavelengths. This additional versatility does not compromise temporal resolution compared to multi-phase beam-splitting. Although modulation interferometry obtains phase shifting sequentially in time, through consecutive rather than a single CCD exposure, any interferometric method needs to resolve an intensity modulation above background and shot noise. Thus the limit is set by fluorophore brightness and background level and not by the hardware.

The concept of modulation interferometry should be generalizable to optical schemes beyond the wide-filed epi-illumination counter-propagating plane-wave interference demonstrated here. Superimposing focused excitation beams and implementing confocal detection in a point-scanning setup would further reduce out-of-focus background, while allowing the use of single-photon counting instrumentation, enabling additional access to parameters such as fluorescence lifetime and anisotropy. Lastly, when operated over multiple cycles, the background and noise reduction effect of phase-sensitive detection afforded by modulation interferometry could also prove useful in extracting single-molecule signals that are masked at solution concentrations higher than ~100 nM, conditions relevant for single-molecule detection of native factors in cells.

Moreover, in certain embodiments, the present disclosure provides for systems and methods that use modulation interferometry for performing live cell single-molecule imaging by replacing an epi-illumination scheme with a selective-plane illumination scheme based on optical lattices (LLS illumination).

For example, the embodiment depicted in FIG. 18 achieves a less out-of-focus background and higher signal-to-noise ratio because, among other things, it uses a more confined detection volume. Interferometric LLS microscopy has a higher signal-to-noise ratio compared to traditional LLS microscopy and uses the limited photon counts from single molecules ~10-fold more efficiently than astigmatism-based 3D localization, thus pushing the 3D nanometer localization precision when tracking single molecules in live cells to the sub-10 nm regime.

According to certain embodiments, the lattice light-sheet illumination described herein is introduced to the sample through a perpendicular excitation objective along the y-axis (FIG. 18). The light-sheet excitation is parallel to the xy focal plane of the two detection objectives that combine the fluorescence emission coherently in an interferometric setup.

The optical setup for constructing the lattice light-sheet excitation comprises several components: (1) two orthogonal pairs of cylindrical lenses to re-shape the original circular excitation beam into an elongated elliptical profile; (2) a phase-modulation system (consisting of a polarizing beam splitter (PBS), a λ/2 wave plate, and a Spatial Light Modulator (SLM)); (3) an annular mask (AM) placed at a focal plane conjugate to the excitation objective back focal plane, to eliminate unwanted diffractions (FIG. 18). In this configuration, a linearly-polarized excitation beam is stretched along the x-axis and compressed along the z-axis, using two pairs of cylindrical lenses respectively. The excitation beam then enters the phase-modulation system and acquires a particular phase pattern from the programmed SLM upon leaving the system. This phase-modulated beam is Fourier-transformed with a lens and further filtered with the annular mask. The annular mask removes the zero-order un-diffracted beam at the center and, depending on the radius and thickness of the annulus selected, allows only certain wave vectors to be transmitted. The beam transmitted from the annular mask is then imaged at the back focal plane of the excitation objective, thus creating a (bound) 2D optical lattice at the sample. A scanning galvanometer mirror system is introduced before the excitation objective to enable fast dithering of the lattice pattern at the sample along the x-axis.

Previous implementation of LLS microscopy reported two operation modes (Chen et al., 2014): a Structured Illumination Microscopy (SIM) mode and a dithered mode. The SIM mode operates as a traditional SIM: it takes multiple images by shifting the pattern of the lattice and deconvolves the high resolution information through computational processing. Two-fold resolution improvement is achieved along the x- and z-axes, however multiple images are required for an individual frame, which degrades the temporal resolution.

By contrast, in dithered mode, a scanning galvanometer mirror dithers the lattice illumination along the x-axis, creating continuous excitation stripes in the time-averaged intensity profile, with most of the excitation energy condensed at a central thin stripe. The dithered lattice pattern is then operated as a conventional light-sheet illumination setup. Although the dithered mode has worse spatial resolution than the SIM mode, it does not limit the localization precision of modulation interferometry. Thus, for single-molecule localization applications such as tracking fluorescently-tagged protein factors and DNA elements, the dithered mode is preferred over the SIM mode.

Determining the Fate of $\sigma^{70}$ Initiation Factors

By real-time tracking RNAPs that proceed to transcribe the full template (+300 nt), a predominant mode of sigma release can be clearly defined during the transition from initiation to productive elongation: sigma is released quickly (<0.25-1 sec), in a step triggered during early elongation (likely within the first 20 nt from the transcription start site, a point where, based on the structural models, the growing RNA chain clashes with sigma domain $\sigma_4$ (Mooney et al., 2005), and also within the expected range of a few tens of nucleotides based on the estimated release time and speed of ~36 nt/sec at 25° C. and ~60 nt/sec at 35° C. under the described experimental conditions, FIGS. 5D and 14B, 14F). The results presented herein provide little evidence for non-release/partial release models and also challenge previous views based on ensemble (Mukhopadhyay et al., 2001) and single-molecule (Kapanidis et al., 2005) FRET measurements that were interpreted as ~55% $\sigma^{70}$ retention when RNAP is allowed to elongate to +50 nt and estimated a very slow release $\tau_{release}$~50 min, leading to speculation that sigma might remain bound to RNAP throughout elongation. In those earlier experiments, the faster release rate for the ~40-45% of RNAPs that lost sigma somewhere between +14 nt and +50 nt could not be determined accurately. Also, based on the measured FRET, RNAPs that retained $\sigma^{70}$ up to +50 nt appeared to be "backtracked" rather than engaged in elongation, however the ability of these complexes to produce full-length transcripts was not examined. The present disclosure further extends previous bulk biochemical experiments that: (1) indicated release (Shimamoto et al., 1986) within the first 50-100 nt, with $\tau_{release}$-4-7 sec after NTP addition, but that could not de-convolve the rate of sigma release with the rates of initiation, abortive cycling and promoter clearance; (2) indirectly measured the disappearance of promoter-proximal, sigma-dependent pausing (Ring et al., 1996) when an extended −10 element in the initial transcribed sequence was displaced by an additional 10 nt downstream of the transcription start site.

Single-Molecule Applications in Transcription and Other Complex Molecular Systems Based on the provided systems and methods, visualization of the movement and interactions of the components of a multi-subunit RNA Polymerase system can be established. The provided systems and methods provide for new possibilities for single-molecule studies of transcription mechanisms, with straightforward extension to the several-fold more complex machinery of the eukaryotic RNA Polymerase II. Notably, although bulk-level biochemical assays and cryo-EM studies have captured stable Pol II Pre-Initiation Complex (PIC) intermediates (He et al., 2013; Murakami et al., 2013b), they could not correlate the appearance of such intermediates with transcription activity: the majority of PICs assembled in vitro correspond to non-productive configurations (Juven Gershon et al., 2006; Murakami et al., 2013a; Revyakin et al., 2012) (template utilization 3-40%). The provided methods readily discriminate between productive and non-productive complexes and is thus situated to dissect assembly pathways and fates of Pol II PICs. Beyond transcription initiation and promoter escape, the ability to visualize the movement of RNAP through the full transcription cycle can be critical for probing the dynamic association of RNAP with factors that regulate its elongation as well as for dissecting the kinetic coupling between transcription elongation and important co-transcriptional events; for instance, translation initiation in prokaryotic and mRNA capping, splicing and 3' end processing in eukaryotic systems. In eukaryotic systems, an additional exciting possibility involves probing processes that modulate chromatin and the interrelated nature of chromatin structure and transcription control (Li et al., 2007). Modulation interferometry opens the door to single-molecule experiments of a broad spectrum of genomic processes that involve the coordinated action of multiple proteins, including chromatin remodeling, DNA replication, double-strand break end resection, nucleotide-excision repair, translesion DNA synthesis and homology search and recombination. As an example, replisomes undergo profound compositional/conformational remodeling when encountering severe obstacles such as transcription complexes and DNA damage. Current single-molecule replication assays mainly probe the progression of the replication fork indirectly, through the conversion of ssDNA to dsDNA monitored by mechanical stretching, at ~100's bp resolution (Hamdan et al., 2009; Lee et al., 2006); detection of fluorescent replisome proteins have probed stoichiometry and sub-unit exchange kinetics, but provided limited spatial information (Duzdevich et al., 2015; Loparo et al., 2011; Ticau et al., 2015). By directly tracking the spatial relationships between individual fluorescent components and their progression along the DNA at nanometer resolution, modulation interferometry can provide a more complete description of the replication cycle as well as address a range of mechanistic questions inaccessible by lower resolution techniques: the coordination between replisome progression and replisome component turnover/recycling, the coupling between helicase and polymerase activities and the modulation of helicase speed by exchange of the replicative polymerase with slower translesion polymerases as well as the details of the movement and re-assembly of replisome components past DNA roadblocks and damage sites. Beyond dsDNA translocases, extensions can be envisioned to high resolution imaging of any process where the function of a core enzyme that utilizes a polymer substrate (e.g., translation apparatus or protein and RNA degradation machineries) is modulated by the dynamic recruitment of accessory factors.

Fluorescence super-resolution methods have recently addressed questions pertaining to the molecular-scale organization of protein complexes, by measuring the average positions of fluorescent labels in the focal plane with 2D precisions <1 nanometer (Pertsinidis et al., 2010; Szymborska et al., 2013), and at lower (10-120 nm) 2D and 3D resolutions (Lawo et al., 2012; Mennella et al., 2012; Ribeiro et al., 2010; Van Engelenburg et al., 2014). The sub-2 nanometer 3D localization afforded by modulation interferometry significantly expands the range of systems that can be visualized and, in conjunction with optimized labeling densities, smaller probes and brighter photoactivatable dyes, could ultimately enable 3D super-resolution imaging with true 3D molecular-scale resolution of many such large, multi-megaDalton complexes and intracellular organelles in their native environment.

As shown in FIG. 23, an implementation of a network environment 2300 for use in providing systems and methods for retrieving, managing, and analyzing data from a plurality of sources as described herein is shown and described. In brief overview, referring now to FIG. 23, a block diagram of an exemplary cloud computing environment 2300 is shown and described. The cloud computing environment 2300 may include one or more resource providers 2302a, 2302b, 2302c (collectively, 2302). Each resource provider 2302 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 2302 may be connected to any other resource provider 2302 in the cloud computing environment 2300. In some implementations, the resource providers 2302 may be connected over a computer network 2308. Each resource provider 2302 may be connected to one or more computing device 2304a, 2304b, 2304c (collectively, 2304), over the computer network 2308.

The cloud computing environment 2300 may include a resource manager 2306. The resource manager 2306 may be connected to the resource providers 2302 and the computing devices 2304 over the computer network 2308. In some implementations, the resource manager 2306 may facilitate the provision of computing resources by one or more resource providers 2302 to one or more computing devices 2304. The resource manager 2306 may receive a request for a computing resource from a particular computing device 2304. The resource manager 2306 may identify one or more resource providers 2302 capable of providing the computing resource requested by the computing device 2304. The resource manager 2306 may select a resource provider 2302 to provide the computing resource. The resource manager 2306 may facilitate a connection between the resource provider 2302 and a particular computing device 2304. In some implementations, the resource manager 2306 may establish a connection between a particular resource provider 2302 and a particular computing device 2304. In some implementations, the resource manager 2306 may redirect a particular computing device 2304 to a particular resource provider 2302 with the requested computing resource.

FIG. 24 shows an example of a computing device 2400 and a mobile computing device 2450 that can be used to implement the techniques described in this disclosure. The computing device 2400 is intended to represent various forms of digital computers, such as laptops, desktops, workstations, personal digital assistants, servers, blade servers, mainframes, and other appropriate computers. The mobile computing device 2450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 2400 includes a processor 2402, a memory 2404, a storage device 2406, a high-speed interface 2408 connecting to the memory 2404 and multiple high-speed expansion ports 510, and a low-speed interface 512 connecting to a low-speed expansion port 514 and the storage device 2406. Each of the processor 2402, the memory 2404, the storage device 2406, the high-speed interface 2408, the high-speed expansion ports 510, and the low-speed interface 512, are interconnected using various busses, and may be mounted on a common motherboard or in other manners as appropriate. The processor 2402 can process instructions for execution within the computing device 2400, including instructions stored in the memory 2404 or on the storage device 2406 to display graphical information for a GUI on an external input/output device, such as a display 516 coupled to the high-speed interface 2408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 2404 stores information within the computing device 2400. In some implementations, the memory 2404 is a volatile memory unit or units. In some implementations, the memory 2404 is a non-volatile memory unit or units. The memory 2404 may also be another form of computer-readable medium, such as a magnetic or optical disk.

The storage device 2406 is capable of providing mass storage for the computing device 2400. In some implementations, the storage device 2406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 2402), perform one or more methods, such as those described above. The instructions can also be stored by one or more storage devices such as computer- or machine-readable mediums (for example, the memory 2404, the storage device 2406, or memory on the processor 2402).

The high-speed interface 2408 manages bandwidth-intensive operations for the computing device 2400, while the low-speed interface 512 manages lower bandwidth-intensive operations. Such allocation of functions is an example only. In some implementations, the high-speed interface 2408 is coupled to the memory 2404, the display 2416 (e.g., through a graphics processor or accelerator), and to the high-speed expansion ports 2410, which may accept various expansion cards (not shown). In the implementation, the low-speed interface 2412 is coupled to the storage device 2406 and the low-speed expansion port 2414. The low-speed expansion port 2414, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 2400 may be implemented in a number of different forms, as shown in the figure. For example, it may be implemented as a standard server 2420, or multiple times in a group of such servers. In addition, it may be implemented in a personal computer such as a laptop computer 2422. It may also be implemented as part of a rack server system 2424. Alternatively, components from the computing device 2400 may be combined with other components in a mobile device (not shown), such as a mobile computing device 5240. Each of such devices may contain one or more of the computing device 2400 and the mobile computing device 2450, and an entire system may be made up of multiple computing devices communicating with each other.

The mobile computing device 2450 includes a processor 2452, a memory 2464, an input/output device such as a display 2454, a communication interface 2466, and a transceiver 2468, among other components. The mobile computing device 2450 may also be provided with a storage device, such as a micro-drive or other device, to provide additional storage. Each of the processor 2452, the memory 2464, the display 2454, the communication interface 2466, and the transceiver 2468, are interconnected using various buses, and several of the components may be mounted on a common motherboard or in other manners as appropriate.

The processor 2452 can execute instructions within the mobile computing device 550, including instructions stored in the memory 2464. The processor 2452 may be implemented as a chipset of chips that include separate and multiple analog and digital processors. The processor 2452 may provide, for example, for coordination of the other components of the mobile computing device 2450, such as control of user interfaces, applications run by the mobile computing device 2450, and wireless communication by the mobile computing device 2450.

The processor 2452 may communicate with a user through a control interface 2458 and a display interface 2456 coupled to the display 2454. The display 2454 may be, for example, a TFT (Thin-Film-Transistor Liquid Crystal Display) display or an OLED (Organic Light Emitting Diode) display, or other appropriate display technology. The display interface 2456 may comprise appropriate circuitry for driving the display 2454 to present graphical and other information to a user. The control interface 2458 may receive commands from a user and convert them for submission to the processor 2452. In addition, an external interface 2462 may provide communication with the processor 2452, so as to enable near area communication of the mobile computing device 2450 with other devices. The external interface 2462 may provide, for example, for wired communication in some implementations, or for wireless communication in other implementations, and multiple interfaces may also be used.

The memory 2464 stores information within the mobile computing device 2450. The memory 2464 can be implemented as one or more of a computer-readable medium or media, a volatile memory unit or units, or a non-volatile memory unit or units. An expansion memory 2474 may also be provided and connected to the mobile computing device 2450 through an expansion interface 2472, which may include, for example, a SIMM (Single In Line Memory Module) card interface. The expansion memory 2474 may provide extra storage space for the mobile computing device 2450, or may also store applications or other information for the mobile computing device 2450. Specifically, the expansion memory 2474 may include instructions to carry out or supplement the processes described above, and may include secure information also. Thus, for example, the expansion memory 2474 may be provide as a security module for the mobile computing device 2450, and may be programmed with instructions that permit secure use of the mobile computing device 2450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 2452), perform one or more methods, such as those described above. The instructions can also be stored by one or more storage devices, such as one or more computer- or machine-readable mediums (for example, the memory 2464, the expansion memory 2474, or memory on the processor 2452). In some implementations, the instructions can be received in a propagated signal, for example, over the transceiver 2468 or the external interface 2462.

The mobile computing device 2450 may communicate wirelessly through the communication interface 2466, which may include digital signal processing circuitry where necessary. The communication interface 2466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 2468 using a radio-frequency. In addition, short-range communication may occur, such as using a Bluetooth®, Wi-Fi™, or other such transceiver (not shown). In addition, a GPS (Global Positioning System) receiver module 2470 may provide additional navigation- and location-related wireless data to the mobile computing device 2450, which may be used as appropriate by applications running on the mobile computing device 2450.

The mobile computing device 2450 may also communicate audibly using an audio codec 2460, which may receive spoken information from a user and convert it to usable digital information. The audio codec 2460 may likewise generate audible sound for a user, such as through a speaker, e.g., in a handset of the mobile computing device 2450. Such sound may include sound from voice telephone calls, may include recorded sound (e.g., voice messages, music files, etc.) and may also include sound generated by applications operating on the mobile computing device 2450.

The mobile computing device 2450 may be implemented in a number of different forms, as shown in the figure. For example, it may be implemented as a cellular telephone 2480. It may also be implemented as part of a smart-phone 2482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the modules (e.g. data aggregation module 2330, mapping module 2350, specifications module 2370) described herein can be separated, combined or incorporated into single or combined modules. The modules depicted in the figures are not intended to limit the systems described herein to the software architectures shown therein.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein. In view of the structure, functions and apparatus of the systems and methods described here, in some implementations.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

EXPERIMENTAL EXAMPLES

3D Interferometer Instrument Setup

The microscope setup was built on a 4'×6' optical table, mounted on a vibration-isolation system (Stacis iX, TMC), that was placed inside a temperature-stabilized room (~0.2 C r.m.s. air temperature fluctuations). The output from three lasers (532 nm, Coherent Verdi G2; 640-642 nm, Coherent Cube 640-100 C or MPB Communications VFL642 2 W; 730 nm, Coherent Cube 730-30 C) was coupled to single-mode polarization-maintaining fibers, collimated and combined to three co-linear beams than were delivered to one input port of the interferometer through a multi-edge dichroic mirror (zt405/488/532/640/730rpc, Chroma). An achromatic lens (f=1 m, Thorlabs AC508-1000-A-ML) focuses the laser beams at the back-focal-planes of two opposed 1.27 NA water-immersion objective lenses (MRD07650, Plan Apo 60×/1.27, Nikon), creating two counter-propagating collimated excitation beams in the specimen space between the lenses. Although background fluorescence from molecules in solution in this epi-illumination configuration is higher than in a TIR excitation configuration, single molecules can still be tracked in 3D with nanometer precision at up to a few nM concentrations.

The combined excitation power before the objectives was 7.3 mW, 12.5 mW and 1.8 mW, illuminating roughly a 50 μm diameter circle and resulting in approximate intensities at the sample of 0.4, 0.6 and 0.1 kW/cm$^2$ at 532, 642 and 730 nm respectively. To prevent Alexa 647 accelerated bleaching while performing simultaneous Cy3B/Alexa 647 imaging (Pertsinidis et al., 2013) (FIGS. 7A-7F), the 532/642 nm excitation lasers were modulated at 50 Hz (resulting in interlaced 10 msec 532/642 nm excitation pulses), using a fast shutter (Stanford Research Systems, SR475 shutter and SR474 controller) and direct diode current modulation for 532 and 642 nm respectively. Fluorescence emitted by the specimen was collected by the two lenses, propagated through the two interferometer arms, and after recombining at the beam-splitter (Non-polarizing broad-band VIS, Edmund Optics), laser light was blocked (532 and 642 notch filters; Chroma), emission was filtered (ET685/70 Chroma on CCD1 and 582/75 Semrock, ET685/70 Chroma or 785/62 Semrock, selectable with a motorized filter wheel (FW103H, Thorlabs) on CCD2, for Cy3, Cy5 or Alexa 647, and Alexa 750 respectively) and imaged on two EM-CCDs (DU-897, Andor) using two tube lenses (f=40 cm, Thorlabs AC508-400-A-ML, total image magnification ~110×, pixel size ~145 nm).

The interferometer cavity is designed to achieve wide-field super-position of the images from the two objectives. Instead of a triangular cavity, the described setup is motivated by two-lens 3D structured illumination (Gustafsson et al., 1999). An advantage of this setup is that by placing two mirrors (M1 and M2 in the top path, FIG. 1A) on a motorized stage (Thorlabs LNR215M with Z825B motor), the path length can be scanned over cm-long distances while maintaining alignment and image overlap on the CCDs. Two shutters (DSS25B1T0 or VS25, Uniblitz), placed in each of the interferometer arms, enabled selective illumination and imaging from the top or bottom objective only. A capacitive sensor-equipped piezo-electric mirror mount (Physik Instrumente S-323.3CD and E-712.3CDA controller) was used to modulate the path-length difference between the two interferometer arms with less than 1 nm precision. It is noted that based on the geometry, PZM displacement by δPZM results in a path-length difference change of $\delta = \sqrt{2} \times \delta_{PZM}$.

The specimen holder was mounted on a 3-axis nanopositioning stage (Physik Instrumente P-561.3DD and E-712.3CDA controller), which allowed 3D positioning with 0.2 nm precision. In conjunction with the sample stage, the top objective was mounted on a separate 3-axis nanopositioning stage (Physik Instrumente P-733.3CD and E-710.3CD controller), which allowed registration with the bottom objective.

Instrument Control and Image Acquisition

Active stabilization procedures used to maintain instrument alignment are described herein.

Custom LabVIEW software (National Instruments) acquired images from the CCDs, communicated with the nanopositioning stages and PZM and controlled all opto-mechanical hardware. To achieve controlled phase modulation, a 'closed-loop' scheme was implemented, moving the PZM in discrete steps. The movement of the PZM in discrete steps was synchronized with the CCD acquisition. The stepping pattern was repeated with a real-time servo-controlled offset and updated in every cycle. The PZM was incrementally moved between each CCD frame by a step-size corresponding to an integer fraction of a full modulation period. MATLAB scripts (Mathworks Inc) embedded in the LabVIEW code performed real-time analysis (see below) of selected ROIs that contained isolated 40 nm spheres used as reference fiducials and feedback control was employed to actively stabilize the interferometer. Between a selectable number of modulation cycles, one frame was taken with the top path shutter closed (imaging with the bottom lens only), followed by a 2nd frame with the bottom path shutter closed (imaging with the top lens only). The fiducial image from the bottom objective was used to stabilize the sample stage in 3D. Then the fiducial image from the top objective was used to actively align the top objective relatively to the bottom objective. To stabilize the path-length difference between the two interferometer arms, the phase of a fiducial in real-time was tracked during the modulation cycles and controlled the offset of the PZM mount.

Sample Temperature Control

For experiments performed at temperatures above ambient, two heaters with integrated thermistor sensors (TLK-H, Thorlabs) were wrapped around each objective lens, and the temperature was controlled with two separate PID controllers (TC200, Thorlabs). To reduce thermal losses, the objectives were insulated from their mounts using threaded adapters machined out of Macor and additional pipe foam insulation was wrapped around each lens. An external, out-of-loop thermistor probe (TSP01, Thorlabs) was placed between the two lenses to monitor the temperature at the sample.

Sample Cell Preparation and Perfusion Setup

Sample cells were prepared using two glass cover slips sandwiched with double-sided tape (~100-200 μm thick). One of the coverslips was passivated with Poly-ethylene-glycol (PEG) 4 arm 10 k PEG, Succininidyl carbonate, Laysan Bio, 4 arm-PEG-SC-10K) using an optimized cloud-point grafting protocol to prevent non-specific interactions of bio-molecules with the surface. A: coverslips were first cleaned with a 70:30 v:v $H_2SO_4:H_2O_2$ solution and 0.5M KOH solution, and then soaked in a 98:2 v:v acetone-(3-aminopropyl)-triethoxysilane (Sigma 440140) solution for 10 minutes and washed with milliQ water. A 10% w/v solution of PEG at 4° C. in 0.55M K2SO4 was applied to the coverslips for 90 minutes (PEGylation). The coverslips were then washed and stored in milliQ water or used for experiments. During PEGylation, a fraction (10% w/w) of biotin-PEG (mPEG-Biotin, MW 5,000, Laysan Bio MPEG-Biotin-5000) was included to enable surface-tethering DNA molecules using biotin-streptavidin (Roche 11721674001) interactions. The measurements were performed on the PEG-modified coverslip. The other coverslip was naked glass and was briefly passivated by exposure to 10% w/v BSA (OmniPur 2930) in milliQ water solution after sample cell assembly. It is noted that the second coverslip can also be PEG-passivated to ensure more stringent control of non-specific adsorption, which if not prevented might reduce the effective concentration of biomolecules in the solution. For experiments that did not require buffer exchange, once reagents were introduced, the sample was sealed with 5-minute epoxy and imaged. To allow dynamic buffer exchange when imaging, small plastic adapters were machined for capillary tubing and glued on the coverslip sandwich. Capillary PEEK tubing was used to connect the sample cell to flow-switch and flow-selection valves and micro-liter syringes (Hamilton) that were either operated manually or using a syringe pump (Legato 130, $K_D$ Scientific).

Single-Molecule 3D Localizations and Distance Measurements

Individual molecules were identified by a peak-finding algorithm (Crocker and Grier, 1996). The xy coordinates of each molecule were obtained by non-linear least-squares fitting to a 2D Gaussian function (Pertsinidis et al., 2010; Yildiz et al., 2003). The intensity traces for each molecule were obtained by the integrated photon counts N of a 3×3 or a 5×5 pixels$^2$ ROI centered on each molecule. The phase of the intensity trace N(t) was extracted using "digital" lock-in detection, accomplished by mixing N(t) with a reference "local" oscillator cos (ωt+p) and finding φmax that maximizes $A(p)=\int N(t) \times \cos(\omega t+\varphi)$. For obtaining the phase in a single cycle with nstep discrete modulation steps, $$A(\varphi) = \sum_{j=1}^{n_{step}} N_j \cos\left(\frac{2\pi j}{n_{step}} + \varphi\right),$$

where Nj is the number of photons detected at step j. The z coordinate is estimated as $$\frac{\lambda_{ex}\varphi_{max}}{4\pi\eta},$$

where $\lambda_{ex}$ is the excitation wavelength and η=1.33 is the index of refraction of aqueous solution. It is noted that this phase estimator achieves shot noise limited precision $\sigma\varphi \approx 1/\sqrt{N_{photons}}$ in the background-free case (FIG. 9A). The raw coordinates $\{z_i\}$ were further corrected for residual drift/movements by subtracting the common mode of stationary fiducials. Either 40 nm spheres (FIGS. 3A-3G, 5A-5E, 6A-6E, 7A-7F; typically $n_{cm}$~10 scattered throughout the field of view) or stationary Cy5 molecules (FIGS. 2A-2L) were used. In the latter case, for each trace i, the common mode of all the molecules {j} was subtracted from the distance $dxy_{ij}$<35 pixels (~5 μm) and $|\varphi_i-\varphi_j|<2\pi/15$ rad relative phase (median $n_{cm}$=14, 21, 18, 5 for 2, 5, 20, 50 fps respectively), except for the 400 fps data, where $n_{cm}$=5-11 fiducials anywhere within the field of view were used.

Distances between identical fluorophores using sequential photobleaching were measured as described (Pertsinidis et al., 2010). Coordinates between CCDs and between Cy3-Alexa 647 and Alexa 750 images were performed using 40 nm spheres (TransFluoSpheres 488/645, streptavidin labeled, T10711, Life Sciences) as fiducial markers using either a 2nd order polynomial or an affine transformation matrix (Pertsinidis et al., 2013). Analysis was done using either MATLAB or IDL codes.

Analysis of RNAP Movement

RNAP transcription traces (no pause templates, FIGS. 5A-5E and 7A-7F) were fitted to a 3-segment linear model or to a WLC model using Origin (OriginLab Corp.), with the initial z position, start and end times of moving phase and sliding velocity as free parameters ($z_0$, $t_0$, $t_1$ and v):

$$z_{linear} = \begin{cases} z_0, & t < t_0 \\ z_0 + v(t - t_0), & t_0 \le t < t_1 \\ z_0 + v(t - t_0), & t \ge t_1 \end{cases} \quad (1)$$

$$z_{WLC} = \begin{cases} z_0, & t < t_0 \\ z_0 + z_{offset} + a\sqrt{2v(t-t_0)L_p\left(1 - \frac{L_p}{v(t-t_0)}e^{-\frac{v(t-t_0)}{L_p}}\right)}, & t_0 \le t < t_1 \\ z_0 + z_{offset} + a\sqrt{2v(t_1-t_0)L_p\left(1 - \frac{L_p}{v(t_1-t_0)}e^{-\frac{v(t_1-t_0)}{L_p}}\right)}, & t \ge t_1 \end{cases} \quad (2)$$

WLC parameters were fixed at $z_{offset}$=6 nm, a=0.17 nm/bp (z dependence for singly-tethered short rigid dsDNA, e.g., FIG. 3G and RNAP pause data FIG. 6C) and $L_p$=110 bp (note that v units are nm/sec and bp/sec in (1) and (2) respectively).

RNAP transcription traces (1 pause templates, FIGS. 5A-5E) were fitted to a 5-segment linear model, with the initial z position, the start and end times of the moving phases before and after the pause and the sliding velocity as free parameters ($z_0$, $t_0$, $t_1$, $t_2$, $t_3$ and v):

$$z_{linear} = \begin{cases} z_0, & t < t_0 \\ z_0 + v(t - t_0), & t_0 < t < t_1 \\ z_0 + v(t_1 - t_0), & t_1 \le t < t_2 \\ z_0 + v(t_1 - t_0) + v/\sqrt{2}(t - t_2), & t_2 \le t < t_3 \\ z_0 + v(t_1 - t_0) + v/\sqrt{2}(t_3 - t_2), & t > t_3 \end{cases} \quad (3)$$

Extended Experimental Procedures, including Supplemental Figures are described in Appendix A, the contents of which is hereby incorporated by reference in its entirety. Note that Supplemental Figures S1-S7 correspond to FIGS. 8-14 herein.

Cells

U2-OS cells were grown in McCoy's 5A media (GE Healthcare Life Sciences SH30270.01) without phenol-red, supplemented with 10% Fetal Bovine Serum, 1× Non-Essential Amino Acids (ThermoFisher Scientific 11140050), 1 mM Sodium Pyruvate (ThermoFisher Scientific 11360070) and 100U/mL Penicillin-Streptomycin, at 37° C., in a humidified 5% $CO_2$ incubator.

Phase-sensitive detection was performed in software. If the detector is a photo-multiplier tube or photo-diode, the electronic signal can be fed to a lock-in amplifier and the phase-sensitive detection could be performed in hardware. Similarly, the phase-sensitive detection could be performed in real-time programmable hardware, e.g. an FGPA instead of software.

Exemplary Schemes for Modulation Interferometry

FIGS. 15A-15H shows various schematics of a single-molecule 3D imaging system with modulation interferometry.

Key Resources Table a script that performs a near uniform orientation sampling and averages the combined excitation-dipole electric fields of all the sampled orientations (combine.m).

The gen_2d_lattice.m script calculates the SLM pattern for modulating the phase of the incident light and creating a certain bound 2D optical lattice, and simulates the effects of various annular masks as well as dithering. A 2D optical lattice is created by interference of light beams that exit the

| Key Resources Table | | |
|---|---|---|
| REAGENT or RESOURCE | SOURCE | IDENTIFIER |
| Goat monoclonal anti-Rabbit IgG (H + L) F(ab')2 Secondary Antibody, Alexa Fluor 647 | ThermoFisher Scientific | Cat#: A21246 |
| Rabbit polyclonal anti-Nup153 | Abcam | Cat#: Ab84872 |
| Rabbit polyclonal anti-TPR | Abcam | Cat#: Ab84516 |
| Rabbit monoclonal anti-Nup98 | Cell Signaling Technology | Cat#: C39A3 |
| Rabbit polyclonal anti-Nup358 | (Wu et al., 1995) | N/A |
| Chemicals, Peptides, and Recombinant Proteins | | |
| 4-arm PEG (Poly-ethylene-glycol), Succinimidyl carbonate, MW 10,000 | Laysan Bio | Cat#: 4arm-PEG- SC-10K |
| mPEG(Poly-ethylene-glycol)-Biotin, MW 5,000 | Laysan Bio | Cat#: MPEG-Biotin-5000 |
| (3-aminopropyl)-triethoxysilane | Sigma | Cat#: 440140 |
| PEG (Poly-ethylene-glycol) 8000 | Sigma | Cat#: 81268 |
| Quickchange Mutagenesis Kit | Agilent | Cat#: 200519 |
| QIAquick Gel Extraction Kit | QIAGEN | Cat#: 28704 |
| SNAP-Surface Alexa Fluor 647 | NEB | Cat#: S9136S |
| Cy3B Maleimide | GE Healthcare Life Sciences | Cat#: PA63131 |
| RNA loading dye | NEB | Cat#: B0363S |
| UTP, [alpha-32P] | PerkinElmer | Cat #: NEG007C001MC |
| Heparin | Sigma | Cat#: H4784 |
| Collagen | Sigma | Cat#: C8919 |
| Formaldehyde | ThermoFisher Scientific | Cat#: 28906 |
| Triton X-10 | Sigma | Cat#: 93443 |
| Bovine Serum Albumin, Fraction V | OmniPur | Cat#: 2930 |
| BSA, Molecular Biology Grade | NEB | Cat#: B9000S |
| Streptavidin | Roche | Cat#: 11721674001 |
| Image-iT FX Signal Enhancer | Cell Signaling Technology | Cat#: 11932 |
| Cysteamine Chloride | Sigma | Cat#: 30078 |
| Glucose Oxidase | Sigma | Cat#: G7141 |
| Catalase | Roche | Cat#: 10106810001 |
| Pyranose Oxidase | Sigma | Cat#: 37250-80-9 |
| Experimental Models: Cell Lines | | |
| U-2 OS | ATCC | Cat#: HTB-96 |
| Experimental Models: Organisms/Strains | | |
| BL21(DE3) Competent E. coli | NEB | Cat#: C2527I |
| Recombinant DNA | | |
| Template Plasmid: pJ411 | (Feklistov et al., 2008) | N/A |
| Plasmid: pJ411-rpoZ-SNAP | Described herein | N/A |

Interferometric Lattice Light-Sheet ("LLS") Microscopy

FIG. 18 shows a schematic of an optical layout of interferometric LLS microscopy with the imaging space enlarged and labeled with the Cartesian coordinate system. The following example describes calculations of the performance of interferometric LLS microscopy (FIG. 18).

Numerical Simulation Pipeline

To facilitate understanding and optimization of interferometric LLS microscopy, a numerical simulation pipeline in MATLAB that comprises the following sets of scripts were developed: (1) two scripts for calculating the excitation electric field (gen_2d_lattice.m and gen_3d_lattice.m); (2) a script for calculating the dipole electric field of single emitters (gen_dipoles.m); (3) a script that combines the excitation and dipole electric fields (overall_psf.m), and (4)

excitation objective lens with propagation wave vectors strictly along a cone. The excitation light then enters the excitation objective back focal plane through an annulus (corresponding to a certain numerical aperture) of infinitesimal width. To confine the excitation light to a thin "sheet" along the x-axis by bounding the ideal 2D lattice along the z-axis, the propagation lattice wave vectors are extended along the z-axis. Therefore, the simulation script is programmed to determine the wave vectors for a particular lattice, extend these wave vectors along z to confine the lattice (via the selected bounding function and the calculated SLM profile), and further constrain the z-extend of the wave vectors with the annular mask to achieve near non-diffracting illumination.

Calculation of Optical Lattice Excitation Electric Fields

A desired 2D optical lattice selected from the set of all five 2D Bravais lattices serves as a starting point. The mathematical framework for calculating 2D optical lattices is described below.

First, to obtain the wave vectors for a particular 2D optical lattice, a primitive vector set A=[$a_1$, $a_2$] and its corresponding reciprocal vector set B=[$b_1$, $b_2$] (where A and B are 2×2 matrices) can be obtained. For each optical lattice, there are infinite sets of primitive vectors that can define it. The corresponding optical lattices are of the same type except that they exhibit different periodicities depending on the choice of A: the fundamental lattice of a certain type has the minimum period, while higher order sparse lattices have increasingly higher periods.

$$A=[a_1,a_2] \quad (4)$$

For each set of primitive vectors, a corresponding reciprocal vector set B can be obtained.

$$B=[b_1,b_2]=2\pi(A^T)^{-1} \quad (5)$$

A connection between the set B and the (optical) wave vectors {k} has been established by reported observations (Betzig, 2005; Petsas et al., 1994): first, a minimum of three wave vectors $k_0$, $k_1$, and $k_2$ are required to construct a 2D optical lattice; second, these wave vectors can be constructed by $$b_n=k_0-k_n, n=1,2 \quad (6)$$

Because the excitation beams are monochrome, all three wave vectors are of equal length.

$$|k_0| = |k_1| = |k_2| = \frac{2\pi}{\lambda} \quad (7)$$

By combining equations (δ) and (7), a third condition can be obtained $$B^T \cdot k_0 = \left[b_1^T \cdot b_1, b_2^T \cdot b_2\right]^T \equiv \frac{\beta}{2} \quad (8)$$

With all three equations, the first wave vector $k_0$ can be solved as $$k_0 = (B^T)^{-1} \cdot B^T \cdot k_0 = (B^T)^{-1} \cdot \frac{\beta}{2} = \frac{1}{2\pi} \cdot A \cdot \frac{\beta}{2} = \frac{A \cdot \beta}{4\pi} \quad (9)$$

and the rest of the wave vectors, $k_1$ and $k_2$, can be solved as $$k_n = k_0 - b_n = \frac{A \cdot \beta}{4\pi} - b_n, n = 1, 2 \quad (10)$$

By Fourier transforming these wave vectors, the initial desired 2D lattice can be derived:

$$E_{ideal;fundamental/sparse}=FT[(k_0,k_1,k_2)] \quad (11)$$

However, these fundamental and sparse 2D optical lattices have broad foci that extend throughout the unit cell, thus limiting their use for creating thin sheets of illumination. To overcome this difficulty, composite 2D optical lattices are explored, which comprise more than three wave vectors because composite optical lattices have more confined excitation foci due to the constructive interference of the additional wave vectors. One way of generating more wave vectors is to perform symmetry operations on the initial three wave vectors. The maximum number of wave vectors is obtained through the maximum number of allowed symmetry operations, generating a maximally symmetric (composite) 2D optical lattice.

$$E_{ideal;composite(max\ symm)}=FT[\text{symmetry\_operation}(k_0, k_1,k_2)] \quad (12)$$

The 2D lattice along the z-axis into a lattice light sheet using an arbitrary bounding function $\psi(z)$ can be confined.

$$E_{bound}=\psi(z) \cdot \text{Re}(E_{ideal}) \quad (13)$$

The profile of this bound lattice is then used to create the phase pattern of the binary SLM with a Heaviside step function H.

$$\varphi_{SLM}=\pi \cdot H(E_{bound}-\varepsilon) \quad (14)$$

where $\varepsilon$ is an arbitrary cutoff.

Once the phase pattern for the SLM is obtained, the excitation profile at the xz focal plane using an annular mask N that removes unwanted diffractions after transforming the phase-modulated beam.

$$PSF_{ex}=|FT[N \cdot FT(e^{i\varphi_{SLM}})]|^2 \quad (15)$$

Although the above 2D simulation reveals the excitation profile at the xz focal plane, it does not describe how the bound lattice propagates along the y-axis, which ultimately determines the effective field of view. Therefore, the script gen_3d_lattice.m is implemented to simulate the 3D excitation fields, which is approximately expressed in the near-focus space as (Richards and Wolf, 1959):

$$\vec{E}(x, y, z) = (E_x, E_y, E_z) \quad (16)$$

$$\begin{cases} E_x = -iA(I_0 + I_2\cos 2\varphi) \\ E_y = -iAI_2\sin 2\varphi \\ E_z = -2AI_1\cos\varphi \end{cases}$$

where $I_0$, $I_1$, and $I_2$ are integrals over the aperture of the excitation objective; A is a scalar; $\varphi$ is the azimuth in the cylindrical coordinate system.

However, numerically solving the above equations is not efficient due to the inherent nested loops used to calculate the integrals. Interestingly, an alternative implementation of the integrals as a Fourier transform significantly increases the speed of numerical calculations (Leutenegger et al., 2006) and thus is incorporated in this simulation.

Calculation of Single Dipole Emission Electric Fields

After calculating the electric field of the excitation LLS in 3 Da gen_dipoles.m script was developed to simulate the 3D electric field of the emission from a single dipole. The dipole emission imaged by one of the detection objectives can be expressed as:

$$E_1(r, z, \varphi) = (E_x, E_y, E_z) \quad (17)$$

$$E_a = B \int_0^{\theta_{max}} d\theta \sin\theta \cdot G_{ab}^E(r, \theta, \varphi) p_b e^{ikz\cos\theta} \quad (18)$$

where r is the distance from the optical axis (z-axis for emission detection) to the point-of-interest; $\theta$ is the angle between the vector pointing from the focus to the point on the aperture; $\theta_{max}$ is the maximum angle of the aperture of the detection lens; $\varphi$ is the azimuth angle in cylindrical coordinates: z is the distance away from the focus along the optical axis; $G_{ab}^E$ is a tensor whose components are given by Enderlein, 2000.

When the apertures of two opposite imaging objectives are superimposed coherently, the dipole electric field can be combined as:

$$E_{dipole} = E_1 + E_2 \quad (19)$$

$$E_2(r, z, \varphi) = \begin{pmatrix} 1 & 0 & 0 \\ 0 & -1 & 0 \\ 0 & 0 & -1 \end{pmatrix} E_1(r, -z, -\varphi)e^{\Delta\Psi} \quad (20)$$

where $\Delta\Psi$ denotes the path-length difference between the two detection interferometer arms.

Calculation of the Overall Point Spread Function (PSF)

Once the electric fields of the LLS excitation and the dipole emission are obtained, the response of the interferometric LLS microscope to a single point emitter of a particular dipole orientation can be described with the overall point spread function (PSF). In dithered mode, the x-axis continuous illumination is achieved by using the x-galvo to scan the excitation beam over multiples of that lattice period along the x-axis, which can be modeled numerically by shifting the 3D electric field over one period. Therefore, in overall_psf.m script, the averaged overall PSF is calculated as:

$$PSF_{overall,i} = |E_{dipole,i}|^2 \cdot \int_x^T dx \cdot |E_{ex} \cdot p_{dipole,i}|^2 \quad (21)$$

where $p_{dipole,i}$ is the i-th orientation of a particular emitting dipole; T is the period of the 2D optical lattice along the x-axis.

The script combine.m performs a near uniform sampling of points across a sphere to account for possible orientations explored by organic dyes or fusion fluorescent proteins that are either conjugated with a flexible linker or simply freely diffusing in the cell. However, for N other than 2, 3, 4, 6, 8, 10, or 12, there is no analytical solution to place N points at equal distance to the adjacent points on a spherical surface. Random uniform sampling of z in [−1, 1] and $\varphi$ in [0, $2\pi$] in a spherical coordinate system introduces clustering (Weisstein), which is more pronounced when N is relatively small. To avoid potential bias in the numerical calculations of the overall PSF, an alternative sampling method that results in near uniform distribution of dipole orientations is used (Deserno, 2004): the sphere is first separated into equally-spaced equators, each of which is then separated into segments of length approximately equally to the inter-equator distance with ends being the sampled orientations (FIG. 20).

Finally, the script combine.m sums the overall PSFs of all sampled orientations and generates the averaged overall PSF (equation (22)). The numerical simulation pipeline illustrated with intermediate and final results is shown in FIG. 21.

$$PSF_{overall} = \sum_i^n PSF_{overall,i} \quad (22)$$

Results

The described numerical simulation pipeline was used to obtain the 3D excitation fields for the six different bound 2D maximally symmetric optical lattices, for various choices of bounding functions and annular masks (FIGS. 22A-22B and Table 7 and 8). Additionally, the 3D emission electric field of single dipole emitters were calculated for a conventional 2 pi (single objective) and the 4 pi interferometric (two opposed objectives) detection setups. Finally, the overall PSFs, different excitation schemes, isotropic emitters (corresponding to all possible orientations equally sampled) were calculated.

Table 7 shows lattice-type-specific parameters used in simulating the six different 2D lattice light sheet excitation profiles in FIG. 22.

TABLE 7

| 2D lattice | Bounding Gaussian function $\sigma$ ($\lambda$/NA) | Wave vector length (NA) | Annular mask inner diameter (NA) |
|---|---|---|---|
| Fundamental rectangular | 1.5 | 90% | 80% |
| Fundamental square maximally symmetric | 0.15 | 92% | 93% |
| Fundamental hexagonal maximally symmetric | 0.3 | 100% | 93% |
| First-order sparse square maximally symmetric | 0.8 | 94% | 92% |
| First-order sparse square maximally symmetric with 45° rotation | 0.8 | 94% | 92% |
| First-order sparse hexagonal maximally symmetric | 1.5 | 100% | 85% |

Table 8 shows parameters used in simulating the six different 2D lattice light sheet in FIG. 22.

TABLE 8

| Common simulation parameters | Values |
|---|---|
| Excitation wave length | 641 nm |
| Heaviside coefficient | 0.1 |
| Annular mask outer diameter | 100% NA |
| Excitation objective NA | 0.65 |
| Excitation objective focal length | 7 mm |
| Refractive index of imaging medium | 1.33 |
| Emission objective wave length | 700 nm |
| Emission objective NA | 1.1 |

The overall PSFs obtained for interferometric LLS microscopy (4 pi interferometric detection with two opposed lenses) show distinct profiles compared to the original LLS microscopy (2 pi detection with a single lens). In interferometric LLS microscopy with 4 pi detection when emission interferers constructively, the PSF exhibits a maximum centered at the common focus of the two objectives, with two additional visible side lobes along the z-axis. When emission interferes destructively, the intensity maxima are symmetrically positioned along the z-axis away from the focal plane, with two less pronounced side lobes. In both cases, the volume occupied by the overall PSFs for 4 pi detection is significantly less than for 2 pi detection, indicating reduced background and thus higher sensitivity when imaging single molecules at the focal plane.

Similar to modulation interferometry, interferometric LLS microscopy determines the z and the xy positions of the detected fluorescence separately. For z localization, because interferometric LLS microscopy uses the self-interference of the emission and employs two out-of-phase CCD cameras for detection, two phases are simultaneously obtained. The number of PZM steps needed is then half of the number used in modulation interferometry based on excitation interference, e.g. four steps for an eight-phase intensity trace. Once the intensities from the two cameras are combined to a single trace, phase sensitive detection is used to extract the z position of the fluorescent emitter. For xy localization, the images within the same modulation cycle from the two CCD cameras are averaged and subjected to 2D Gaussian fitting.

Because the localization precision in both z and xy quickly degrades at increased background levels, it is necessary to further quantify the background reduction of the 4 pi detection of interferometric LLS microscopy compared to the 2 pi detection of conventional LLS microscopy. The background photons collected by the detection objective reflect a spatially near-uniform out-of-focus background formed by freely diffusing fluorescent molecules and (cellular) autofluorescence that can be modeled by integrating the numerically calculated 3D PSF within a cylindrical enclosure along the z-axis and centered at the xyz focus. The dimensions of the cylinder are selected to encompass most of PSF intensity, corresponding to a diameter of 436 nm and a length of 972 nm (e.g., for the parameters in Tables 7 and 8). The selected values also correspond to the diameter of the Airy disk in the focal plane, $1.220\lambda f/D$, and the first minimum of the calculated detection PSF along the z-axis, $2\lambda f^2/D^2$, respectively, where $\lambda$, f, and D denote the emission wavelength, the focal length and the diameter of the detection objective lens, respectively (Born et al., 1999) (the ratio f/D is calculated from $D/f=\tan(\sin^{-1}(NA/n))$, where NA is the numerical aperture of the detection objective lens, and n is the refractive index of the imaging medium).

During data acquisition of one modulation cycle, assuming a fluorescence molecule is positioned exactly at the focus (x=0, y=0, z=0), which also coincides with the constructive interference maximum, the background level will fluctuate as the PZM shifts the phase of the emission fringes. Although the background can be calculated for each separate phase, an adequate approximation of the background throughout the modulation cycle for the four-step eight-phase acquisition is to calculate the two extreme cases, where constructive and destructive interference are formed, and to subsequently average the background level (Table 9).

To compare the background of the 4 pi detection vs. the background of the conventional 2 pi detection, the integrals of 4 pi constructive or destructive detection (corresponding to $\Delta\Psi=0$ or n in equation (20)) are divided by the integral of 2 pi detection to obtain the ratio, which was subsequently averaged to estimate the time-averaged background reduction. The results show that the time-averaged background is reduced to 54%-62% with 4 pi interferometric detection compared to 2 pi single-objective detection in all the six different 2D optical lattices.

Table 9 shows a background comparison: 2 pi vs 4 pi detection scheme.

TABLE 9

| 2D lattice | Relative background | | |
|---|---|---|---|
| | 4pi constructive vs 2pi | 4pi destructive vs 2pi | Average |
| Fundamental rectangular | 50% | 69% | 59% |
| Fundamental square maximally symmetric | 51% | 58% | 54% |

TABLE 9-continued

| 2D lattice | Relative background | | |
|---|---|---|---|
| | 4pi constructive vs 2pi | 4pi destructive vs 2pi | Average |
| Fundamental hexagonal maximally symmetric | 50% | 64% | 57% |
| First-order sparse square maximally symmetric | 51% | 69% | 60% |
| First-order sparse square maximally symmetric with 45° rotation | 50% | 70% | 60% |
| First-order sparse hexagonal maximally symmetric | 50% | 74% | 62% |

Combining LLS and modulation interferometry was examined with the numerical simulation pipeline, demonstrating up to ~50% reduction in background. When combined with the localization methods of modulation interferometry, interferometric LLS microscopy enables the ability to perform live cell single-molecule imaging of protein factors and fluorescently-tagged genomic loci with high 3D localization precision.

The implemented numerical simulation pipeline demonstrates capabilities of calculating the SLM pattern and the thickness of the annular mask for distinct 2D optical lattices. These functions are significant in practice and can instruct the design and implementation of the optical instrument. Also, the accompanying parameter estimation can assist the future software implementation regarding data acquisition and analysis: e.g., the x period of the lattice light-sheet illumination determines the dithering range of the lattice to achieve a uniform stripe of illumination. Furthermore, the intermediate and final results of the numerical simulation provide insights on performance pertaining to single-molecule live cell imaging at near-endogenous concentrations. For example, in addition to using the averaged overall PSFs to estimate the background reduction effect, the excitation profile of the dithered optical lattice can be used to optimize the intensities of the side lobes of the profile to avoid unnecessary photo-bleaching.

What is claimed is:

1. An interferometric modulation imaging apparatus for multi-color interferometric imaging of at least one fluorescent sample, comprising:
a first optical objective and a second optical objective, the first optical objective configured to (i) focus a first excitation beam toward the at least one fluorescent sample located in a volume between the first optical objective and the second optical objective, and (ii) collect a first portion of light provided from the at least one fluorescent sample, wherein the second optical objective located within a first distance from the first objective so as to (i) focus a second excitation beam toward the at least one fluorescent sample, and (ii) collecting a second portion of light provided from the at least one fluorescent sample;
a dichroic mirror configured to direct an illumination beam toward one or more beam splitters that (i) splits the illumination beam into the first excitation beam and the second excitation beam, and (ii) combines the first portion of the provided light with the second portion of the provide light to form an interference signal;

one or more phase modulating devices arranged to:
   direct the first excitation beam from the one or more beam splitters to the first optical objective, and
   direct the first portion of the provided light collected at the first optical objective to the one or more beam splitters;
a set of mirrors arranged so as to:
   direct the second excitation beam from the one or more beam splitters to the second optical objective and
   direct the second portion of the provided light collected at the second optical objective to the one or more beam splitters; and
one or more detectors configured to detect the interference signal.

2. The apparatus of claim 1, wherein the first distance is from about 0.01 to about 100,000,000 p.m.

3. The apparatus of claim 1, wherein the first distance is from about ½ wavelength of violet/UV light up to a system that is configured to focus light up to 100 m focal length.

4. The apparatus of claim 1, wherein the dichroic mirror combines the first portion of the provided light with the second portion of the provided light to form the interference signal via a non-polarizing beam splitter or a polarizing beam splitter.

5. The apparatus of claim 1, wherein polarizations of the first and second excitation beams are rotated, thereby generating the interference signal.

6. The apparatus of claim 1, further comprising:
a first filter located between the one or more beam splitters and a first detector of the one or more detectors for transmitting the interference signal at a first emission wavelength, and
a second filter located between the one or more beam splitters and a second detector of the one or more detectors for transmitting the interference signal at a second emission wavelength.

7. The apparatus of claim 1, wherein the one or more detectors comprise a single detector, and one or more beam splitters for transmitting the interference signal at a plurality of emission wavelengths.

8. The apparatus of claim 7, wherein the single detector has a plurality of quadrants/sections for detect the interference signal.

9. The apparatus of claim 1, further comprising an image generator configured to generate one or more side-by-side simultaneous images based on the detect interference signal, and wherein each of the images corresponds to the emission wavelength.

10. The apparatus of claim 1, further comprising one or more excitation sources which comprises a first laser that generates the light at a first illumination wavelength and a second laser that generates light at a second illumination wavelength.

11. The apparatus of claim 10, wherein each of the one or more excitation sources are lasers that emit light at a wavelength from about 350 nm to about 2,000 nm, e.g., from about 350 nm to about 800 nm, e.g., at about 405 nm, about 488 nm, about 532 nm, about 642 nm, or about 730 nm.

12. The apparatus claim 10, wherein the first and second illumination wavelengths are the same.

13. The apparatus of claim 1, further comprising a third optical objective that is orthogonal to the first and second optical objectives.

14. The apparatus of claim 1 further comprising a third, a fourth, a fifth, a sixth, a seventh, etc. optical objectives that are orthogonal to the first and second optical objectives.

15. The apparatus of claim 1, wherein the first, second, or frequency modulated excitation beam comprise a continuous wave.

16. The apparatus of claim 1, wherein the first, second, or frequency modulated excitation beam is pulsed.

17. The apparatus of claim 16, wherein the pulse width of each pulse is within a range from below 100 fsec to 100 nsec.

18. An interferometric modulation imaging apparatus for multi-color interferometric imaging of at least one fluorescent sample, comprising:
one or more excitation sources;
a first optical objective and a second optical objective, the first optical objective configured to (i) focus a frequency modulated excitation beam from the one or more excitation sources toward the at least one fluorescent sample located in a volume between the first optical objective and the second optical objective, and for it collecting a first portion of light provided from the sample, wherein the second optical objective is located within a first distance from the first objective so as to (i) focus the frequency modulated excitation beam toward the at least one fluorescent sample, and (ii) collect a second portion of light provided from the sample;
a dichroic mirror configured to (i) direct the frequency modulated excitation beam having different frequencies, and (ii) combine the first portion of the provided light with the second portion of the provided light to form an interference signal;
one or more phase modulating devices are arranged to:
   direct the frequency modulated excitation beam from the one or more beam splitters to the first optical objective, and
   direct the first portion of the provided light collected at the first optical objective to the one or more beam splitters;
a first set of mirrors arranged to:
   direct the frequency modulated beam from the one or more beam splitters to the second optical objective, and
   direct the second portion of emitted light collected at the second optical objective to the one or more beam splitters; and
one or more detectors configured to detect the interference signal.

19. The apparatus of claim 18, wherein the one or more excitation sources comprises a frequency modulated excitation laser that emits light at a plurality of wavelengths.

20. The apparatus of claim 19, wherein the plurality of wavelengths is within a range from about 350 nm to about 2,000 nm.

21. The apparatus of claim 19, wherein the plurality of wavelengths is about 405 nm, about 488 nm, about 532 nm, about 642 nm, and/or about 730 nm.

22. The apparatus of claim 19, wherein each of the plurality of wavelengths are the same.

23. The apparatus of claim 19, wherein a first of the plurality of wavelengths is the same as a second of the plurality of wavelengths.

24. The apparatus of claim 19, wherein each of a plurality of fluorescent species is excited through 1-photon, 2-photon, or n-photon absorption, wherein n=1, 2, 3, 4, 5, 6, etc.

25. A method for 3D imaging by modulation interferometry, comprising,
directing, via one or more phase modulation devices, a first excitation beam to a first optical objective, wherein at least one of the one or more phase modulating devices is initially located at a first position;

directing, via a first set of reflective mirrors, a second excitation beam to a second optical objective;

collecting, at the first optical objective, a first portion of light provided by a sample;

collecting, at the second optical objective, a second portion of light provided by the sample;

combining the first portion of the provided light and the second portion of the provided light to form a first interference signal;

detecting, by one or more detectors, the first interference signal;

modulating an optical path length via the at least one of the one or more phase modulation devices from a first state to a second state to provide a second interference signal;

detecting, by the one or more detectors, the second interference signal;

modulating the optical path length via the one or more phase modulation devices to a third state to provide a third interference signal;

detecting, by the at least one of the one or more detectors, the third interference signal; and processing, by a processor of a computing device, data corresponding to the first interference signal, the second interference signal, and the third interference signal to determine an axial position of one or more features of the sample.

26. The method of claim 25, wherein the modulating comprises physically displacing the one or more phase modulating devices.

27. The method of claim 26, wherein the one or more phase modulation devices comprises a PZM or other movable device.

28. The method of claim 25, wherein the modulating comprises changing the refractive index of one the one or more phase modulation devices.

29. The method of claim 25, wherein the modulating comprises changing the electric field one the one or more phase modulation devices.

* * * * *